United States Patent
Ichihara

(10) Patent No.: US 10,520,791 B2
(45) Date of Patent: Dec. 31, 2019

(54) IMAGE PICKUP SYSTEM CAPABLE OF PERFORMING BOUNCE FLASH SHOOTING, LIGHT EMISSION DEVICE, METHOD OF CONTROLLING LIGHT EMISSION DEVICE, AND STORAGE MEDIUM

(71) Applicant: CANON KABUSHIKI KAISHA, Tokyo (JP)

(72) Inventor: Yoshiro Ichihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/608,559

(22) Filed: May 30, 2017

(65) Prior Publication Data

US 2017/0351160 A1  Dec. 7, 2017

(30) Foreign Application Priority Data

Jun. 1, 2016  (JP) .................................. 2016-110040

(51) Int. Cl.
*H04N 5/222* (2006.01)
*G03B 7/16* (2014.01)
(Continued)

(52) U.S. Cl.
CPC .............. *G03B 7/16* (2013.01); *G03B 15/05* (2013.01); *G03B 2215/0521* (2013.01);
(Continued)

(58) Field of Classification Search
CPC .............. H04N 1/6086; H04N 5/2256; H04N 2201/02435; H04N 2201/02462;
(Continued)

(56) References Cited

U.S. PATENT DOCUMENTS

| 2014/0375837 A1* | 12/2014 | Ichihara | H04N 5/2354 348/222.1 |
| 2015/0261068 A1* | 9/2015 | Ooyama | G03B 15/05 348/371 |

FOREIGN PATENT DOCUMENTS

| CN | 103649828 A | 3/2014 |
| CN | 104243808 A | 12/2014 |

(Continued)

OTHER PUBLICATIONS

The above foreign patent document was cited in a Oct. 23, 2019 Chinese Office Action, which is enclosed with an Engiish Translation, that issued in Chinese Patent Application No. 201710412013.3.

*Primary Examiner* — Sinh Tran
*Assistant Examiner* — Selam T Gebriel
(74) *Attorney, Agent, or Firm* — Cowan, Liebowitz & Latman, P.C.

(57) ABSTRACT

A technique that prevents a movable unit of a strobe device including a light emission section from unexpectedly interfering with an obstacle during rotation thereof. The movable unit is supported in a manner rotatable with respect to a device body about a first axis in a vertical direction, and rotatable about a second axis in a lateral direction. In bounce flash shooting, the movable unit irradiates light from the light emission section toward a ceiling to cause reflected light from the ceiling to be irradiated to an object. The movable unit is rotated such that the light emission section is oriented in the optimum irradiating direction. Whether to drive the movable unit in the lateral direction is determined based on a result of determining whether a rotational angle of the movable unit driven in the vertical direction exceeds a predetermined angle.

19 Claims, 38 Drawing Sheets

(51) Int. Cl.
*G03B 15/05* (2006.01)
*H04N 5/225* (2006.01)
*H04N 5/235* (2006.01)

(52) U.S. Cl.
CPC .... *G03B 2215/0528* (2013.01); *H04N 5/2256* (2013.01); *H04N 5/2354* (2013.01)

(58) Field of Classification Search
CPC .......... H04N 1/02815; H04N 1/02895; H04N 1/0314; H04N 1/0315; H04N 1/0317; H04N 1/0316
See application file for complete search history.

(56) References Cited

FOREIGN PATENT DOCUMENTS

| | | |
|---|---|---|
| CN | 104243812 A | 12/2014 |
| CN | 104541200 A | 4/2015 |
| CN | 104980538 A | 10/2015 |
| JP | 2007322454 A | 12/2007 |
| JP | 2011-170014 A | 9/2011 |
| JP | 2011227372 A | 11/2011 |
| WO | 2015025485 A1 | 2/2015 |

\* cited by examiner

8-BIT (1-BYTE) COMMUNICATION EXAMPLE (BIT-RISE DETECTION)

EXAMPLE: AUTOMATIC BOUNCE SETTING/CANCELLATION

|  | 1ST BYTE | 2ND BYTE | 3RD BYTE |
|---|---|---|---|
| CAMERA | COMMAND CS 08H | COMMAND NUMBER 011 (0BH) | DATA 1 01 |
| STROBE | ×× | ×× | ×× |

EXAMPLE: AUTOMATIC BOUNCE SETTING/CANCELLATION

|  | 1ST BYTE | 2ND BYTE | 3RD BYTE |
|---|---|---|---|
| CAMERA | COMMAND CS 01H | ×× | ×× |
| STROBE | ×× | COMMAND NUMBER 010 (0AH) | DATA 1 01 |

FIG. 3D

EXAMPLE: AUTOMATIC BOUNCE RANGING METHOD

|  | 1ST BYTE | 2ND BYTE | 3RD BYTE | 4TH BYTE |
|---|---|---|---|---|
| CAMERA | COMMAND CS 08H | COMMAND NUMBER 091 (5BH) | DATA 1 02 | DATA 2 10 |
| STROBE | xx | xx | xx | xx |

FIG. 3E

EXAMPLE: AUTOMATIC BOUNCE RANGING METHOD

|  | 1ST BYTE | 2ND BYTE | 3RD BYTE | 4TH BYTE |
|---|---|---|---|---|
| CAMERA | COMMAND CS 01H | xx | xx | xx |
| STROBE | xx | COMMAND NUMBER 090 (5AH) | DATA 1 02 | DATA 2 10 |

FIG. 4A

| COMMAND | COMMAND NUMBER | CONTENT | DATA ITEM |
|---|---|---|---|
| SC | 000 | AUTOMATIC BOUNCE FUNCTION | |
| HEX:01 | HEX:00 | | 0:NOT SET |
| | | | 1:SET |
| | | | |
| SC | 010 | AUTOMATIC BOUNCE SETTING/CANCELLATION | |
| HEX:01 | HEX:A | | 0:CANCEL |
| | | | 1:SET |
| | | | |
| SC | 020 | AUTOMATIC BOUNCE DRIVING RANGE | |
| HEX:01 | HEX:14 | | 0:ALL ALLOWED |
| | | | 1:LATERAL ALLOWED |
| | | | 2:VERTICAL ALLOWED |
| | | | |
| SC | 030 | AUTOMATIC BOUNCE LATERAL DRIVING RANGE | START-END |
| HEX:01 | HEX:1E | | |
| SC | 040 | AUTOMATIC BOUNCE VERTICAL DRIVING RANGE | START-END |
| HEX:01 | HEX:28 | | |
| SC | 050 | DURING AUTOMATIC BOUNCE DRIVING (MOTOR) | |
| HEX:01 | HEX:32 | | 0:STOP |
| | | | 1:IN VERTICAL OPERATION |
| | | | 2:IN LATERAL OPERATION |
| | | | |
| SC | 060 | AUTOMATIC BOUNCE ERROR | |
| HEX:01 | HEX:3C | | 0:NORMAL |
| | | | 1:ERROR |
| | | | |
| SC | 070 | CURRENT POSITION BOUNCE ANGLE INFORMATION VERTICAL | |
| HEX:01 | HEX:46 | | 000H—168H |
| | | | |
| SC | 080 | CURRENT POSITION BOUNCE ANGLE INFORMATION LATERAL | |
| HEX:01 | HEX:50 | | 000H—168H |
| | | | |

*FIG. 4B*

| COMMAND | COMMAND NUMBER | CONTENT | DATA ITEM |
|---|---|---|---|
| SC | 090 | AUTOMATIC BOUNCE RANGING METHOD | 0X:OBJECT |
| HEX:01 | HEX:5A | | 1X:CEILING (OR WALL) |
| | | | X0:PRELIMINARY LIGHT EMISSION |
| | | | X1:STROBE BUILT-IN AF |
| | | | X2:CAMERA AF |
| SC | 100 | VERTICAL DISTANCE INFORMATION | |
| HEX:01 | HEX:64 | | DATA |
| SC | 110 | OBJECT DISTANCE INFORMATION | |
| HEX:01 | HEX:6e | | DATA |
| SC | 120 | STROBE POSTURE DIFFERENCE INFORMATION | |
| HEX:01 | HEX:78 | | HORIZONTAL DATA |
| | | | VERTICAL DATA |
| | | | FRONT-REAR DATA |
| SC | 130 | DURING AUTOMATIC BOUNCE PRELIMINARY LIGHT EMISSION | |
| HEX:01 | HEX:82 | | 0:ON STANDBY |
| | | | 1:DURING EMISSION |
| SC | 210 | BOUNCE ANGLE LIMITATION INFORMATION (INSTRUCTED FROM STROBE) | |
| HEX:01 | HEX:D2 | | 0:90° |
| | | | 1:120° |
| | | | 2:150° |
| SC | 220 | FIRST AXIS SWITCHING BOUNCE ANGLE INFORMATION (INSTRUCTED FROM STROBE) | 0:90° |
| HEX:01 | HEX:DC | | 1:120° |
| | | | 2:150° |
| | | | 3:SWITCHING INHIBITED |

*FIG. 5A*

| COMMAND | COMMAND NUMBER | CONTENT | DATA ITEM |
|---|---|---|---|
| CS | 001 | AUTOMATIC BOUNCE-COMPATIBLE CAMERA | |
| HEX:08 | HEX:01 | | 0:INCOMPATIBLE |
| | | | 1:COMPATIBLE |
| CS | 011 | AUTOMATIC BOUNCE SETTING/CANCELLATION | |
| HEX:08 | HEX:0B | | 0:CANCEL |
| | | | 1:SET |
| CS | 021 | INSTRUCTION OF AUTOMATIC BOUNCE DRIVING CONDITION | |
| HEX:08 | HEX:15 | | 0:ALL ALLOWED |
| | | | 1:LATERAL ALLOWED |
| | | | 2:VERTICAL ALLOWED |
| CS | 031 | INSTRUCTION OF AUTOMATIC BOUNCE LATERAL DRIVING RANGE | START-END |
| HEX:08 | HEX:1F | | |
| CS | 041 | INSTRUCTION OF AUTOMATIC BOUNCE VERTICAL DRIVING RANGE | START-END |
| HEX:08 | HEX:29 | | |
| CS | 051 | INSTRUCTION OF AUTOMATIC BOUNCE DRIVING (MOTOR) | |
| HEX:08 | HEX:33 | | 0:STOP |
| | | | 1:VERTICAL OPERATION |
| | | | 2:LATERAL OPERATION |
| CS | 071 | INSTRUCTION OF POSITION BOUNCE ANGLE VERTICAL | |
| HEX:08 | HEX:47 | | 000H—168H |
| CS | 081 | INSTRUCTION OF POSITION BOUNCE ANGLE LATERAL | |
| HEX:08 | HEX:51 | | 000H—168H |
| CS | 091 | INSTRUCTION OF AUTOMATIC BOUNCE RANGING METHOD | 0X:OBJECT |
| HEX:08 | HEX:5B | | 1X:CEILING (OR WALL) |
| | | | X0:PRELIMINARY LIGHT EMISSION |
| | | | X1:STROBE BUILT-IN AF |
| | | | X2:CAMERA AF |
| CS | 101 | VERTICAL DISTANCE INFORMATION | |
| HEX:08 | HEX:65 | | DATA |
| CS | 111 | OBJECT DISTANCE INFORMATION | |
| HEX:08 | HEX:6F | | DATA |

FIG. 5B

| COMMAND | COMMAND NUMBER | CONTENT | DATA ITEM |
|---|---|---|---|
| CS | 121 | CAMERA POSTURE DIFFERENCE INFORMATION | |
| HEX:08 | HEX:79 | | HORIZONTAL DATA |
| | | | VERTICAL DATA |
| | | | FRONT-REAR DATA |
| CS | 131 | INHIBITION OF PRELIMINARY LIGHT EMISSION | |
| HEX:08 | HEX:83 | | 0:ALLOWED |
| | | | 1:INHIBITED |
| CS | 141 | PHOTOMETRY TIMER | |
| HEX:08 | HEX:8D | | 0:NOT OPERATING |
| | | | 1:OPERATING |
| CS | 151 | STATE OF RELEASE SW | |
| HEX:08 | HEX:97 | | 0:SWITCH OFF |
| | | | 1:SW1 ON |
| | | | 2:SW2 ON |
| CS | 161 | CHANGE IN OPERATION SPEED | |
| HEX:08 | HEX:A1 | | 0:NORMAL |
| | | | 1:LOW SPEED (QUIET) |
| | | | 2:HIGH SPEED |
| CS | 171 | CALCULATION OF BOUNCE ANGLE | |
| HEX:08 | HEX:AB | | 0:STROBE |
| | | | 1:CAMERA |
| CS | 181 | SELECTION OF BOUNCE DRIVING INSTRUCTION | |
| HEX:08 | HEX:B5 | | 0:STROBE |
| | | | 1:CAMERA |
| CS | 211 | BOUNCE ANGLE LIMITATION INFORMATION (INSTRUCTED FROM CAMERA) | |
| HEX:08 | HEX:D3 | | 0:90° |
| | | | 1:120° |
| | | | 2:150° |
| CS | 221 | FIRST AXIS SWITCHING BOUNCE ANGLE INFORMATION (INSTRUCTED FROM CAMERA) | 0:90° |
| HEX:08 | HEX:DD | | 1:120° |
| | | | 2:150° |
| | | | 3:SWITCHING INHIBITED |
| CS | 231 | LIVE VIEW MODE INFORMATION | |
| HEX:08 | HEX:DD | | 0:VIEWFINDER IN USE |
| | | | 1:LIVE VIEW IN USE |
| CS | 241 | VARIABLE ANGLE OPERATION INFORMATION | |
| HEX:08 | HEX:F1 | | 0:NOT IN USE |
| | | | 1:IN USE (OPERATING) |

*FIG. 8A*

| VERTICAL ANGLE | D0 | D1 | D2 | D3 |
|---|---|---|---|---|
| 0 | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |

*FIG. 8B*

| LATERAL ANGLE | D0 | D1 | D2 | D3 |
|---|---|---|---|---|
| 0(360) | 0 | 0 | 0 | 0 |
| 45 | 0 | 0 | 0 | 1 |
| 60 | 0 | 0 | 1 | 1 |
| 75 | 0 | 0 | 1 | 0 |
| 90 | 0 | 1 | 1 | 0 |
| 105 | 0 | 1 | 1 | 1 |
| 120 | 0 | 1 | 0 | 1 |
| 135 | 0 | 1 | 0 | 0 |
| 180 | 1 | 1 | 0 | 0 |
| 225 | 1 | 1 | 0 | 1 |
| 240 | 1 | 1 | 1 | 1 |
| 255 | 1 | 1 | 1 | 0 |
| 270 | 1 | 0 | 1 | 0 |
| 285 | 1 | 0 | 1 | 1 |
| 300 | 1 | 0 | 0 | 1 |
| 315 | 1 | 0 | 0 | 0 |

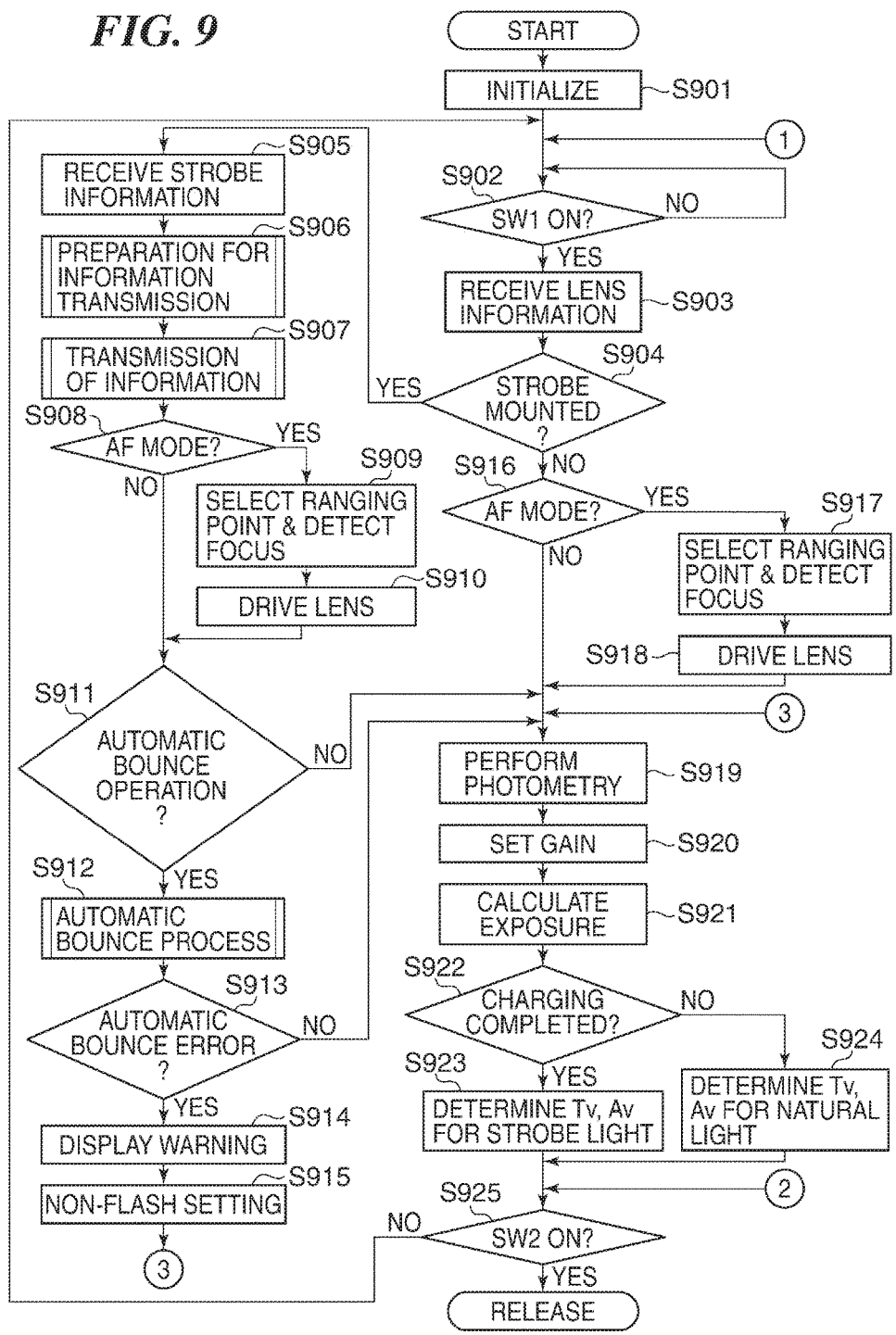

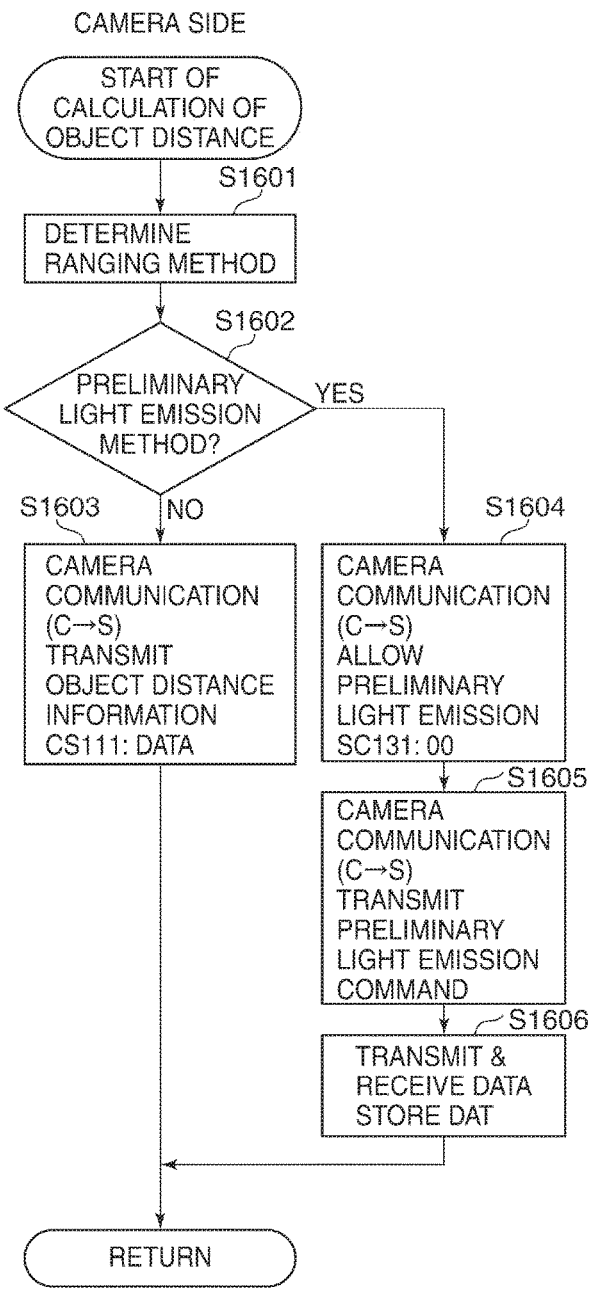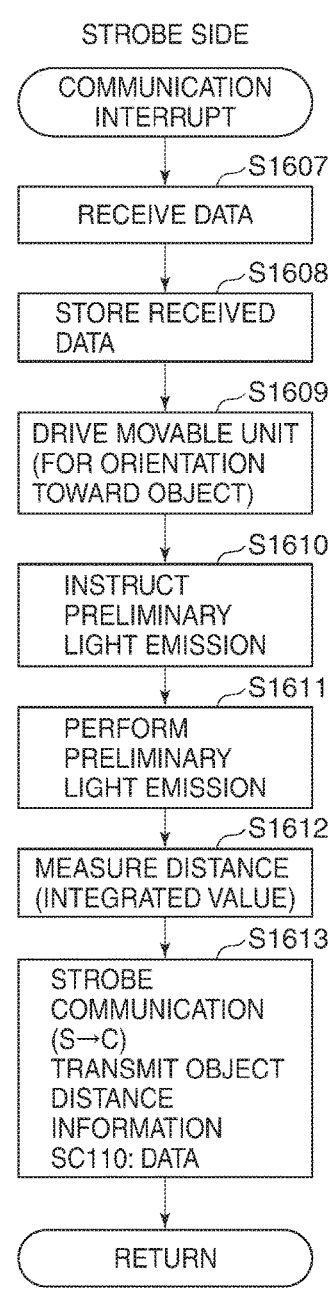
*FIG. 16A* CAMERA SIDE
*FIG. 16B* STROBE SIDE

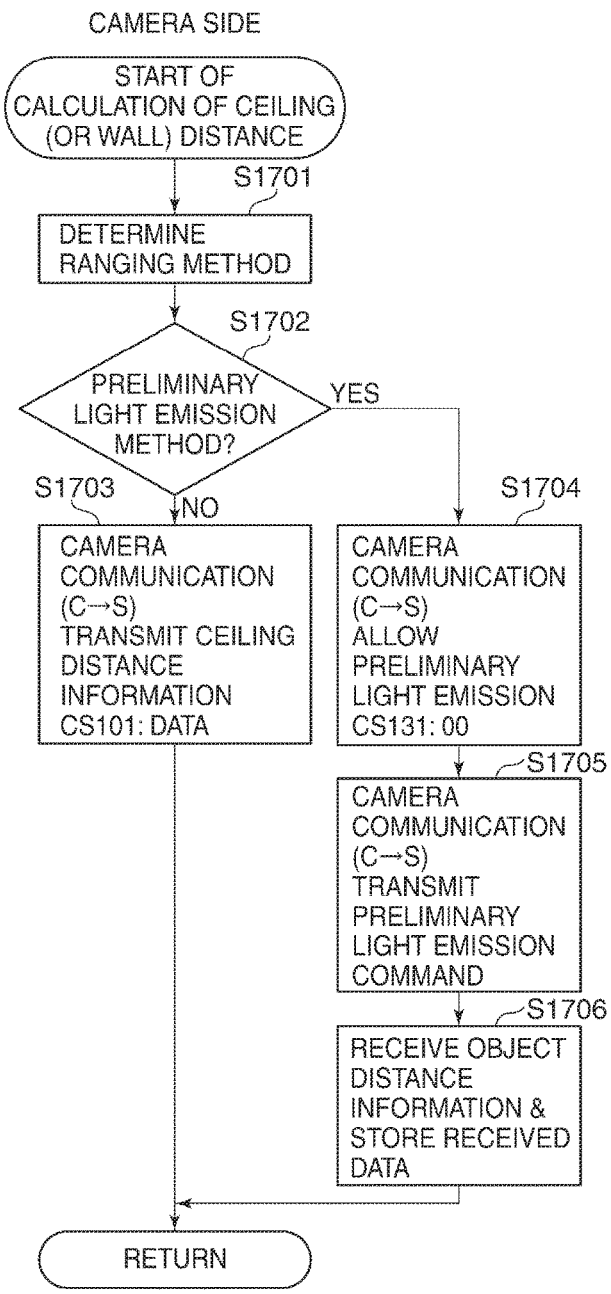
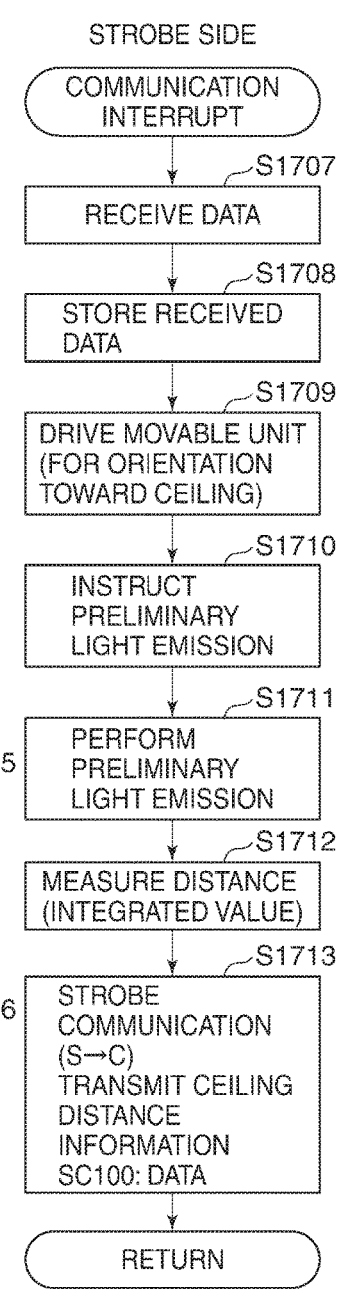
FIG. 17A — CAMERA SIDE
FIG. 17B — STROBE SIDE

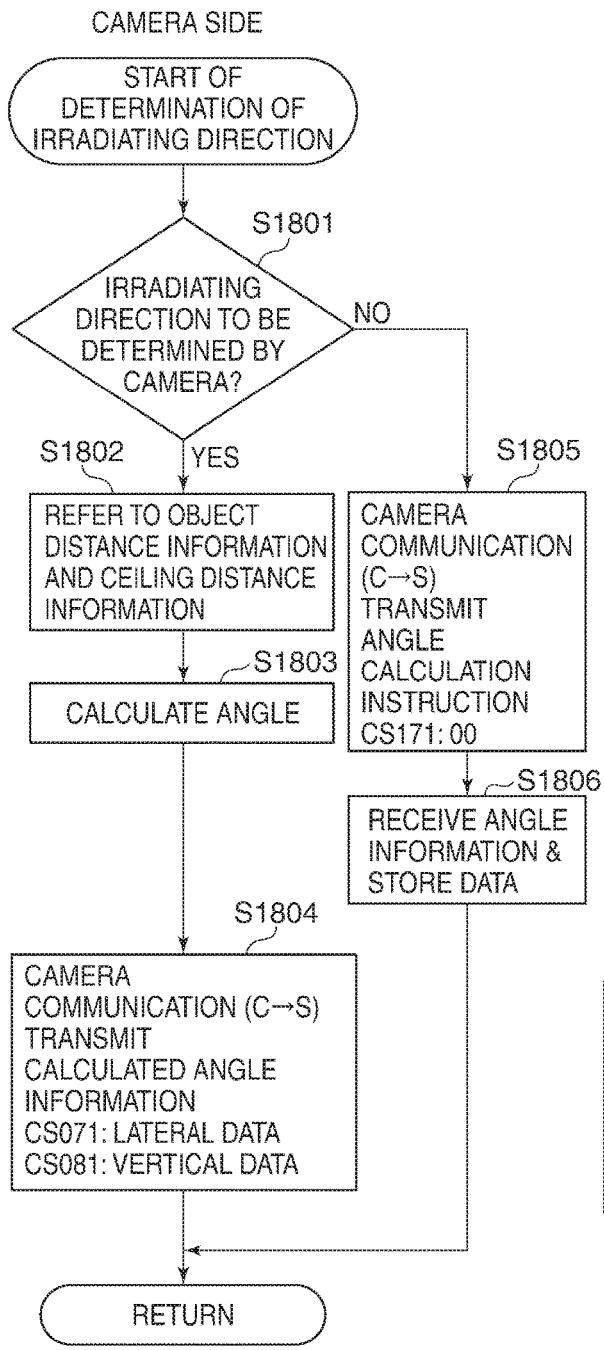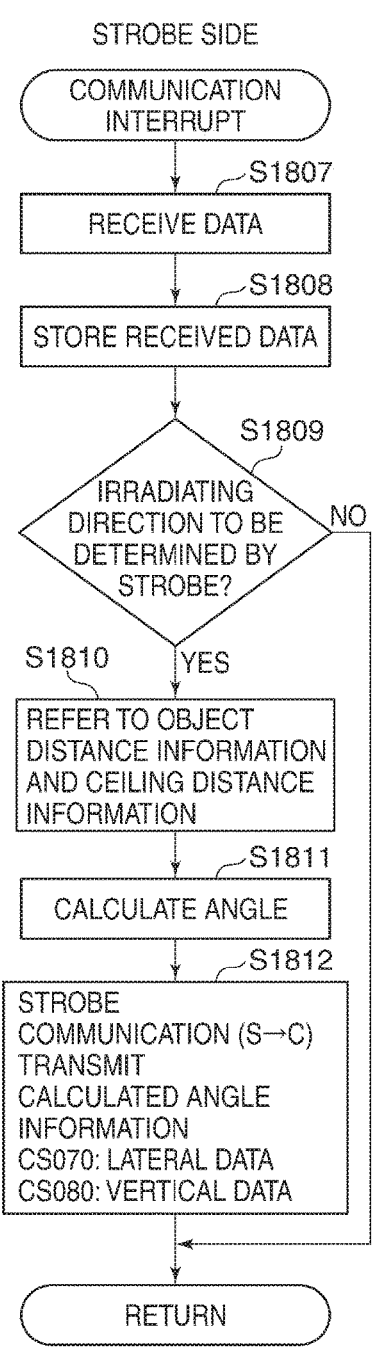

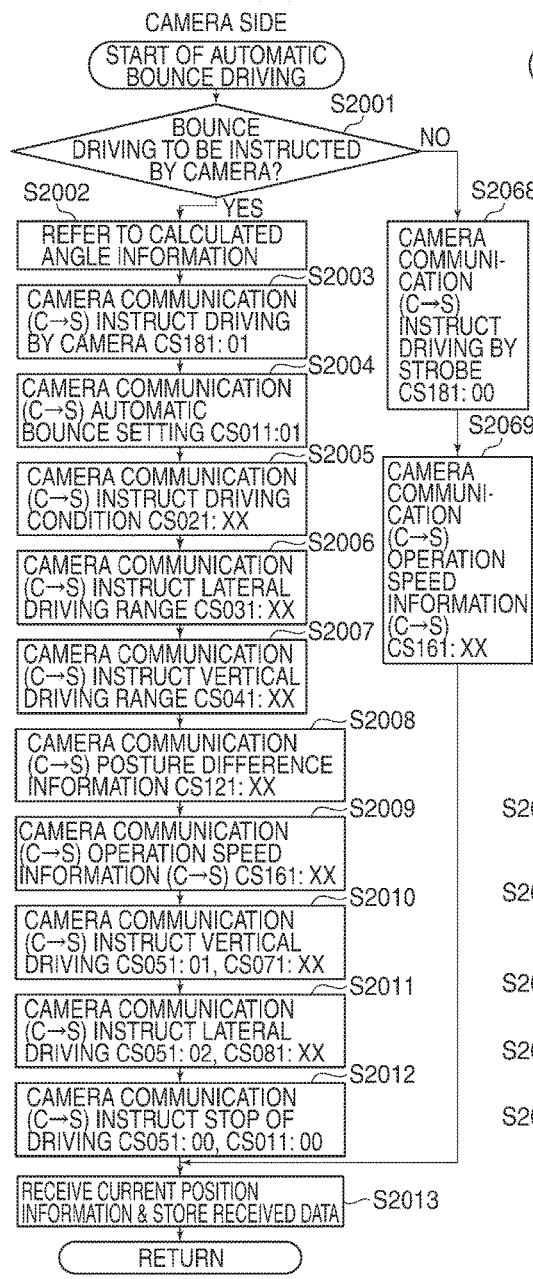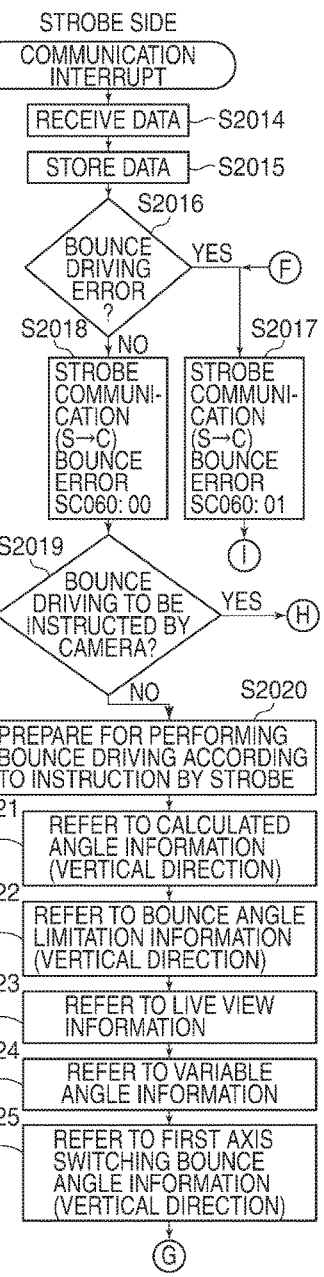
FIG. 20A / FIG. 20B

IMAGE PICKUP SYSTEM CAPABLE OF PERFORMING BOUNCE FLASH SHOOTING, LIGHT EMISSION DEVICE, METHOD OF CONTROLLING LIGHT EMISSION DEVICE, AND STORAGE MEDIUM

BACKGROUND OF THE INVENTION

Field of the Invention

The present invention relates to a technique for controlling a light emission device mounted on an image pickup apparatus, such as a digital camera.

Description of the Related Art

Image pickup apparatuses, such as a digital camera, include one that is capable of performing so-called bounce flash shooting in which a strobe light is emitted from a light emission section of a strobe device toward a ceiling or the like, and an object is illuminated by diffusely reflected light from the ceiling. Since the use of the bounce flash shooting makes it possible to indirectly irradiate the light from the strobe device to the object, the object can be rendered in soft light.

Conventionally, there has been proposed a technique for determining a bounce angle such that an incident angle of light for bounce irradiation to an object becomes smaller than an object angle based on the respective shortest distances to the ceiling and the object (Japanese Laid-Open Patent Publication (Kokai) No. 2011-170014). This proposal makes it possible to realize more natural illumination by causing a light emission section to perform rotation about a vertical axis (lateral motion) when the distance to an object (object distance) becomes not smaller than a predetermined distance.

In Japanese Laid-Open Patent Publication (Kokai) No. 2011-170014, when the light emission section is rotated in the vertical direction so as to make the bounce angle proper, it is sometimes impossible to rotate the light emission section to a correct angle depending on the object distance due to restrictions of its mechanism. In such a case, the light emission section is rotated through 180° in the lateral direction before the correct angle is reached, and is then rotated to the correct angle in the vertical direction. However, when the light emission section is rotated through 180° in the lateral direction immediately before the proper angle is reached, there is a possibility that the light emission section interferes with an obstacle depending on the rotational angle of the light emission section in the vertical direction. Further, there arises a problem that the light emission section unexpectedly turns toward the eyes of a photographer to make the photographer feel dazzled. Therefore, there is a difficulty in performing proper bounce flash shooting.

SUMMARY OF THE INVENTION

The present invention provides a technique that prevents, even when a movable unit including a light emission section is rotated to be oriented in an optimum irradiating direction for bounce flash shooting, the movable unit from unexpectedly interfering with an obstacle, or the light emission section from turning toward the eyes of a photographer.

In a first aspect of the invention, there is provided an image pickup system including an image pickup apparatus, and a light emission device that is mounted on the image pickup apparatus, and is capable of performing communication with the image pickup apparatus, wherein the light emission device includes a device body, a movable unit including a light emission section that emits light, and supported in a manner rotatable about a first axis in a first direction with respect to the device body, and in a manner rotatable about a second axis in a second direction substantially orthogonal to the first direction, a first drive unit that drives the movable unit in the first direction, and a second drive unit that drives the movable unit in the second direction, and irradiates light from the light emission section toward a target object, thereby causing reflected light from the target objet to be irradiated to an object, the image pickup system comprising a first determination unit configured to calculate an angle of the movable unit with respect to the device body, at which light is irradiated from the light emission section toward the target object to thereby determine an irradiating direction, a control unit configured to control the first drive unit and the second drive unit such that the light emission section is oriented in the irradiating direction determined by the first determination unit, and a second determination unit configured to determine whether or not a rotational angle of the movable unit with respect to the device body that is driven in the first direction by the first drive unit, in a position where the light emission section is oriented in the irradiating direction, exceeds a predetermined angle, wherein the control unit determines whether or not to drive the movable unit in the second direction by the second drive unit, based on a result of the determination by the second determination unit.

In a second aspect of the invention, there is provided a light emission device that includes a device body, a movable unit including a light emission section that emits light, and supported in a manner rotatable about a first axis in a first direction with respect to the device body, and in a manner rotatable about a second axis in a second direction substantially orthogonal to the first direction, a first drive unit that drives the movable unit in the first direction, and a second drive unit that drives the movable unit in the second direction, and irradiates light from the light emission section toward a target object, thereby causing reflected light from the target objet to be irradiated to an object, the light emission device comprising a first determination unit configured to calculate an angle of the movable unit with respect to the device body, at which light is irradiated from the light emission section toward the target object to thereby decide an irradiating direction, a control unit configured to control the first drive unit and the second drive unit such that the light emission section is oriented in the irradiating direction determined by the first determination unit, and a second determination unit configured to determine whether or not a rotational angle of the movable unit with respect to the device body that is driven in the first direction by the first drive unit, in a position where the light emission section is oriented in the irradiating direction, exceeds a predetermined angle, wherein the control unit determines whether or not to drive the movable unit in the second direction by the second drive unit, based on a result of the determination by the second determination unit.

In a third aspect of the invention, there is provided a method of controlling a light emission device light emission device that includes a device body, a movable unit including a light emission section that emits light, and supported in a manner rotatable about a first axis in a first direction with respect to the device body, and in a manner rotatable about a second axis in a second direction substantially orthogonal to the first direction, a first drive unit that drives the movable unit in the first direction, and a second drive unit that drives the movable unit in the second direction, and irradiates light from the light emission section toward a target object, thereby causing reflected light from the target objet to be irradiated to an object, the method comprising calculating an angle of the movable unit with respect to the device body, at which light is irradiated from the light emission section toward the target object to thereby determine an irradiating direction, controlling the first drive unit and the second drive unit such that the light emission section is oriented in the determined irradiating direction, determining whether or not a rotational angle of the movable unit with respect to the device body that is driven in the first direction by the first drive unit, in a position where the light emission section is oriented in the irradiating direction, exceeds a predetermined angle, and determining whether or not to drive the movable unit in the second direction by the second drive unit, based on a result of the determination by said determining.

In a fourth aspect of the invention, there is provided a non-transitory computer-readable storage medium storing a computer-executable program for executing a method of controlling a light emission device light emission device that includes a device body, a movable unit including a light emission section that emits light, and supported in a manner rotatable about a first axis in a first direction with respect to the device body, and in a manner rotatable about a second axis in a second direction substantially orthogonal to the first direction, a first drive unit that drives the movable unit in the first direction, and a second drive unit that drives the movable unit in the second direction, and irradiates light from the light emission section toward a target object, thereby causing reflected light from the target objet to be irradiated to an object, wherein the method comprises calculating an angle of the movable unit with respect to the device body, at which light is irradiated from the light emission section toward the target object to thereby determine an irradiating direction, controlling the first drive unit and the second drive unit such that the light emission section is oriented in the determined irradiating direction, determining whether or not a rotational angle of the movable unit with respect to the device body that is driven in the first direction by the first drive unit, in a position where the light emission section is oriented in the irradiating direction, exceeds a predetermined angle, and determining whether or not to drive the movable unit in the second direction by the second drive unit, based on a result of the determination by said determining.

According to the present invention, even when the movable unit including the light emission section is rotated to be oriented in an optimum irradiating direction for bounce flash shooting, it is possible to prevent the movable unit from unexpectedly interfering with an obstacle, and the light emission section from turning toward the eyes of a photographer.

Further features of the present invention will become apparent from the following description of exemplary embodiments (with reference to the attached drawings).

BRIEF DESCRIPTION OF THE DRAWINGS

FIGS. 3A to 3E are diagrams useful in explaining an example of data communication between the camera body and the strobe device via terminals.

FIGS. 4A and 4B are diagrams showing an example of a command list used by the camera.

FIGS. 5A and 5B are diagrams showing an example of a command list used by the strobe device.

FIGS. 8A and 8B are diagrams showing rotational angles of the movable unit and Gray codes of the rotary encoders assigned thereto.

FIG. 9 is a flowchart of a shooting preparation process performed by the camera body in automatic bounce flash shooting.

FIGS. 16A and 16B are flowcharts of an object distance calculation process executed in a step in FIG. 13.

FIGS. 17A and 17B are flowcharts of a ceiling (or wall) distance calculation process executed in a step in FIG. 13.

FIGS. 18A and 18B are flowcharts of an irradiating direction determination process executed in a step in FIG. 13.

FIGS. 20A and 20B are flowcharts of a bounce driving control process executed in a step in FIG. 13.

Figure 11:
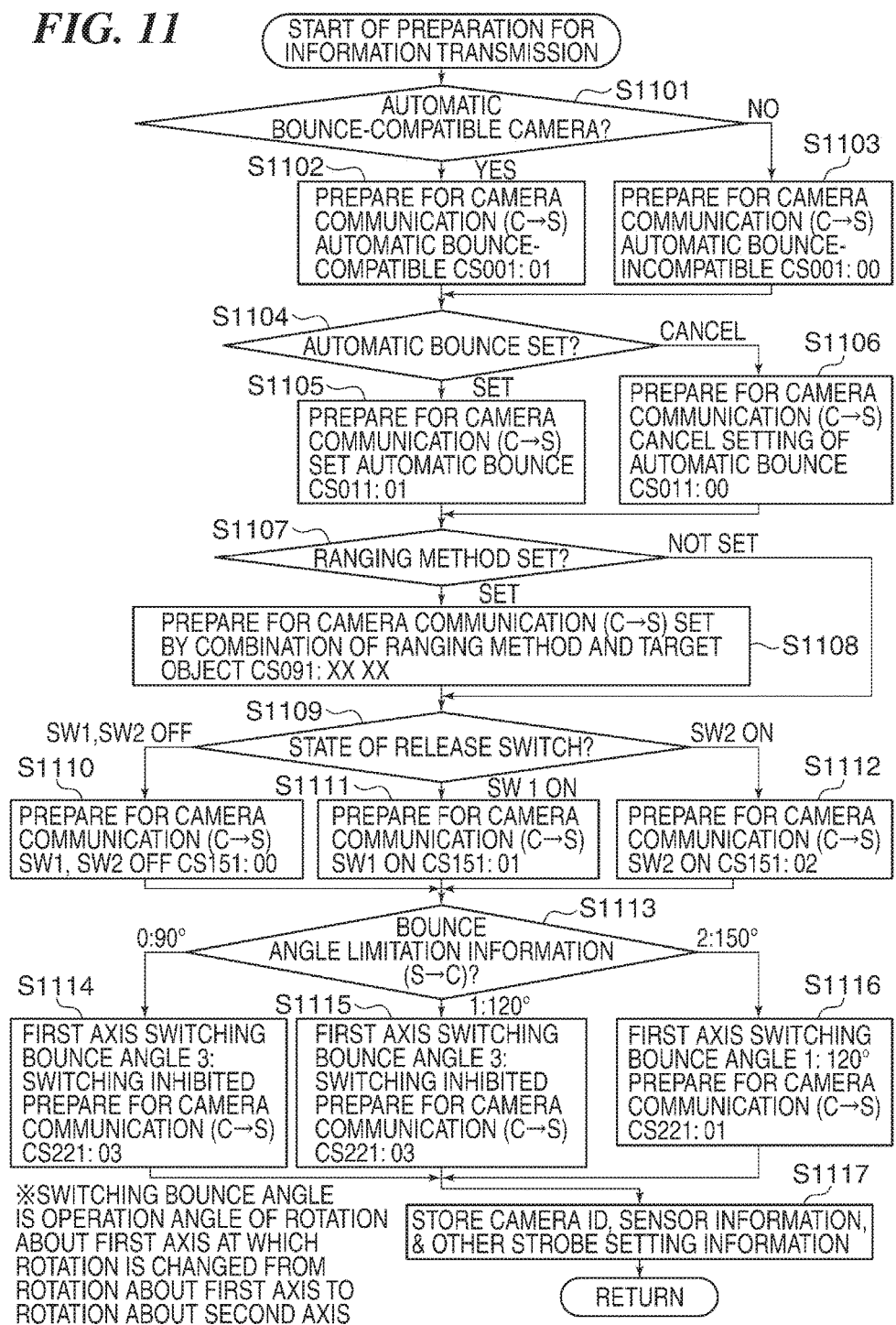
FIG. 11 is a flowchart of an information transmission preparation process executed in a step in FIG. 9.
Figure 24:
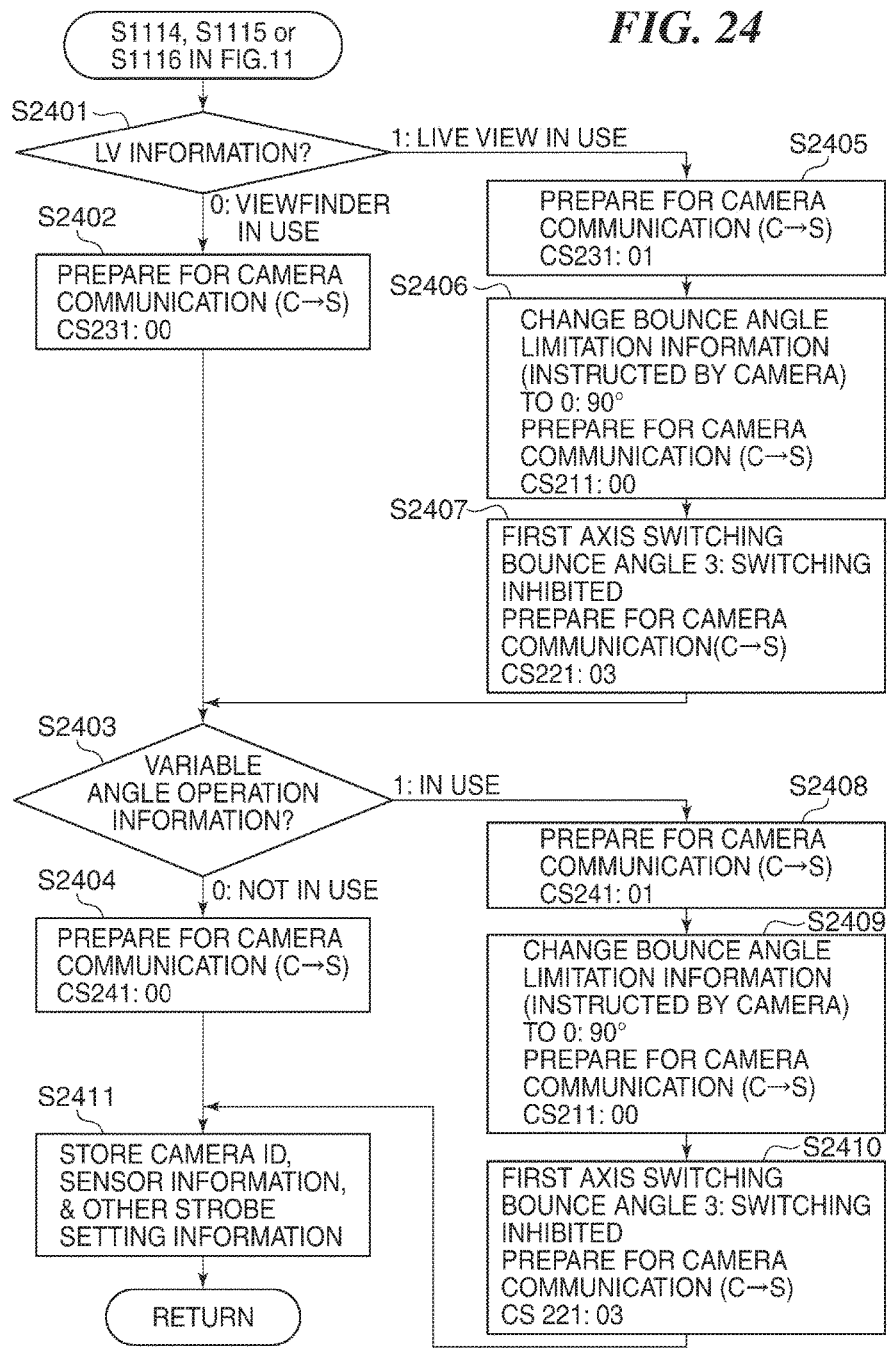
FIG. 24 is a flowchart of part of an information transmission preparation process performed by an image pickup system according to a second embodiment of the present invention, the part corresponding to changes from the information transmission preparation process shown in FIG. 11.

20B, 21, and 22, in accordance with addition of a step to the FIG. 11 information transmission preparation process, in FIG. 24.

Figure 27A:
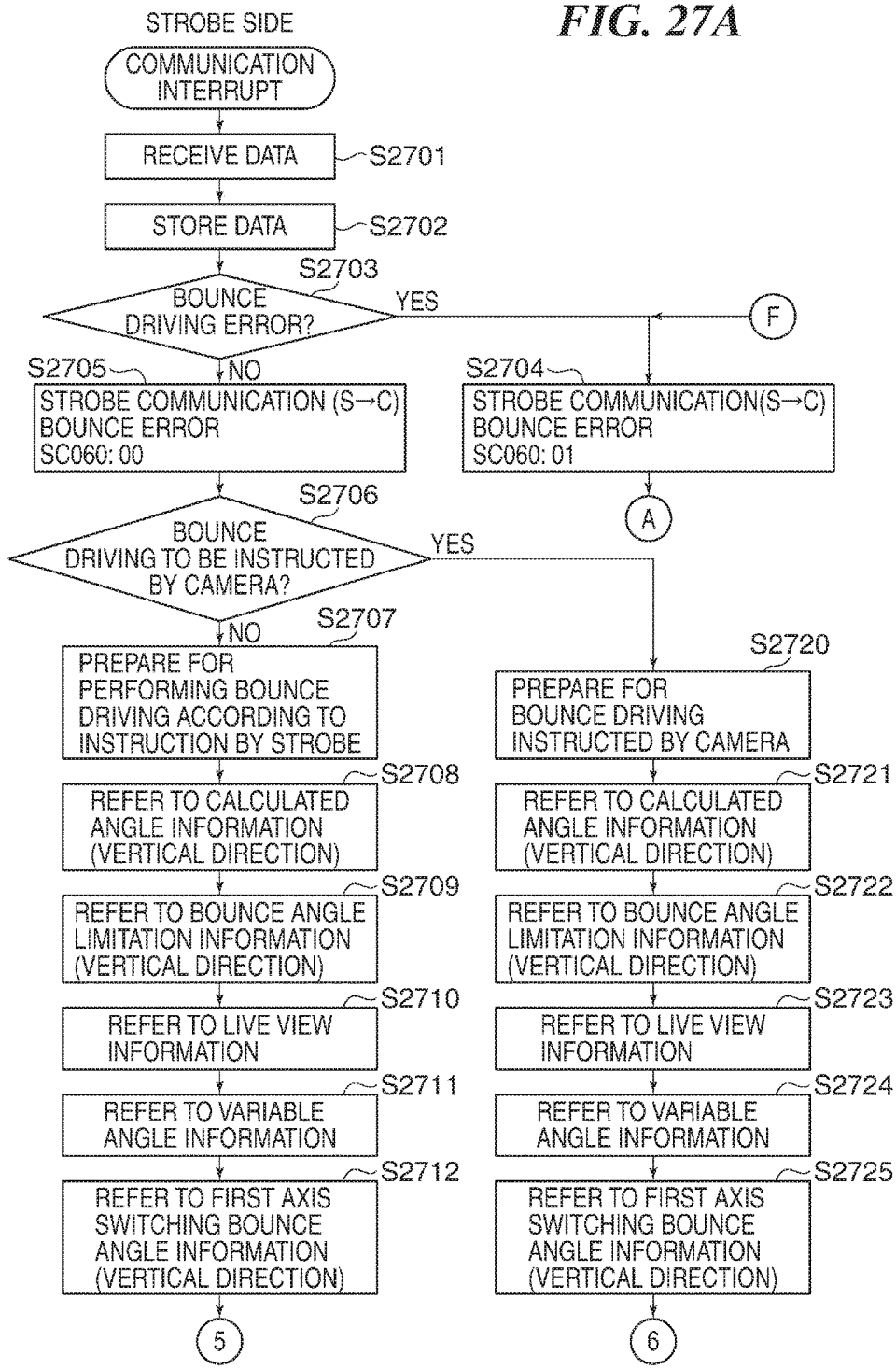
FIGS. 27 A and 27B are a flowchart of a bounce driving control process performed by a strobe controller, which is changed from the bounce driving control process in FIGS.
Figure 27B:
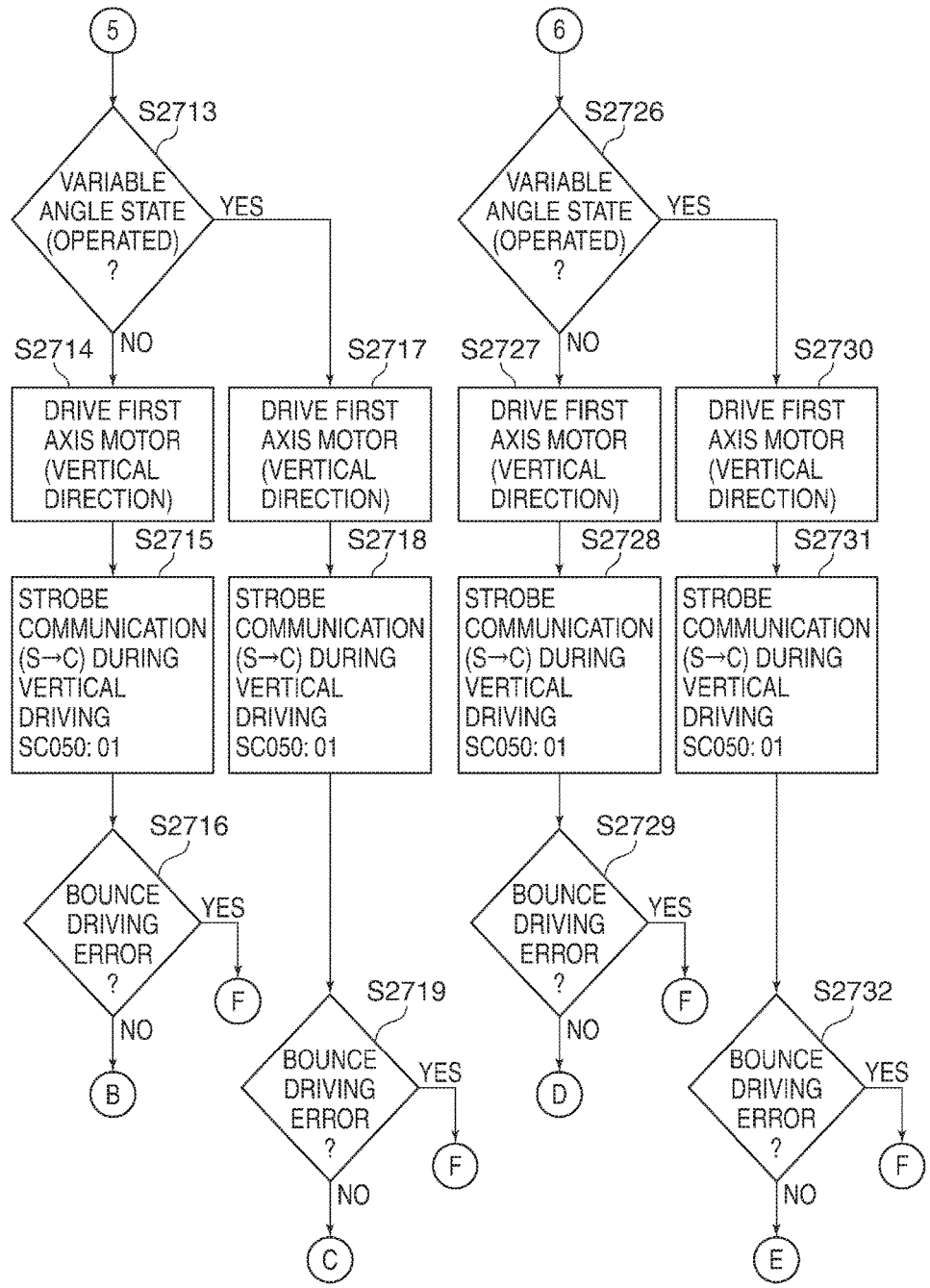
Figure 28A:
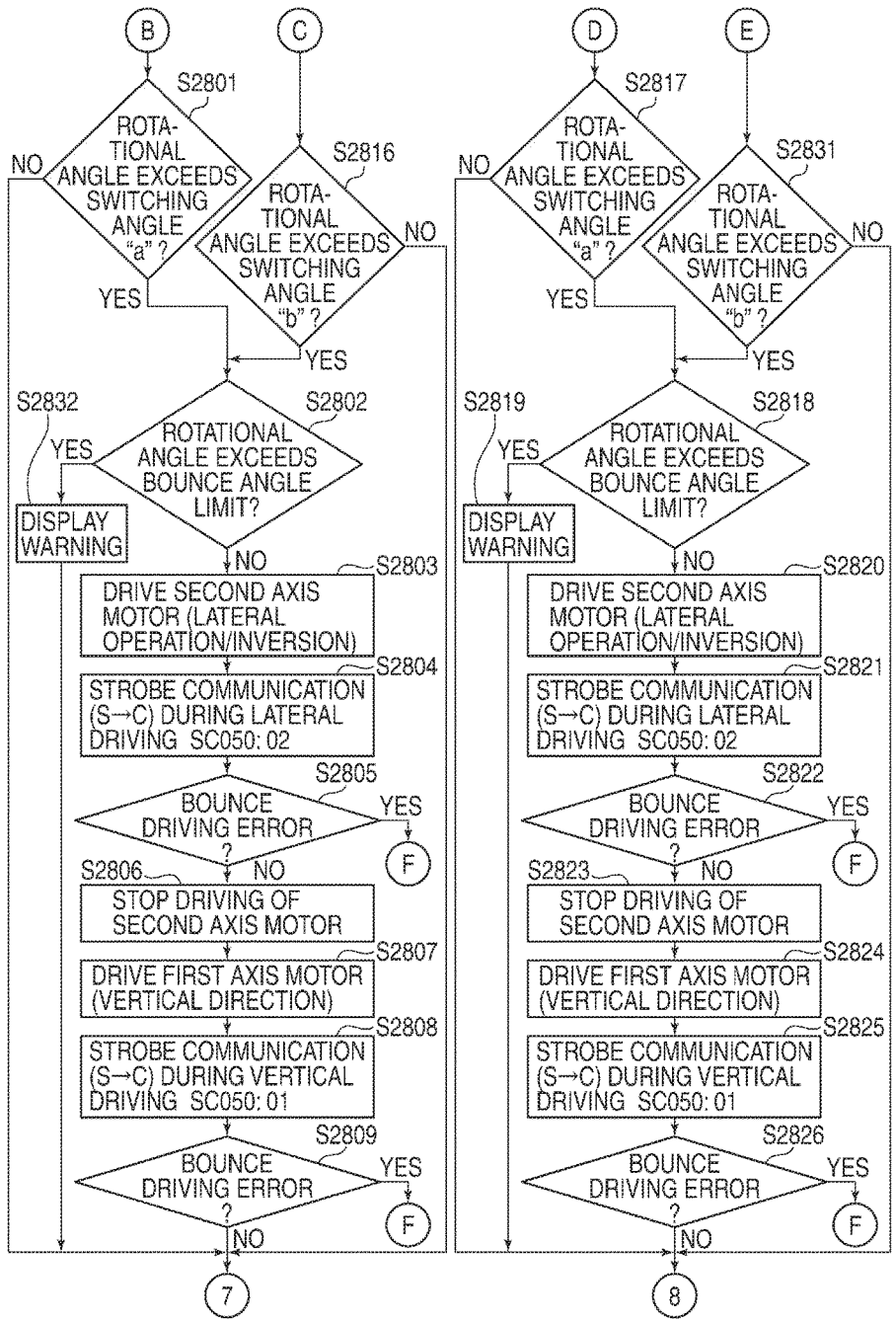
Figure 28B:
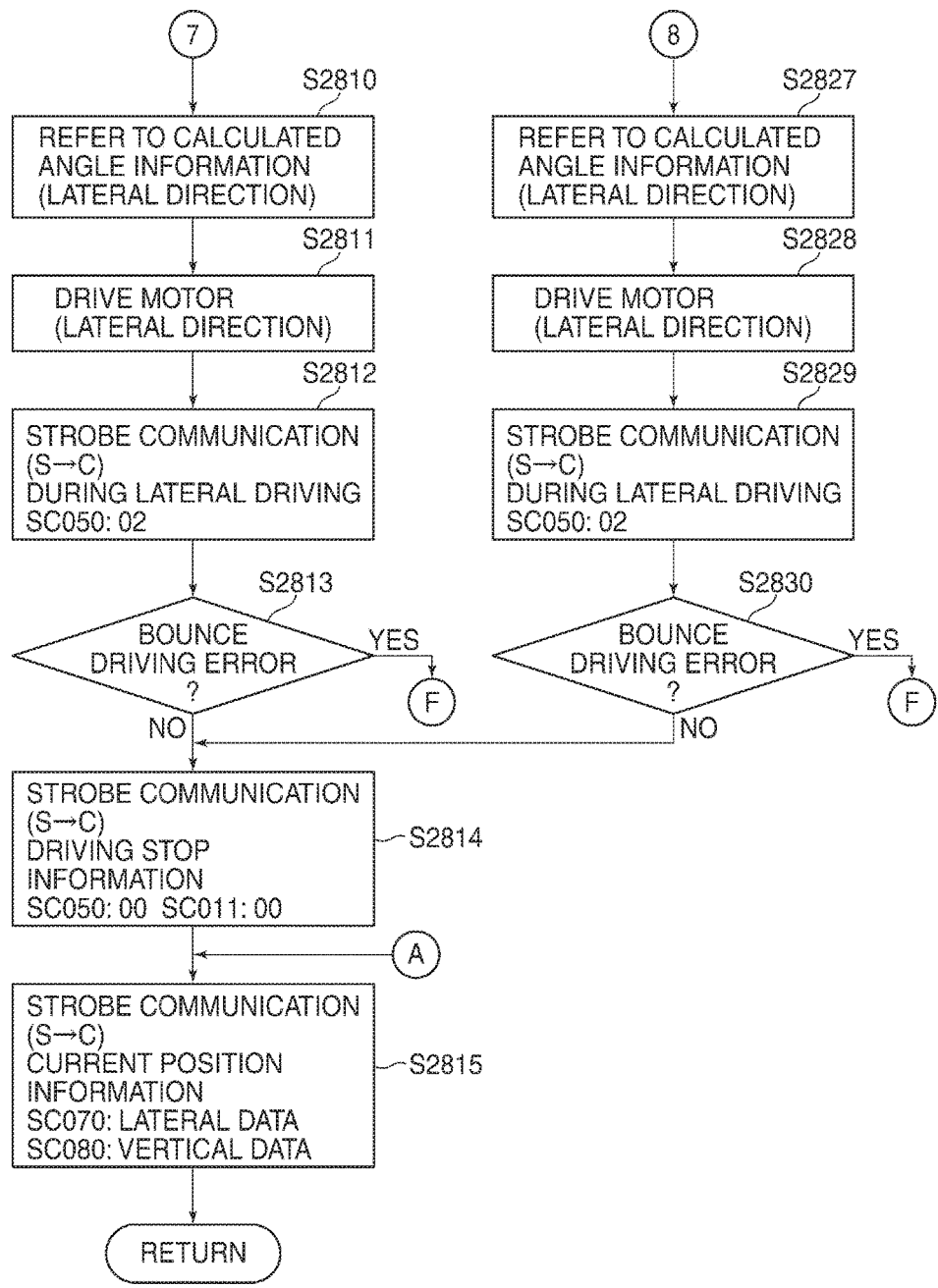

FIGS. 28A and 28B are a continuation of FIGS. 27A and 27B.

Figure 29:
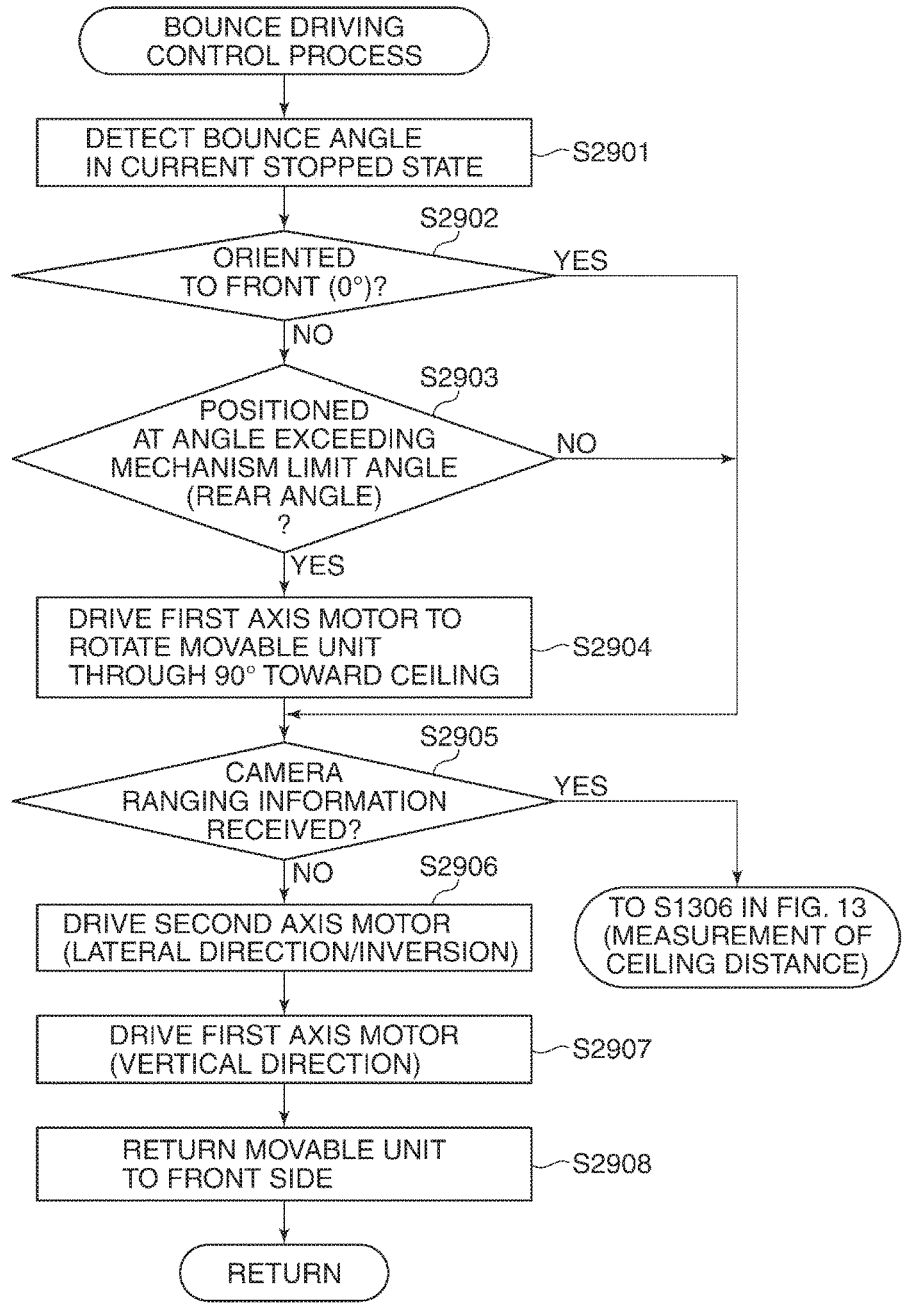

FIG. 29 is a flowchart of a bounce driving control process performed by a strobe controller when driving a movable unit in the object distance calculation process in FIGS. 16A and 16B, in an image pickup system according to a third embodiment of the present invention.

DESCRIPTION OF THE EMBODIMENTS

The present invention will now be described in detail below with reference to the accompanying drawings showing embodiments thereof.

Figure 1:
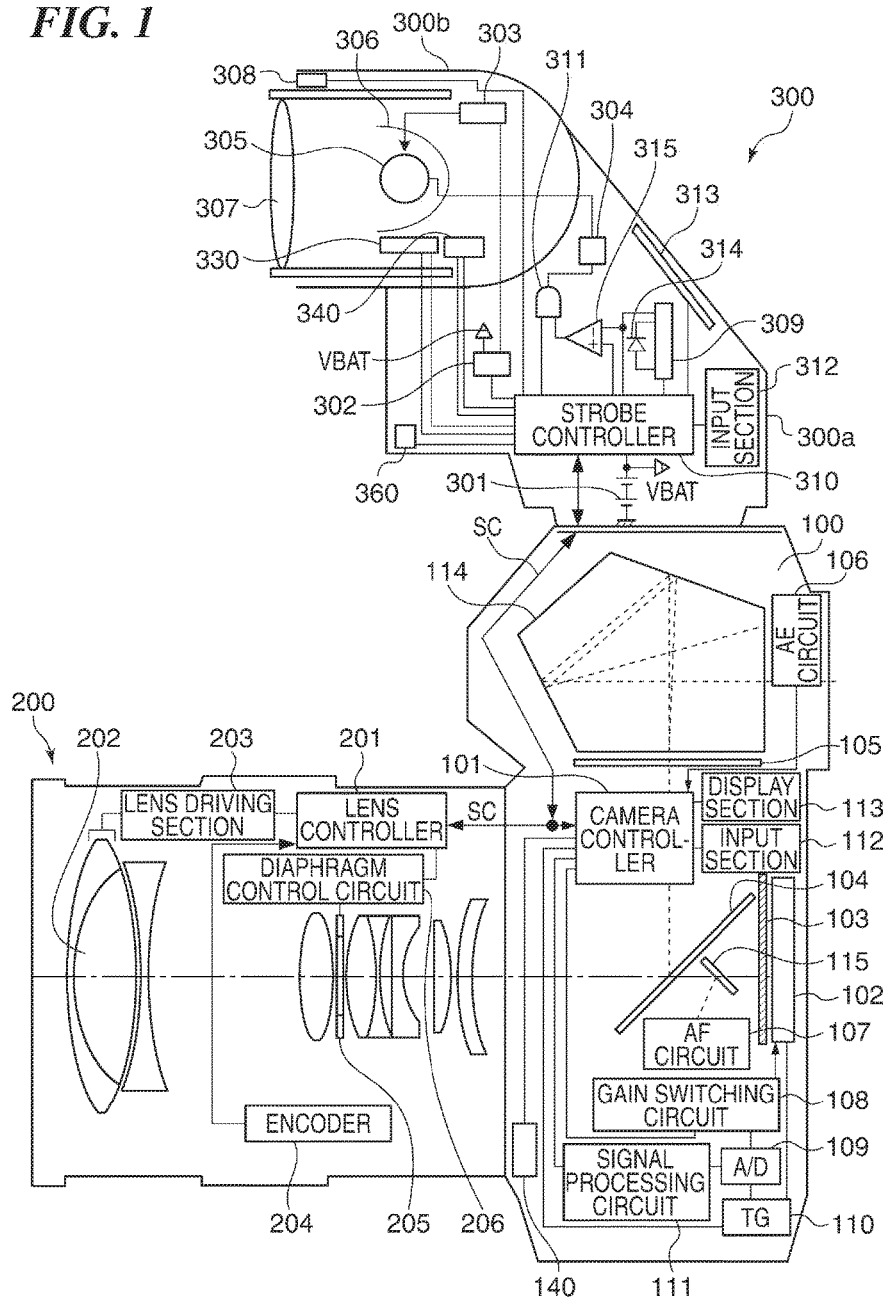
FIG. 1 is a schematic side view of a digital single-lens reflex camera as a component of an image pickup system according to a first embodiment of the present invention, and a strobe device as an example of a light emission device mounted on a camera body.
Figure 2:
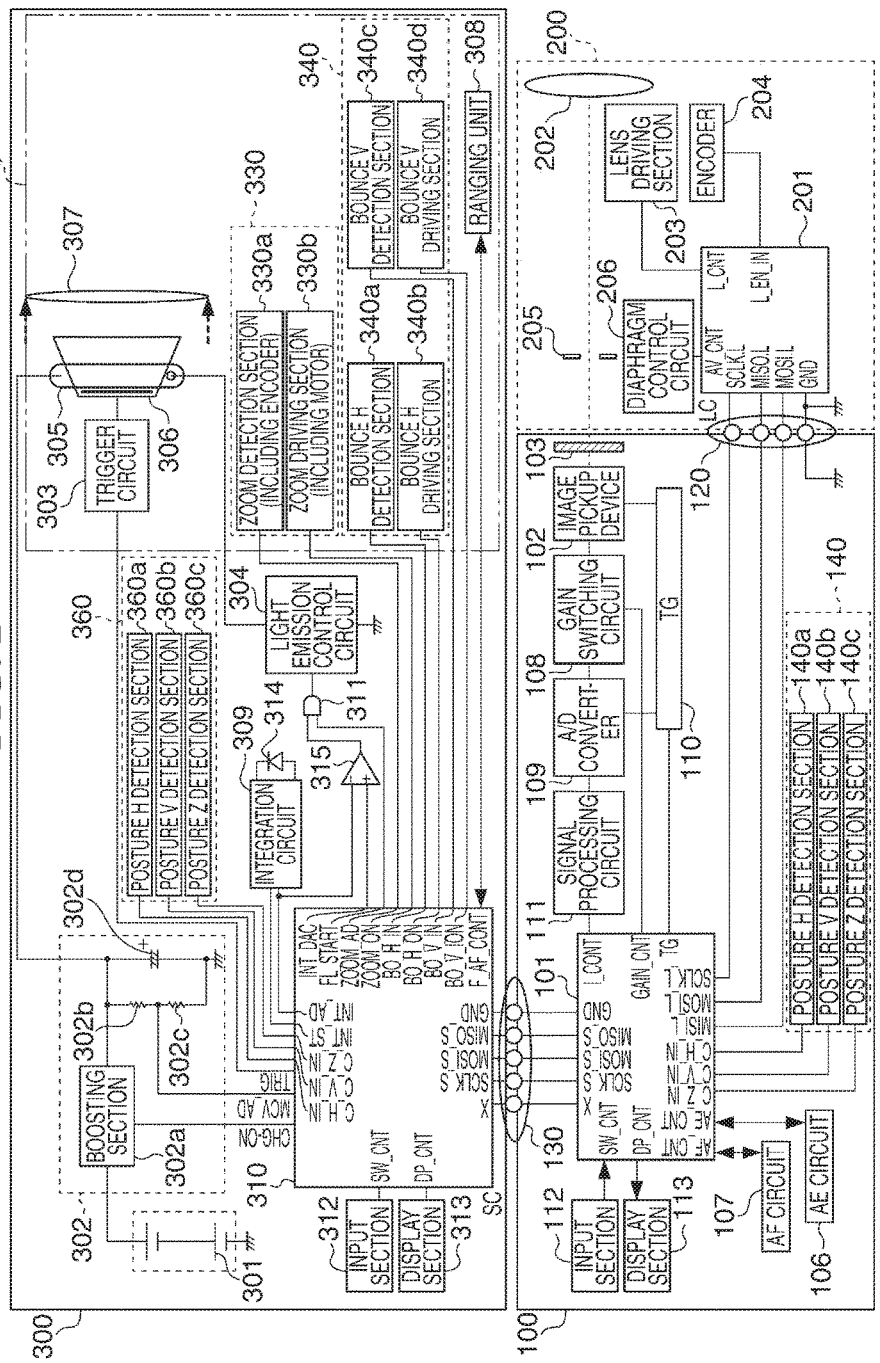
FIG. 2 is a block diagram of a control system of the image pickup system shown in FIG. 1.

FIG. 1 is a schematic side view of a digital single-lens reflex camera as a component of an image pickup system according to a first embodiment of the present invention, and a strobe device as an example of a light emission device mounted on a camera body of the digital single-lens reflex camera. FIG. 2 is a block diagram of a control system of the image pickup system shown in FIG. 1. Note that although in the present embodiment, the description is given of the digital single-lens reflex camera as an image pickup apparatus, by way of example, this is not limitative.

In the image pickup system according to the present embodiment, as shown in FIGS. 1 and 2, an interchangeable lens unit 200 is mounted on a front side (object side) of a camera body 100 of the digital single-lens reflex camera. Further, a strobe device 300 is removably mounted on the top of the camera body 100.

First, the configuration of the camera body 100 will be described. As shown in FIGS. 1 and 2, a camera controller 101 controls the overall operation of the image pickup system. The camera controller 101 is implemented by a microcomputer-incorporated one-chip IC circuit including a CPU, a ROM, a RAM, an input/output control circuit (I/O control circuit), a multiplexer, a timer circuit, an EEPROM, an analog-to-digital converter, and a digital-to-analog converter.

An image pickup device 102 is implemented by a CCD sensor or a CMOS sensor including an infrared cut filter and a low pass filter, and light passed through a lens group 202 of the lens unit 200 forms an object image on the image pickup device 102. A shutter 103 is moved between a position for shielding the image pickup device 102 from light and a position for exposing the image pickup device 102 to light.

A main mirror 104 is formed by a half mirror, and the main mirror 104 and a sub mirror 115 form a mirror unit. The mirror unit is moved into a shooting optical path during viewfinder observation, and is retracted from the shooting optical path during shooting. During viewfinder observation, part of a light flux passed through the lens group 202 is reflected by the main mirror 104, and is guided to a focusing plate 105, while light passed through the main mirror 104 is guided to a ranging sensor, not shown, of a focus detection circuit (AF circuit) 107. On the other hand, during shooting, the light flux passed through the lens group 202 is guided to the image pickup device 102 to form an image.

An object image is formed on the focusing plate 105, and the formed object image is guided to a photometric sensor, not shown, of a photometry circuit (AE circuit) 106 and an optical viewfinder, not shown, through a pentaprism 114, which enables a user to view the viewfinder image. Note that in FIG. 2, the mirror unit, the focusing plate 105, and the pentaprism 114 are omitted from illustration.

The AE circuit 106 having the photometric sensor divides the object image guided through the pentaprism 114 into a plurality of areas, and performs photometry with respect to each of the divided areas. The AF circuit 107 includes the ranging sensor having a plurality of ranging points, and outputs focus detection information, such as a defocus amount of each ranging point.

A gain switching circuit 108 amplifies electrical signals output from the image pickup device 102. The gain switching circuit 108 performs gain switching e.g. according to shooting conditions and a user's operation under the control of the camera controller 101. An analog-to-digital converter 109 converts the amplified analog signals output from the image pickup device 102 to digital signals. A timing generator (TG) 110 synchronizes timing at which the amplified analog signals are input from the image pickup device 102 and timing at which the analog signals are converted to digital signals by the analog-to-digital converter 109. A signal processing circuit 111 performs signal processing on image data obtained by converting the analog signals to the digital signals by the analog-to-digital converter 109.

A communication line SC is an interface signal line that provides an interface between the camera body 100 and the lens unit 200 and an interface between the camera body 100 and the strobe device 300. For example, data exchange and information communication, such as command transmission, are performed therebetween using the camera controller 101 as a host.

In the present embodiment, the communication line SC is implemented e.g. by a terminal 120 and a terminal 130, appearing in FIG. 2, which perform three-terminal serial communication. The terminal 120 includes an SCLK_L terminal for synchronizing communication between the camera body 100 and the lens unit 200, an MOSI_L terminal for transmitting data to the lens unit 200, and an MISO_L terminal for receiving data transmitted from the lens unit 200. Further, the terminal 120 also includes a GND terminal to which both of the camera body 100 and the lens unit 200 are connected.

The terminal 130 includes an SCLK_S terminal for synchronizing communication between the camera body 100 and the strobe device 300, an MOSI_S terminal for transmitting data from the camera body 100 to the strobe device 300, and an MISO_S terminal for receiving data transmitted from the strobe device 300. Further, the terminal 130 also includes a GND terminal to which both of the camera body 100 and the strobe device 300 are connected.

Figures 3A, 3B, 3C:
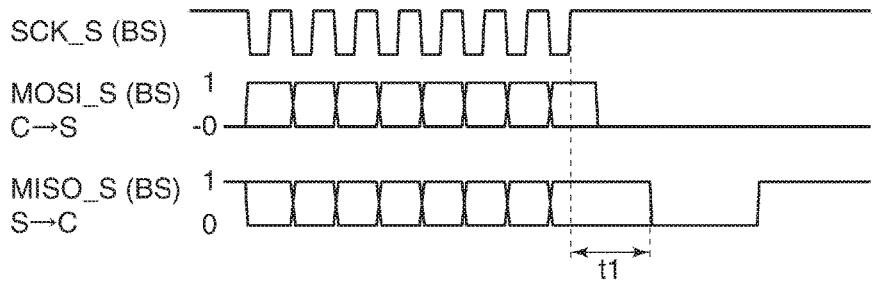

FIGS. 3A to 3E show an example of data communication using the terminal 130. FIG. 3A is a diagram showing the timing of data communication. As shown in FIG. 3A, when transmitting data from the camera controller 101 to a strobe controller 310, each bit is output as 0 or 1 from the MOSI-S terminal in synchronism with the 8-bit clock of the SCLK_S terminal to thereby serially transmit data.

Further, when transmitting data from the strobe controller 310 to the camera controller 101, the camera controller 101 serially receives the data having each bit output as 0 or 1 from the MISO_S terminal in synchronism with the 8-bit clock of the SCLK_S terminal. FIG. 3A illustrates 8-bit (1-byte) communication in which each signal is read or written in synchronism with the rise of the SCLK_S signal, and this 8-bit communication is consecutively performed a plurality of times, for a command, command data, and data, respectively.

FIGS. 3B to 3E are diagrams showing examples of data to be communicated, which is transmitted from the camera controller 101 to the strobe controller 310 according to a command list (see FIGS. 4A and 4B), described hereinafter.

For example, in the case of automatic bounce set/cancel from the camera to the strobe, 80H indicating that the transmitted command is a command of CS communication as a first byte, a command No. of 011 (OBH) as a second byte, and data (contents) of 01 (setting) as a third byte, are transmitted after being converted from hexadecimal to binary.

When the camera body 100 transmits information to the strobe device 300, as the first byte, 80H indicating a CS command is transmitted from the camera body 100 to the strobe device 300, as shown in FIG. 3B. On the other hand, when the camera body 100 acquires information from the strobe device 300, as the first byte, 01H indicating a SC command is transmitted from the camera body 100 to the strobe device 300, as shown in FIG. 3C.

As the second byte, a SC or CS command number (which is converted to a hexadecimal number when transmitted), and as the third byte or the fourth byte, setting item data is transmitted from an associated one of the camera body 100 and the strobe device 300 to the other. Communication of other information will be described as required using an example of the command lists, shown in FIGS. 4A to 5B.

An input section 112 includes a console section provided with a power button, a release button, setting buttons, and so forth, none of which are shown, and the camera controller 101 performs various processes according to inputs to the input section 112. When the release button is half pressed as a first-stage operation, a release switch SW1 is turned on to cause the camera controller 101 to start a shooting preparation operation including focusing, photometry, etc. Further, when the release button is fully pressed as a second-stage operation, a release switch SW2 is turned on to cause the camera controller 101 to start a shooting operation including exposure, development processing, etc.

Furthermore, by operating the setting buttons provided on the input section 112, it is also possible to configure various settings of the strobe device 300 mounted on the camera body 100. A display section 113 including a liquid crystal display, not shown, and a light emitting element, not shown, displays various modes set for the camera and other shooting information.

A posture detection circuit 140 is a circuit for detecting posture differences of the camera, and includes a posture H detection section 140a for detecting a posture difference in a horizontal direction, a posture V detection section 140b for detecting a posture difference in a vertical direction, and a posture Z detection section 140c for detecting a posture difference in a front-rear direction (Z direction). Note that the posture detection circuit 140 is implemented e.g. by an angular velocity sensor or a gyro sensor, and posture information on the posture difference of the camera in each direction, detected by the posture detection circuit 140, is output to the camera controller 101.

Next, the lens unit 200 will be described. A lens controller 201 controls the respective components of the lens unit 200. The lens controller 201 is implemented e.g. by a microcomputer-incorporated one-chip IC circuit which includes a CPU, a ROM, a RAM, an input/output control circuit (I/O control circuit), a multiplexer, a timer circuit, an EEPROM, an analog-to-digital converter, and a digital-to-analog converter.

The lens group 202 is formed by a plurality of lenses including a focus lens, a zoom lens, and so forth. Note that the lens group 202 is not necessarily required to include a zoom lens. A lens driving section 203 drives the lenses included in the lens group 202. A driving amount of the lens group 202 is calculated by the camera controller 101 based on an output from the AF circuit 107 of the camera body 100, and the calculated driving amount is transmitted from the camera controller 101 to the lens controller 201.

An encoder 204 detects a position of the lens group 202, and outputs driving information to the lens controller 201. The lens controller 201 controls the lens driving section 203 according to the driving information output from the encoder 204 to move the lens group 202 by the driving amount in a direction of an optical axis to perform focusing. A diaphragm 205 is controlled by the lens controller 201 via a diaphragm control circuit 206 to adjust an amount of light passing through the lens group 202.

Next, the strobe device 300 will be described. The strobe device 300 includes a strobe body 300a removably mounted on the camera body 100, and a movable unit 300b held on the strobe body 300a in a manner rotatable in the vertical direction and a lateral direction with respect to the strobe body 300a. Note that in the present embodiment, the direction of rotation of the movable unit 300b is defined assuming that a portion of the strobe body 300a on which the movable unit 300b is mounted is an upper portion. The strobe body 300a corresponds to an example of an apparatus body of the present invention.

The strobe controller 310 controls the respective components of the strobe device 300. The strobe controller 310 is implemented e.g. by a microcomputer-incorporated one-chip IC circuit which includes a CPU, a ROM, a RAM, an input/output control circuit (I/O control circuit), a multiplexer, a timer circuit, an EEPROM, an analog-to-digital converter, and a digital-to-analog converter.

A battery 301 functions as a power supply (VBAT) for the strobe device 300. A boosting circuit block 302 includes a boosting section 302a, resistors 302b and 302c used for detecting voltage, and a main capacitor 302d. The boosting circuit block 302 boosts the voltage of the battery 301 up to several hundred volts by the boosting section 302a, to thereby charge electric energy for light emission in the main capacitor 302d. The charge voltage of the main capacitor 302d is divided by the resistors 302b and 302c, and the divided voltage is input to an analog-to-digital conversion terminal of the strobe controller 310.

A trigger circuit 303 applies pulse voltage for exciting a discharge tube 305 to the discharge tube 305. A light emission control circuit 304 controls the start and stop of light emission from the discharge tube 305. The discharge tube 305 is excited by receiving pulse voltage of several kilovolts applied from the trigger circuit 303, and emits light using an electric energy charged in the main capacitor 302d.

A ranging unit 308 detects a distance to an object or a target object (a ceiling or the like), and includes e.g. a light receiving sensor. The ranging unit 308 receives light irradiated from the discharge tube 305 and reflected by the object or target object using the light receiving sensor, to thereby detect the distance to the object or target object. Alternatively, the ranging unit 308 further includes a ranging light source, and receives light irradiated from the ranging light source and reflected by the object or target object using the light receiving sensor, to thereby detect a distance to the object or target object.

An integration circuit 309 integrates the electric current output from a photodiode 314, which corresponds to the amount of received light, and outputs a result of the integration to an inverting input terminal of a comparator 315 and an analog-to-digital conversion terminal of the strobe controller 310. A non-inverting input terminal of the comparator 315 is connected to a digital-to-analog conversion terminal of the strobe controller 310, and an output terminal of the comparator 315 is connected to one of input terminals of an AND gate 311.

The other of the input terminals of the AND gate 311 is connected to a light emission control terminal of the strobe controller 310, and an output from the AND gate 311 is input to the light emission control circuit 304. The photodiode 314 is a sensor for receiving light emitted from the discharge tube 305, and receives light emitted from the discharge tube 305 directly or via a glass fiber or the like.

A reflection umbrella 306 reflects light emitted from the discharge tube 305, and guides the light in a predetermined direction. A zoom optical system 307 includes an optical panel, etc., and is held in such a manner that a position relative to the discharge tube 305 can be changed. By changing a relative position between the zoom optical system 307 and the discharge tube 305, it is possible to change a guide number and the irradiation range of the strobe device 300.

An input section 312 includes a console section comprised of a power button, a mode setting switch for setting an operation mode of the strobe device 300, and setting buttons for setting various parameters, none of which are shown, and the strobe controller 310 performs various processes in response to inputs to the input section 312. A display section 313 includes a liquid crystal device and a light emitting element, neither of which is shown, and displays information indicative of the states of the strobe device 300.

A zoom drive circuit 330 includes a zoom detection section 330a that detects information on the relative position between the discharge tube 305 and the zoom optical system 307 by an encoder, not shown, thereof, and so forth, and a zoom driving section 330b that includes a motor, not shown, for moving the zoom optical system 307. The strobe controller 310 acquires focal length information output from the lens controller 201 via the camera controller 101, and calculates a driving amount of the zoom optical system 307 based on the acquired focal length information.

A bounce circuit 340 includes a bounce H detection section 340a that detects a driving amount (rotational angle) of the movable unit 300b in the lateral direction with respect to the strobe body 300a, and a bounce V detection section 340c that detects a driving amount of the movable unit 300b in the vertical direction with respect to the strobe body 300a. The driving amounts of the movable unit 300b in the lateral direction and the vertical direction are each detected using a rotary encoder or an absolute encoder, not shown. Further, the bounce circuit 340 includes a bounce H driving section 340b that drives the movable unit 300b in the lateral direction, and a bounce V driving section 340d that drives the movable unit 300b in the vertical direction. The bounce V driving section 340d corresponds to an example of a first drive unit of the present invention, and the bounce H driving section 340b corresponds to an example of a second drive unit of the present invention.

A posture detection circuit 360 is a circuit for detecting posture differences of the strobe device 300, and includes a posture H detection section 360a that detects a posture difference in the horizontal direction, a posture V detection section 360b that detects a posture difference in the vertical direction, and a posture Z detection section 360c that detects a posture difference in the front-rear direction (Z direction). The posture detection circuit 360 is implemented e.g. by an angular velocity sensor or a gyro sensor.

The light emission section of the strobe device 300 is formed by the discharge tube 305, the reflection umbrella 306, and the zoom optical system 307. The irradiation range of the light emission section is changed by the movement of the zoom optical system 307, and the direction of irradiating light from the light emission section is changed by the rotation of the movable unit 300b in the vertical direction and the lateral direction.

Next, a description will be given of an example of detection of a range of the rotation and the driving amount of the movable unit 300b of the strobe device 300 with reference to FIGS. 6A to 8B.

Figure 6A:
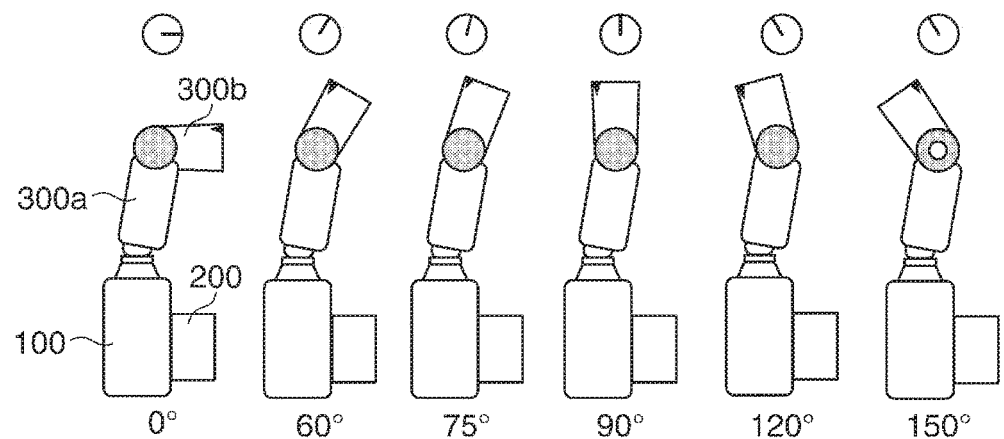
FIGS. 6A and 6B are diagrams useful in explaining rotational operations of a movable unit in a vertical direction and a lateral direction.
Figure 6B:
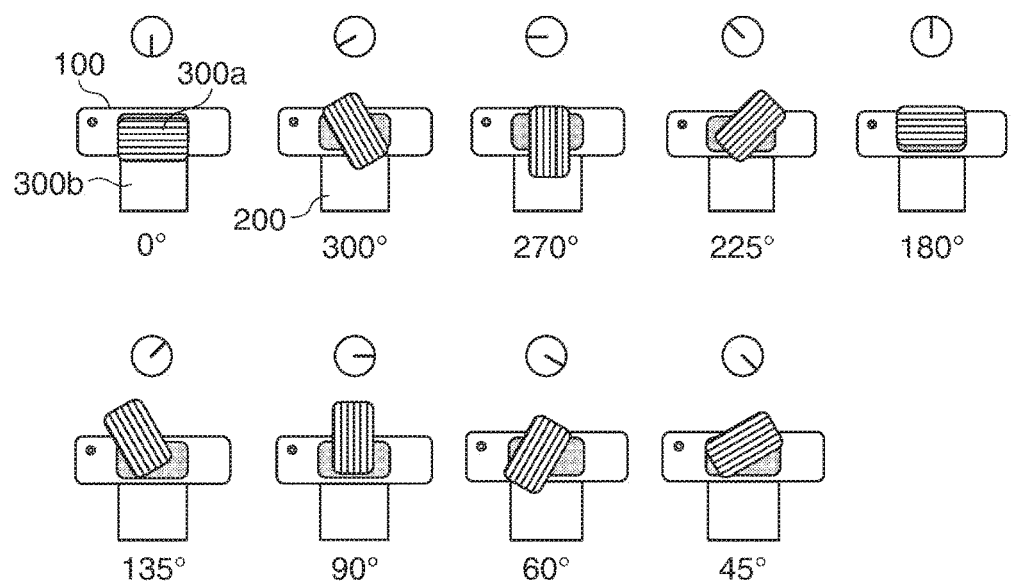

FIGS. 6A and 6B are diagrams useful in explaining rotational operations of the movable unit 300b in the vertical direction and the lateral direction. FIGS. 7A to 7D are diagrams showing outputs from the rotary encoders when the movable unit 300b is rotated in the vertical direction and the lateral direction. FIGS. 8A and 8B are diagrams showing rotational angles of the movable unit 300b and Gray codes of the rotary encoders assigned thereto.

As shown in FIG. 6A, the movable unit 300b is supported on the strobe body 300a in a manner rotatable about a first axis in the vertical direction (first direction) with respect to the strobe body 300a. Further, as shown in FIG. 6B, the movable unit 300b is supported on the strobe body 300a in a manner rotatable about a second axis in the lateral direction (second direction substantially orthogonal to the first direction) with respect to the strobe body 300a.

Note that a reference position of the movable unit 300b is set to a 0-degree state of the position of the movable unit 300b in the vertical direction, out of states shown in FIG. 6A, and at the same time to a 0-degree state of the position of the movable unit 300b in the lateral direction, out of states shown in FIG. 6B. In this state, the light emission section of the movable unit 300b is oriented to the front side (toward an object). Further, by rotating the movable unit 300b in the vertical direction through 30 degrees, and then rotating the same through 180 degrees in the lateral direction, the movable unit 300b is positioned at the rotational angle of 150 degrees in the vertical direction. An indicator, which is expressed in a circle and a line, appearing in each of the states in FIGS. 6A and 6B, corresponds to a position of an associated one of the rotary encoders, shown in FIGS. 7A to 7D.

Figure 7A:
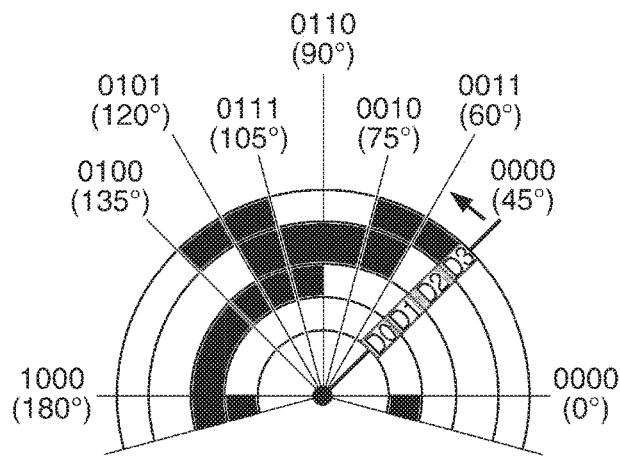
FIGS. 7A to 7D are diagrams showing outputs from rotary encoders when the movable unit is rotated in the vertical direction and the lateral direction.
Figure 7B:
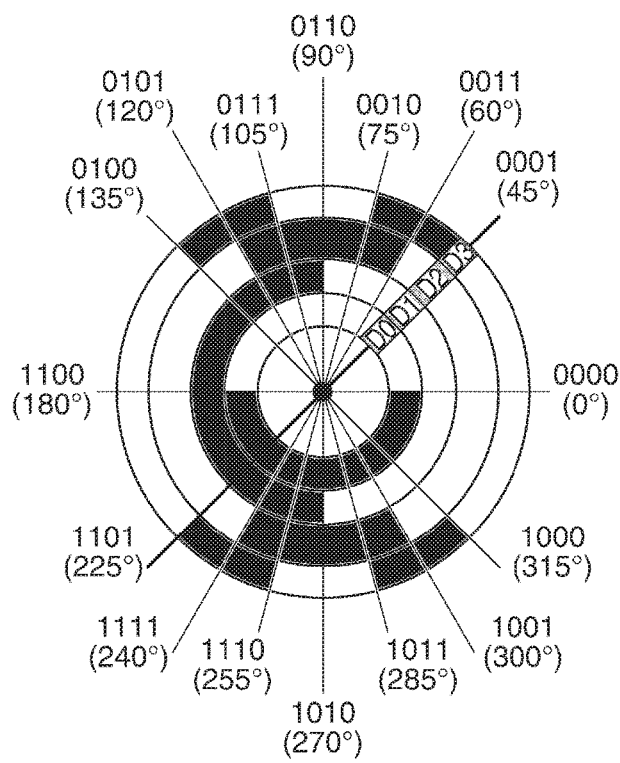
Figure 7C:
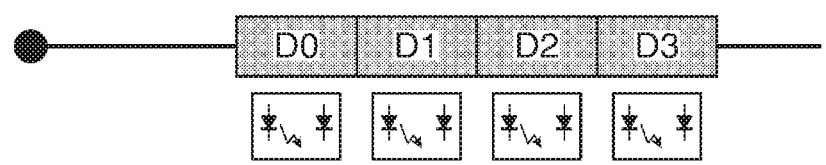
Figure 7D:
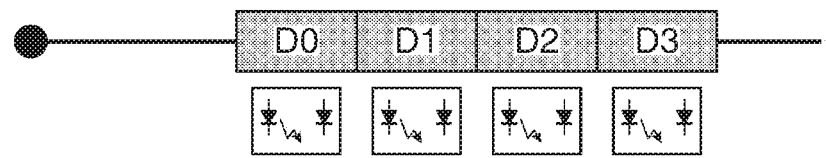

FIGS. 7A and 7C show a configuration for detecting the rotational angle of the movable unit 300b in the vertical direction, using the rotary encoder which uses a 4-bit Gray code. Further, FIGS. 7B and 7D show a configuration for detecting the rotational angle of the movable unit 300b in the lateral direction, using the rotary encoder which uses the 4-bit Gray code.

As each of detecting sections of the rotary encoder for detecting the rotation of the movable unit 300b in the vertical direction and the rotary encoder for detecting the rotation of the movable unit 300b in the lateral direction, a photo reflector or a photo interrupter is used. In the present embodiment, the rotary encoders output 0 when the rotational angles of the movable unit 300b in the vertical direction and the lateral direction correspond to white portions appearing in FIGS. 7A and 7B, respectively, and output 1 when the same correspond to black portions appearing in FIGS. 7A and 7B, respectively. Further, rotation of the movable unit 300b is determined from a rise of change in bits, and pattern data is read in when the movable unit 300b is stopped.

As shown in FIGS. 7A to 7D, and 8A and 8B, the rotary encoder outputs detection signals different from each other according to the rotational angles of the movable unit 300*b*. This enables the bounce H detection section 340*a* and the bounce V detection section 340*c* to detect driving amounts of the movable unit 300*b*.

Figure 10:
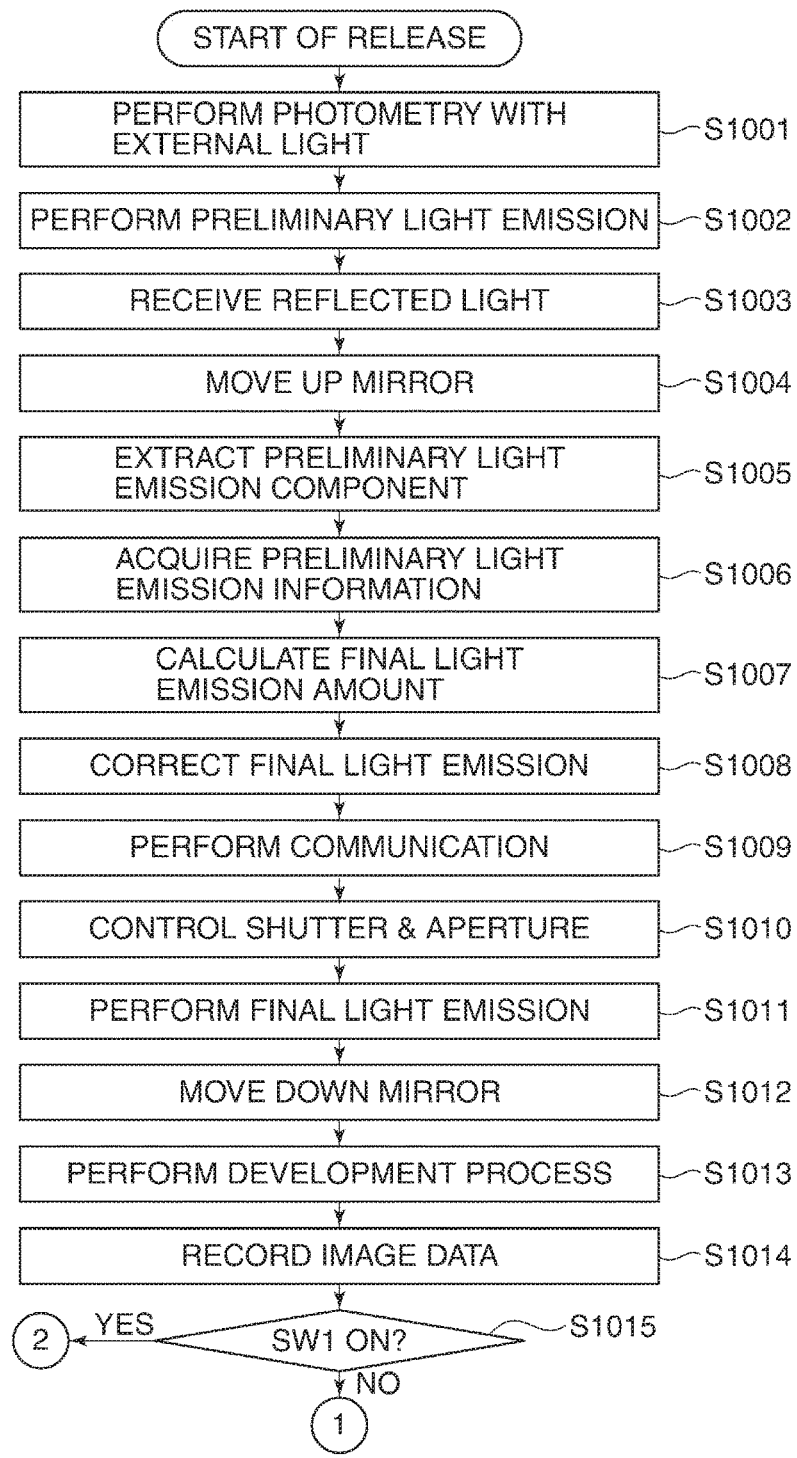
FIG. 10 is a flowchart of a shooting process after release, which is performed by the camera body in automatic bounce flash shooting.

Next, a description will be given of a shooting preparation process and a shooting process which are performed by the camera body 100 in automatic bounce flash shooting with reference to FIGS. 9 and 10. The shooting preparation process and the shooting process shown in FIGS. 9 and 10 are executed e.g. by the CPU that loads programs stored e.g. in the ROM of the camera controller 101 into the RAM.

Referring to FIG. 9, in a step S901, when the power button is turned on, the camera controller 101 initializes the built-in memory (RAM) and ports thereof. Further, the camera controller 101 reads the states of the various switches and input information set in advance to thereby make various settings of a shooting mode including a shutter speed determination method and an aperture determination method, and then proceeds to a step S902.

In the step S902, when the release button is half-pressed to turn on the release switch SW1, the camera controller 101 proceeds to a step S903. In the step S903, the camera controller 101 performs communication with the lens controller 201 of the lens unit 200 via the communication line SC to acquire focal length information and optical information required for focusing and photometry, and then proceeds to a step S904.

In the step S904, the camera controller 101 determines whether or not the strobe device 300 is mounted on the camera body 100, and if the strobe device 300 is mounted on the camera body 100, the camera controller 101 proceeds to a step S905, whereas if not, the camera controller 101 proceeds to a step S916.

In the step S905, the camera controller 101 performs communication with the strobe controller 310 of the strobe device 300 via the communication line SC, and acquires strobe information, such as a strobe ID and charge information indicative of the charged state of the main capacitor 302*d*, from the strobe controller 310. Further, the camera controller 101 performs communication with the strobe controller 310 via the communication line SC, and transmits the focal length information acquired in the step S903 to the strobe controller 310, and then proceeds to a step S906.

With this, the strobe controller 310 calculates the driving amount of the zoom optical system 307 based on the received focal length information, and moves the zoom optical system 307 based on the calculated driving amount, to thereby change the irradiation range of the strobe device 300 to a range adjusted to the focal length.

In the step S906, the camera controller 101 prepares to transmit the information on the strobe device 300 input via the input section 112 to the strobe controller 310, and then proceeds to a step S907. Here, the camera controller 101 judges the information on the strobe device 300 input via the input section 112, and converts the information to a command transmission format. The information transmission preparation process executed in the step S906 will be described hereinafter with reference to FIG. 11.

In the step S907, the camera controller 101 transmits the information on the strobe device 300 prepared in the step S906 to the strobe controller 310, and then proceeds to a step 908. The information transmission process executed in the step S907 will be described hereinafter with reference to FIG. 12.

In the step S908, the camera controller 101 determines whether or not a set focusing mode is an automatic focusing (AF) mode. If the set focusing mode is the automatic focusing (AF) mode, the camera controller 101 proceeds to a step S909, and if the set focusing mode is a manual focusing (MF) mode, the camera controller 101 proceeds to a step S911.

In the step S909, the camera controller 101 drives the AF circuit 107 to perform a focus detection operation by a phase difference detection method. Further, the camera controller 101 determines a ranging point to which the lens group 202 is to be focused in the focusing, from a plurality of ranging points, based on a known automatic selection algorithm or according to a user's operation on the input section 112, and then proceeds to a step S910.

In the step S910, the camera controller 101 stores the ranging points determined in the step S909 in the RAM, and further, calculates the driving amount of the lens group 202 based on focus detection information obtained from the AF circuit 107. Then, the camera controller 101 performs communication with the lens controller 201 of the lens unit 200 via the communication line SC, moves the lens group 202 in the optical axis direction based on the calculated driving amount, and then proceeds to a step S911.

In the step S911, the camera controller 101 determines whether or not to perform an operation for automatically determining an irradiating direction in bounce flash shooting (hereinafter referred to as the automatic bounce operation). Note that whether or not to perform the automatic bounce operation is determined based on the state of a switch for setting whether or not to perform the automatic bounce operation, which is provided in the input section 112 of the camera body 100 or the input section 312 of the strobe device 300, and other states of the camera body 100. Then, if the automatic bounce operation is to be performed, the camera controller 101 proceeds to a step S912, whereas if the automatic bounce operation is not to be performed, the camera controller 101 proceeds to a step S919.

In the step S912, the camera controller 101 performs processing associated with an automatic bounce operation (hereinafter referred to as the "automatic bounce process"), and then proceeds to a step S913. The automatic bounce process will be described hereinafter with reference to FIG. 13. In the step S913, the camera controller 101 determines whether or not there has occurred an error in the automatic bounce process. Then, if there has occurred an error in the automatic bounce process, the camera controller 101 proceeds to a step S914, whereas if not, the camera controller 101 proceeds to the step S919. Note that if there has occurred an error in the automatic bounce process, information indicative of occurrence of the error in the automatic bounce process is transmitted from the strobe controller 310 in the automatic bounce process in the step S912.

In the step S914, the camera controller 101 gives a warning by displaying information indicative of occurrence of the error in the automatic bounce process on the display section 113, and then proceeds to a step S915. Note that in this case, the camera controller 101 may perform communication with the strobe controller 310, and the information indicative of occurrence of the error in the automatic bounce process may be displayed on the display section 313 of the strobe device 300 by the strobe controller 310. In the step S915, the camera controller 101 switches to the setting of not performing light emission shooting (no flash setting), and then proceeds to the step S919.

On the other hand, in the step S916, the camera controller 101 determines whether or not the currently set focusing mode is the AF mode, and if the currently set focusing mode is the AF mode, the camera controller 101 proceeds to a step S917, and if the currently set focusing mode is the MF mode, the camera controller 101 proceeds to the step S919. In the step S917, the camera controller 101 executes the same processing as in the step S909, and then proceeds to a step S918. In the step S918, the camera controller 101 executes the same processing as in the step S910, and then proceeds to the step S919.

In the step S919, the camera controller 101 performs photometry using the AE circuit 106, acquires results of the photometry, and then proceeds to a step S920. In the step S919, for example, in a case where the photometric sensor of the AE circuit 106 performs photometry in each of six areas formed by dividing a shooting range, the camera controller 101 stores luminance values of the respective areas as results of the photometry, i.e. as EVb(i) (i=0 to 5) in the RAM.

In the step S920, the camera controller 101 performs gain switching by the gain switching circuit 108 according to a gain setting input from the input section 112. Note that the gain setting is an ISO sensitivity setting, for example. Further, the camera controller 101 performs communication with the strobe controller 310 via the communication line SC, to thereby transmit gain setting information indicative of a switched gain, for example, to the strobe controller 310, and then proceeds to a step S921.

In the step S921, the camera controller 101 performs exposure calculation using a known algorithm based on the results of the photometry acquired in the step S919 (the luminance values of the respective areas stored in the RAM) to thereby determine an exposure value (EVs), and then proceeds to a step S922. In the step S922, the camera controller 101 determines whether or not a charging completion signal has been received from the strobe controller 310, and if the charging completion signal has been received, the camera controller 101 proceeds to a step S923, whereas if not, the camera controller 101 proceeds to a step S924.

In the step S923, the camera controller 101 determines exposure control values (a shutter speed (Tv) and an aperture value (Av)) suitable for flash shooting, based on the exposure value calculated in the step S921, and then proceeds to a step S925. On the other hand, in the step S924, the camera controller 101 determines exposure control values suitable for shooting in which the strobe device 300 is inhibited from emitting light (no flash shooting), based on the exposure value calculated in the step S921, and then proceeds to the step S925.

In the step S925, the camera controller 101 determines whether or not the release switch is fully pressed to turn on the release switch SW2, and if the release switch SW2 is turned on, the camera controller 101 proceeds to a step S1001 in a shooting process in FIG. 10, whereas if the release switch SW2 is not turned on, the camera controller 101 returns to the step S902.

In the shooting process in FIG. 10, in the step S1001, the camera controller 101 performs photometry using the AE circuit 106, in a state in which the strobe device 300 is not emitting light, to thereby acquires results of the photometry determined when light is not emitted (no flashing luminance values), and then proceeds to a step S1002. At this time, the camera controller 101 stores the no flashing luminance values of the respective areas obtained by the photometry, as EVa(i) (i=0 to 5) in the RAM.

In the step S1002, the camera controller 101 sends a preliminary light emission command to the strobe controller 310, via the communication line SC, and then proceeds to a step S1003. In response to the preliminary light emission command, the strobe controller 310 controls the trigger circuit 303 and the light emission control circuit 304 to perform preliminary light emission with a predetermined amount of light.

In the step S1003, the camera controller 101 performs photometry of light including reflected light using the AE circuit 106 in a state in which the strobe device 300 is performing preliminary light emission, to thereby acquire results of the photometry at the time of preliminary light emission (preliminary light emission luminance values), and then proceeds to a step S1004. At this time, the camera controller 101 stores the preliminary light emission luminance values of the respective areas obtained by the photometry, as EVf(i) (i=0 to 5) in the RAM.

In the step S1004, the camera controller 101 moves up the mirror unit before executing exposure to cause the mirror unit to be retracted from the shooting optical path, and then proceeds to a step S1005. In the step S1005, the camera controller 101 extracts a luminance value EVdf(i) of only a reflected light component of the preliminary light emission based on the no flashing luminance values Eva(i) and the preliminary light emission luminance values EVf(i) using the following formula (1):

$$EVdf(i) \leftarrow (LN2(2^{\wedge}EVf(i) - 2^{\wedge}EVa(i))) \ (i=0 \text{ to } 5) \qquad (1)$$

and then proceeds to a step S1006. Note that the extraction is performed on each of the six areas.

In the step S1006, the camera controller 101 acquires preliminary light emission information (Qpre) indicative of the amount of light emitted at the preliminary light emission time from the strobe controller 310 via the communication line SC, and then proceeds to a step S1007. In the step S1007, based on the ranging point, the focal length information, the preliminary light emission information (Qpre), and bounce communication information, the camera controller 101 selects one of the six areas which includes an object toward which an appropriate amount of light is to be emitted, calculates a final light emission amount, and then proceeds to a step S1008.

In calculating the final light emission amount, the camera controller 101 determines, with respect to the object in the selected area (P), a relative ratio (r) of an appropriate final light emission amount to the preliminary light emission amount, based on the exposure value (EVs), the object luminance value (EVb), and a luminance value EVdf(p) of only reflected light component of the preliminary light emission, using the following format (2):

$$r \leftarrow LN2(2^{\wedge}EVs - 2^{\wedge}EVb(p)) - EVdf(p) \qquad (2)$$

Here, a difference between the exposure value (EVs) and a decompressed object luminance value (EVb) is calculated in order to control strobe light such that addition of the strobe light to external light makes the exposure at the time of strobe light emission appropriate.

In the step S1008, the camera controller 101 corrects the relative ratio (r) using a shutter speed (Tv) at the flash shooting, a light emission time period (t_pre) of the preliminary light emission, and a correction coefficient C set by the input section 112 in advance by the following formula (3):

$$r \leftarrow r + Tv - t\_pre + c \qquad (3)$$

and, the camera controller 101 calculates a new relative ratio r, and then proceeds to a step S1009.

Here, the correction is performed using the shutter speed (Tv) and the light emission time period (t_pre) of the preliminary light emission in order to properly compare a photometric integrated value (INTp) in the preliminary light emission and a photometric integrated value (INTm) in the final light emission.

In the step S1009, the camera controller 101 transmits information on the relative ratio (r) for determining the final light emission amount to the strobe controller 310 via the communication line SC, and then proceeds to a step S1010. In the step S1010, the camera controller 101 sends a command to the lens controller 201 such that the diaphragm 205 is controlled to the aperture value (Av) determined in the step S923 in the shooting preparation process in FIG. 9, and controls the shutter 103 to operate at the shutter speed (Tv) determined in the step S923, and then proceeds to a step S1011.

In the step S1011, the camera controller 101 sends a command to the strobe controller 310 via the communication line SC for performing final light emission, and then proceeds to a step S1012. At this time, in response to the command, the strobe controller 310 performs the final light emission based on the relative ratio (r) transmitted from the camera controller 101 in the step S1009.

In the step S1012, the camera controller 101 moves down the mirror unit to cause the same to enter into the shooting optical path, and then proceeds to a step S1013. In the step S1013, the camera controller 101 amplifies the signals output from the image pickup device 102 by the gain set by the gain switching circuit 108, and converts the amplified signals to digital signals by the analog-to-digital converter 109. Then, the camera controller 101 causes the signal processing circuit 111 to perform predetermined signal processing including white balance processing, on image data obtained by conversion to the digital signals, and then proceeds to a step S1014.

In the step S1014, the camera controller 101 records the image data having been subjected to the signal processing in the step S1013 in the built-in memory thereof, terminates a series of processing concerning shooting, and then proceeds to a step S1015. In the step S1015, the camera controller 101 determines whether or not the release button is half pressed to turn on the release switch SW1, and if the release switch SW1 is turned on, the camera controller 101 proceeds to the step S925 in the shooting preparation process in FIG. 9, whereas if the release switch SW1 remains off, the camera controller 101 proceeds to the step S902 in the shooting preparation process in FIG. 9.

Note that FIG. 10 shows the flowchart of the shooting process performed when flash shooting is performed, and in the shooting process performed when no flash shooting is performed, the processing for performing final light emission is omitted from the step S1001 et seq.

Next, a description will be given of the information transmission preparation process executed in the step S906 in the shooting preparation process in FIG. 9 with reference to FIG. 11. Note that details of setting commands used in the information transmission preparation process in FIG. 11 are shown in FIGS. 4A to 5B.

Referring to FIG. 11, the camera controller 101 determines whether or not the camera is a camera capable of performing the automatic bounce operation (automatic bounce-compatible camera), and if the camera is an automatic bounce-compatible camera, the camera controller 101 proceeds to a step S1102, whereas if not, the camera controller 101 proceeds to a step S1103.

In the step S1102, the camera controller 101 stores "CS001 command: 01" in the built-in memory thereof in preparation for camera-strobe communication (C→S), and then proceeds to a step S1104. On the other hand, in the step S1103, the camera controller 101 stores "CS001 command: 00" in the built-in memory thereof in preparation for the camera-strobe communication (C→S), and then proceeds to the step S1104.

In the step S1104, the camera controller 101 determines whether or not execution of the automatic bounce operation is set, and if execution of the automatic bounce operation is set, the camera controller 101 proceeds to a step S1105, whereas if execution of the automatic bounce operation is not set, the camera controller 101 proceeds to a step S1106.

In the step S1105, the camera controller 101 stores "CS011 command: 01" in the built-in memory thereof in preparation for the camera-strobe communication (C→S), and then proceeds to a step S1107. On the other hand, in the step S1106, the camera controller 101 stores "CS011 command: 00" in the built-in memory thereof in preparation for the camera-strobe communication (C→S), and then proceeds to the step S1107.

In the step S1107, the camera controller 101 determines whether or not a method (ranging method) for determining a distance to an object or a target object, which is information for determining an optimum irradiating direction for the bounce flash shooting, is set in the camera body 100. If the ranging method is set, the camera controller 101 proceeds to a step 1108, whereas if not, the camera controller 101 proceeds to a step S1109.

As the ranging method, there may be mentioned e.g. a so-called preliminary light emission method which performs preliminary light emission toward an object or a target object, and measures a distance to the object or the target object by the amount of light reflected therefrom. Further, there is a so-called strobe ranging method which measures a distance to an object or a target object, using the ranging unit 308 provided in the strobe device 300. Besides, there is a so-called camera ranging method which measures a distance to an object or a target object using a result of focusing by the camera body 100 and the lens unit 200. The ranging method is not particularly limited.

In the step S1108, the camera controller 101 stores a CS091 command in the built-in memory thereof according to the setting of the ranging method in preparation for the camera-strobe communication (C→S), and then proceeds to the step S1109.

For example, the camera controller 101 assigns a distinction between "object" and "ceiling" to most significant 4 bits, with "object" set to 0 and "ceiling" set to 1. Further, the camera controller 101 assigns a distinction between "preliminary light emission", "strobe ranging", and "camera ranging" to least significant 4 bits, with "preliminary light emission" set to 0, "strobe ranging" set to 1, and "camera ranging" set to 2. Assuming that the object and the ceiling are both set to "preliminary light emission", "CS091 command: data 00 10" is stored in the built-in memory of the camera controller 101.

Similarly, assuming that the object and the ceiling are both set to "strobe ranging", "CS091 command: data 01 11" is stored in built-in memory of the camera controller 101. Further, assuming that the object is set to "camera ranging", and the ceiling is set to "preliminary light emission", "CS091 command: data 02 10" is stored in the built-in memory of the camera controller 101.

In the step S1109, the camera controller 101 determines the states of the release switches SW1 and SW2, and if the release switches SW1 and SW2 are both off, the camera controller 101 proceeds to a step 1110, if the release switch SW1 is on, the camera controller 101 proceeds to a step

1111, or if the release switch SW2 is on, the camera controller 101 proceeds to a step 1112.

In the step S1110, the camera controller 101 stores "CS151 command: data 00" in the built-in memory thereof, and then proceeds to a step S1113. In the step S1111, the camera controller 101 stores "CS151 command: data 01" in the built-in memory thereof, and then proceeds to the step S1113. In the step S1112, the camera controller 101 stores "CS151 command: data 02" in the built-in memory thereof, and then proceeds to the step S1113.

Here, a description will be given of limitation of the bounce angle. In the present example, a switch for setting limitation of the bounce angle in the rotational operation of the movable unit 300b about the first axis in the vertical direction (vertical bounce) with respect to the strobe body 300a is set in advance. Alternatively, vertical bounce angle limitation information is input and stored in the EEPROM of the camera controller 101. Processing for storing the vertical bounce angle limitation information may be performed not only by the camera controller 101, but also by the strobe controller 310. Further, the vertical bounce angle limitation information may be stored in the EEPROM of the strobe controller 310 via communication from the camera controller 101.

For example, the vertical bounce angle limitation information (bounce angle limitation information) is set to "0: 90°, 1: 120°, 2: 150°", and stored. Further, a limit angle of rotation of the movable unit 300b about the first axis in the vertical direction is set to 120° due to restrictions of its mechanism. Here, it is unnecessary to rotate the movable unit 300b about the second axis in the lateral direction (lateral bounce) up to the limit rotational angle 120° of the movable unit 300b about the first axis in the vertical direction as the optimum bounce angle. Further, when the optimum bounce angle exceeds the limit rotational angle 120° of the movable unit 300b in the vertical direction, the camera controller 101 determines whether or not to rotate the movable unit 300b about the second axis in the lateral direction.

In the step S1113, the camera controller 101 determines which one of 0: 90, 1: 120°, and 2:150° is recorded in the EEPROM as the bounce angle limitation information, and determines a switching bounce angle. The switching bounce angle determined in this step is an angle of rotation of the movable unit 300b about the first axis in the vertical direction at which the rotational operation of the movable unit 300b is switched from the rotation about the first axis (in the vertical direction) to the rotation about the second axis (in the lateral direction). Then, when the bounce angle limitation information is set to 0: 90°, the camera controller 101 proceeds to a step S1114, when the bounce angle limitation information is set to 1: 120°, the camera controller 101 proceeds to a step S1115, and when the bounce angle limitation information is set to 2: 150°, the camera controller 101 proceeds to a step S1116.

In the step S1114, the camera controller 101 stores "CS221 command: data 03" in the built-in memory thereof in preparation for the camera-strobe communication (C→S), and then proceeds to a step S1117. In the step S1114, since the bounce angle limitation information is set to "0: 90°", the switching bounce angle setting is set to "inhibited", thereby inhibiting switching of the rotation of the movable unit 300b from the rotation about the first axis in the vertical direction to the rotation about the second axis in the lateral direction (see the command lists in FIGS. 4A to 5B).

In the step S1115, the camera controller 101 stores the "CS221 command: data 03" in the built-in memory thereof in preparation for the camera-strobe communication (C→S), and then proceeds to the step S1117. In the step S1115, since the bounce angle limitation information is set to 1: 120°, similarly to the step S1114, the switching bounce angle setting is set to "inhibited", thereby inhibiting switching of the rotation of the movable unit 300b from the rotation about the first axis in the vertical direction to the rotation about the second axis in the lateral direction.

In the step S1116, the camera controller 101 stores "CS221 command: data 01" in the built-in memory thereof in preparation for the camera-strobe communication (C→S), and then proceeds to the step S1117. Here, since the bounce angle limitation information is set to 1: 150°, the switching bounce angle is set to 120°, whereby when the angle of the rotation of the movable unit 300b about the first axis in the vertical direction reaches 120°, the rotation of the movable unit 300b is switched to the rotation about the second axis in the lateral direction.

In the step S1117, the camera controller 101 stores a camera ID, sensor information, and other strobe setting information in the built-in memory thereof, and then proceeds to the step S907 in the shooting preparation process in FIG. 9. Examples of the other strobe setting information include information indicative of whether or not the camera is performing live view image shooting. In this case, the camera controller 101 stores "CS231 command: data XX" in the built-in memory thereof in preparation for the camera-strobe communication (C→S). Here, the data XX: 00 indicates the use of the viewfinder, and the data XX: 01 indicates the use of the live view.

Further, the examples of the other strobe setting information include information indicative of whether or not the display section 113 of the camera is performing a variable angle operation. In this case, the camera controller 101 stores "CS241 command: data XX" in the built-in memory thereof in preparation for the camera-strobe communication (C→S). Here, the data XX: 00 represents "not-in-use" (the variable angle operation is not being performed), and the data XX: 01 represents "in-use" (the variable angle operation is being performed).

Next, a description will be given of the information transmission process executed in the step S907 in the shooting preparation process in FIG. 9 with reference to FIG. 12. Note that the details of setting commands used here are shown in FIGS. 4A to 5B. Further, in each related processing in FIG. 12, serial communication of the camera-strobe communication shown in FIGS. 3A to 3E is used. Further, in FIG. 12, steps S1201 to S1209 are executed by the camera body 100, and steps S1210 and S1211 are executed by the strobe device 300.

First, the information transmission process performed by the camera body 100 will be described. Referring to FIG. 12, in the step S1201, the camera controller 101 transmits the data set according to the result of the determination in the step S1101 in the information transmission preparation process in FIG. 11 to the strobe controller 310, and then proceeds to a step S1202. In the step S1202, the camera controller 101 transmits the data set according to the result of the determination in the step S1104 in the information transmission preparation process in FIG. 11 to the strobe controller 310, and then proceeds to a step S1203.

In the step S1203, the camera controller 101 transmits the data set according to the result of the determination in the step S1107 in the information transmission preparation process in FIG. 11 to the strobe controller 310, and then proceeds to a step S1204. In the step S1204, the camera controller 101 transmits the data set according to the result of the determination in the step S1109 in the information transmission preparation process in FIG. 11 to the strobe controller 310, and then proceeds to a step S1205.

In the step S1205, the camera controller 101 transmits the bounce angle limitation information set according to one of the steps S1114 to S1116, which is the result of the determination in the step S1113 in the information transmission preparation process in FIG. 11, to the strobe controller 310, and then proceeds to a step S1206. In the step S1206, the camera controller 101 transmits the first axis switching bounce angle information set according to the one of the steps S1114 to S1116, which is the result of the determination in the step S1113 in the information transmission preparation process in FIG. 11, to the strobe controller 310, and then proceeds to a step S1207.

In the step S1207, the camera controller 101 transmits the live view information stored in the built-in memory in the step S1117 in the information transmission preparation process in FIG. 11 to the strobe controller 310, and then proceeds to a step S1208. In the step S1208, the camera controller 101 transmits the variable angle operation information stored in the built-in memory in the step S1117 in the information transmission preparation process in FIG. 11 to the strobe controller 310, and then proceeds to the step S1209. In the step S1209, the camera controller 101 transmits the camera ID and the sensor information stored in the built-in memory in the step S1117 in the information transmission preparation process in FIG. 11 to the strobe controller 310, and then proceeds to the step S908 in the shooting preparation process in FIG. 9.

Next, the process performed by the strobe device 300 will be described. In the step S1210, upon receipt of a communication interrupt, the strobe controller 310 receives the data transmitted from the camera controller 101, and then proceeds to the step S1211. In the step S1211, the strobe controller 310 stores the received data in the built-in memory (RAM) thereof, followed by terminating the present process.

Next, a description will be given of the automatic bounce process executed in the step S912 in the shooting preparation process in FIG. 9 with reference to FIG. 13. The automatic bounce process in FIG. 13 includes processing performed by the camera controller 101 and processing performed by the strobe controller 310.

Figure 13:
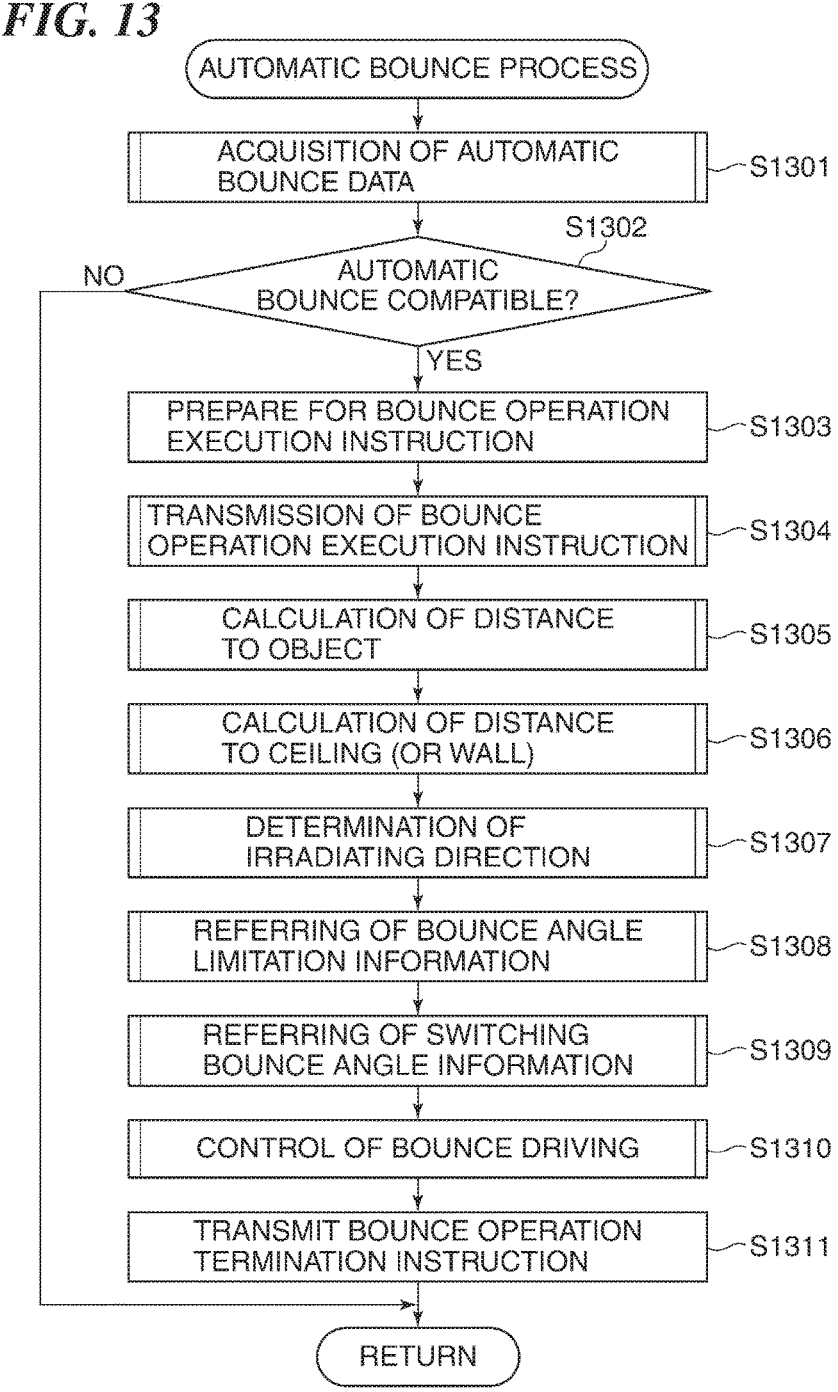
FIG. 13 is a flowchart of an automatic bounce process executed in a step in FIG. 9.

Referring to FIG. 13, in a step S1301, the camera controller 101 acquires automatic bounce data from the strobe controller 310, and then proceeds to a step S1302. The automatic bounce data acquisition process executed in the step S1301 will be described hereinafter with reference to FIGS. 14A and 14B. In the step S1302, the camera controller 101 determines whether or not the automatic bounce operation can be performed, and if the automatic bounce operation can be performed, the camera controller 101 proceeds to a step S1303, whereas if the automatic bounce operation cannot be performed, the camera controller 101 proceeds to the step S913 in the shooting preparation process in FIG. 9 without performing the automatic bounce process.

In the step S1302, the camera controller 101 determines whether or not the automatic bounce operation can be performed, based on the automatic bounce operation settings of the camera body 100 and whether or not the automatic bounce operation of the strobe device 300 based on the received automatic bounce data can be performed.

In the step S1303, the camera controller 101 prepares to transmit an instruction for executing a bounce operation, and then proceeds to a step S1304. In the step S1304, the camera controller 101 transmits the instruction for executing the bounce operation to the strobe controller 310, and then proceeds to a step S1305. The bounce operation execution instruction-transmitting process executed in the step S1304 will described hereinafter with reference to FIG. 15.

In the step S1305, the camera controller 101 calculates a distance to the object in order to determine an optimum irradiating direction for the bounce flash shooting, and then proceeds to a step S1306. The object distance calculation process executed in the step S1305 will be described hereinafter with reference to FIGS. 16A and 16B. In the step S1306, the camera controller 101 or the strobe controller 310 calculates a distance to a ceiling (or wall) in order to determine the optimum irradiating direction for the bounce flash shooting, and then proceeds to a step S1307. The ceiling (or wall) distance calculation process executed in the step S1306 will be described hereinafter with reference to FIGS. 17A and 17B.

Note that in the steps S1305 and S1306, which of the camera controller 101 and the strobe controller 310 should calculate the distance to the object and the distance to the ceiling (or wall) is determined based on the currently set ranging method.

After that, the camera controller 101 or the strobe controller 310 determines the optimum irradiating direction for the bounce flash shooting in the step S1307, refers to the bounce angle limitation information and the switching bounce angle information in steps S1308 and S1309, respectively, and then proceeds to a step S1310. The irradiating direction determination process executed in the step S1307 will be described hereinafter with reference to FIGS. 18A and 18B.

In the step S1310, the camera controller 101 or the strobe controller 310 performs bounce drive control so as to make the irradiating direction optimum, and then proceeds to a step S1311. Note that the process executed in the step S1310 will be described hereinafter with reference to FIGS. 20A to 22. In the step S1311, the camera controller 101 transmits an instruction for terminating the bounce operation to the strobe controller 310, and then proceeds to the step S913 in the shooting preparation process in FIG. 9.

Figure 14A:
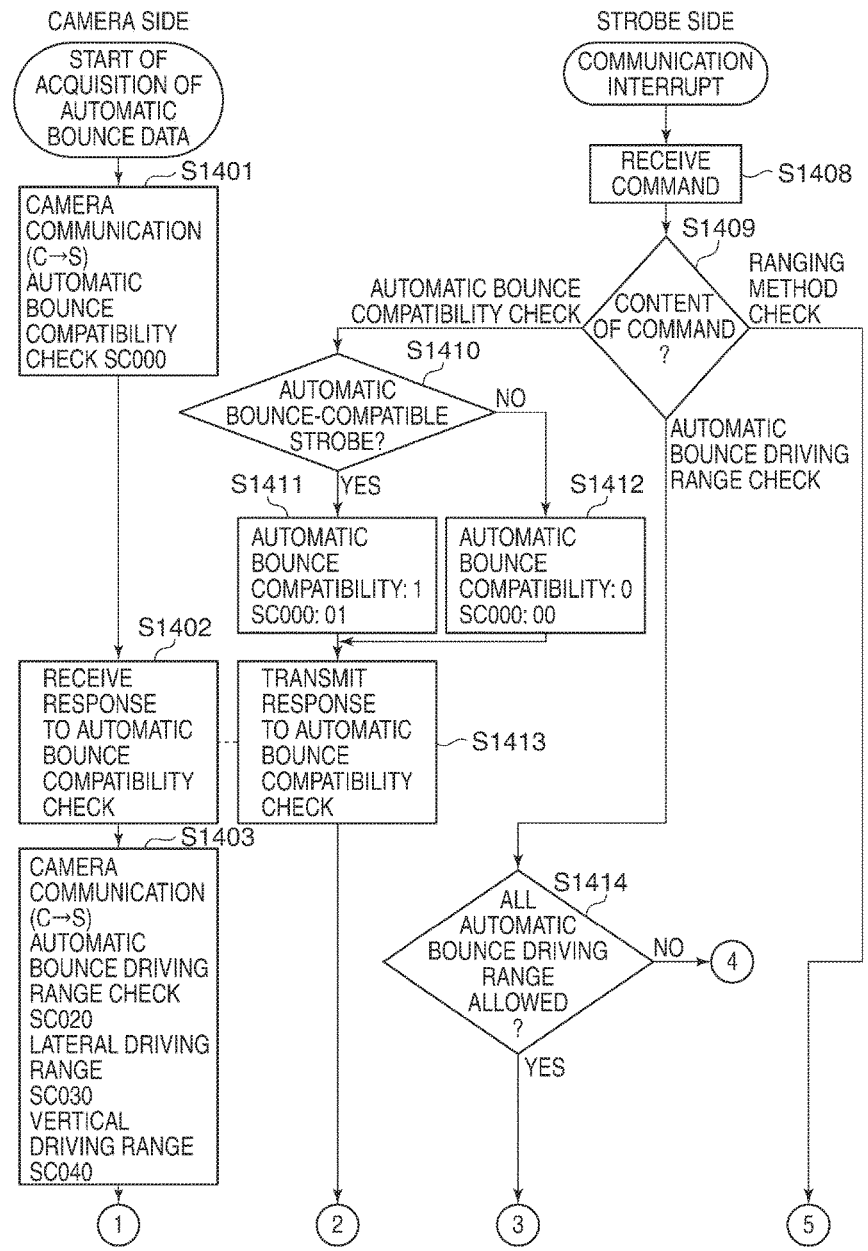
FIGS. 14A and 14B are a flowchart of an automatic bounce data acquisition process executed in a step in FIG. 13.
Figure 14B:
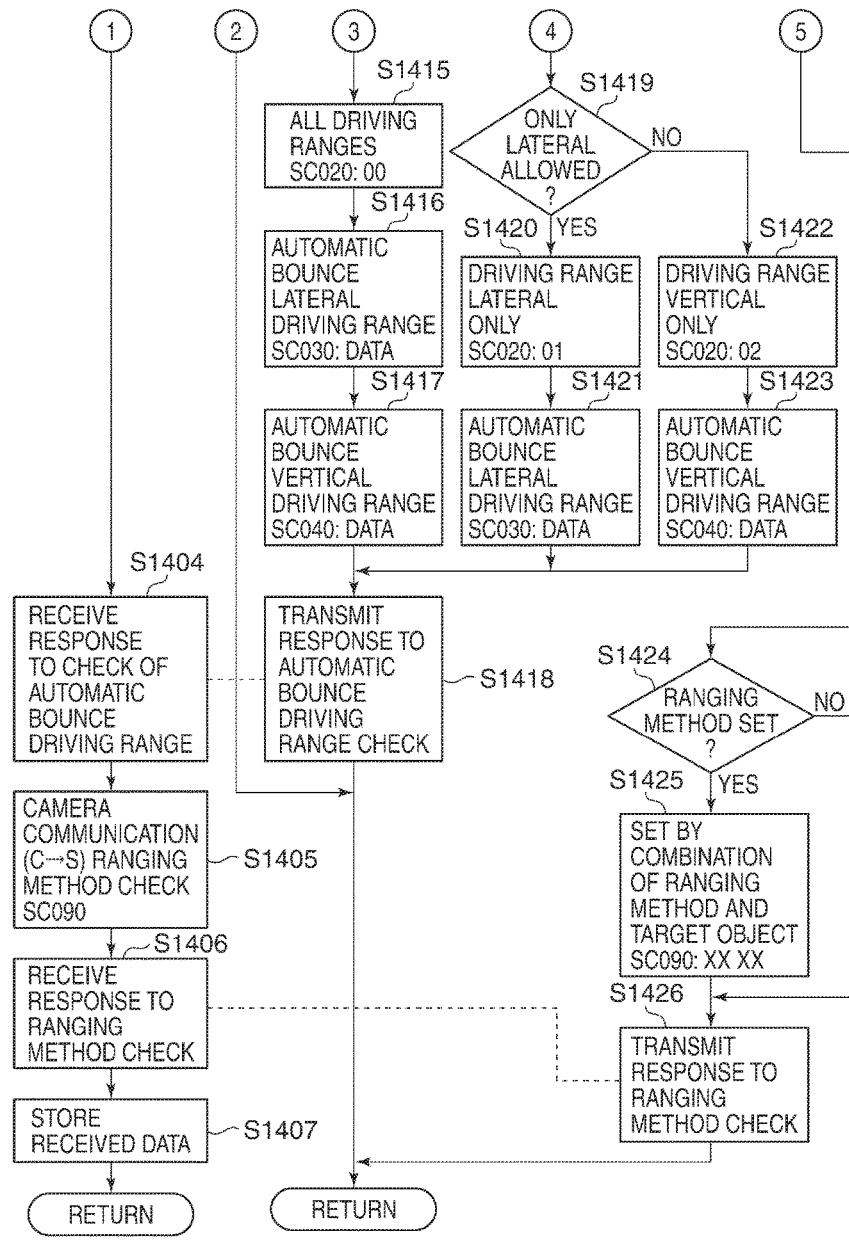

Next, a description will be given of the automatic bounce data acquisition process executed in the step S1301 in the automatic bounce process in FIG. 13 with reference to FIGS. 14A and 14B. In FIGS. 14A and 14B, steps S1401 to S1407 are executed by the camera body 100, and steps S1408 to S1426 are executed by the strobe device 300.

First, the process performed by the camera body 100 will be described. In FIGS. 14A and 14B, in the step S1401, the camera controller 101 sends a command to the strobe controller 310 for checking whether or not the strobe device 300 can perform the automatic bounce operation, and then proceeds to a step S1402. In the step S1402, the camera controller 101 receives a response to the command for checking whether or not the strobe device 300 can perform the automatic bounce operation from the strobe controller 310, and then proceeds to a step S1403.

In the step S1403, the camera controller 101 sends a command to the strobe controller 310 for checking the driving range of the movable unit 300b in the automatic bounce operation, and then proceeds to a step S1404. In the step S1404, the camera controller 101 receives a response to the command for checking the driving range in the automatic bounce operation, from the strobe controller 310, and then proceeds to a step S1405.

In the step S1405, the camera controller 101 sends a command to the strobe controller 310 for checking the ranging method for calculating distances to the object and the target object in the automatic bounce operation, and then proceeds to a step S1406. In the step S1406, the camera controller 101 receives a response to the command for checking the ranging method, from the strobe controller 310, and then proceeds to a step S1407. In the step S1407, the camera controller 101 stores the data received in the steps S1402, S1404, and S1406 in the built-in memory thereof, followed by terminating the present process.

Next, the process performed by the strobe device 300 will be described. In the step S1408, upon receipt of a communication interrupt, the strobe controller 310 receives a command transmitted from the camera controller 101, and then proceeds to a step S1409. In the step S1409, the strobe controller 310 determines which of the following the command is. More specifically, if it is determined that the command is a command for checking whether or not the strobe device 300 can perform the automatic bounce operation, the strobe controller 310 proceeds to a step S1410, if the command is a command for checking the driving range of the movable unit 300b in the automatic bounce operation, the strobe controller 310 proceeds to a step S1414, or if the command is a command for checking the ranging method, the strobe controller 310 proceeds to a step S1424.

In the step S1410, the strobe controller 310 determines whether or not the strobe device 300 can perform the automatic bounce operation, and if the strobe device 300 can perform the automatic bounce operation, the strobe controller 310 proceeds to a step S1411, whereas if not, the strobe controller 310 proceeds to a step S1412. In the step S1411, the strobe controller 310 stores "SC000 command: 01" in preparation for the camera-strobe communication (S→C) in the built-in memory thereof, and then proceeds to a step S1413.

On the other hand, in the step S1412, the strobe controller 310 stores "SC000 command: 00" in preparation for the camera-strobe communication (S→C) in the built-in memory thereof, and then proceeds to a step S1413. In the step S1413, the strobe controller 310 transmits the data stored in the built-in memory in the step S1411 or S1412, as a response to the command for checking whether or not the strobe device 300 can perform the automatic bounce operation to the camera controller 101, followed by terminating the present process.

In the step S1414, the strobe controller 310 determines whether or not the automatic bounce driving range allows both of rotation of the movable unit 300b about the first axis in the vertical direction and rotation about the second axis in the lateral direction. If the automatic bounce driving range allows rotation in both the vertical direction and the lateral direction, the strobe controller 310 proceeds to a step S1415, whereas the automatic bounce driving range allows rotation in only one of the vertical direction and the lateral direction, the strobe controller 310 proceeds to a step S1419. In the step S1419, the strobe controller 310 determines whether or not the automatic bounce driving range allows rotation only in the lateral direction, and if the automatic bounce driving range allows rotation only in the lateral direction, the strobe controller 310 proceeds to a step S1420, whereas if the driving range allows rotation only in the vertical direction, the strobe controller 310 proceeds to a step S1422.

In the step S1415, the strobe controller 310 stores "SC020 command: data 00" in preparation for the camera-strobe communication (S→C) in the built-in memory thereof, and then proceeds to a step S1416. In the step S1416, the strobe controller 310 stores "SC030 command: data XX (start) XX (end)" as the driving range in the lateral direction in preparation for the camera-strobe communication (S→C) in the built-in memory thereof, and then proceeds to a step S1417.

In the step S1417, the strobe controller 310 stores "SC040 command: data XX (start) XX (end)" as the driving range in the vertical direction in preparation for the camera-strobe communication (S→C) in the built-in memory thereof, and then proceeds to a step S1418.

On the other hand, in the step S1420, the strobe controller 310 stores "SC020 command: data 01" in preparation for the camera-strobe communication (S→C) in the built-in memory thereof, and then proceeds to a step S1421. In the step S1421, the strobe controller 310 stores "SC030 command: data XX (start) XX (end)" as the driving range of the movable unit 300b in the lateral direction in preparation for the camera-strobe communication (S→C) in the built-in memory thereof, and then proceeds to the step S1418.

In the step S1422, the strobe controller 310 stores "SCO20 command: data 02" in preparation for the camera-strobe communication (S→C) in the built-in memory thereof, and then proceeds to a step S1423. In the step S1423, the strobe controller 310 stores "SC040 command: data XX (start) XX (end)" as the driving range in the vertical direction in preparation for the camera-strobe communication (S→C) in the built-in memory thereof, and then proceeds to the step S1418.

In the step S1418, the strobe controller 310 transmits the data stored in the built-in memory in the steps S1415 to S1417, or in the steps S1420 and S1421, or in the steps S1422 and S1423, to the camera controller 101 as a response to the command for checking the automatic bounce driving range, followed by terminating the present process.

In the step S1424, the strobe controller 310 determines whether or not a ranging method is set thereto for calculating the distances to the object and the target object in the automatic bounce operation. More specifically, if the ranging method is set, the strobe controller 310 proceeds to a step S1425, whereas if not, the strobe controller 310 proceeds to a step S1426.

In the step S1425, the strobe controller 310 stores "SC090 command: XX XX" formed according to the ranging method and the setting of the target object, in the built-in memory thereof, and then proceeds to the step S1426. In the step S1426, the strobe controller 310 transmits the data stored in the built-in memory in the step S1425 or data indicating that no ranging method is set, as a response to the command for checking a ranging method, to the camera controller 101, followed by terminating the present process. With this, the camera controller 101 acquires the automatic bounce data.

Figure 15:
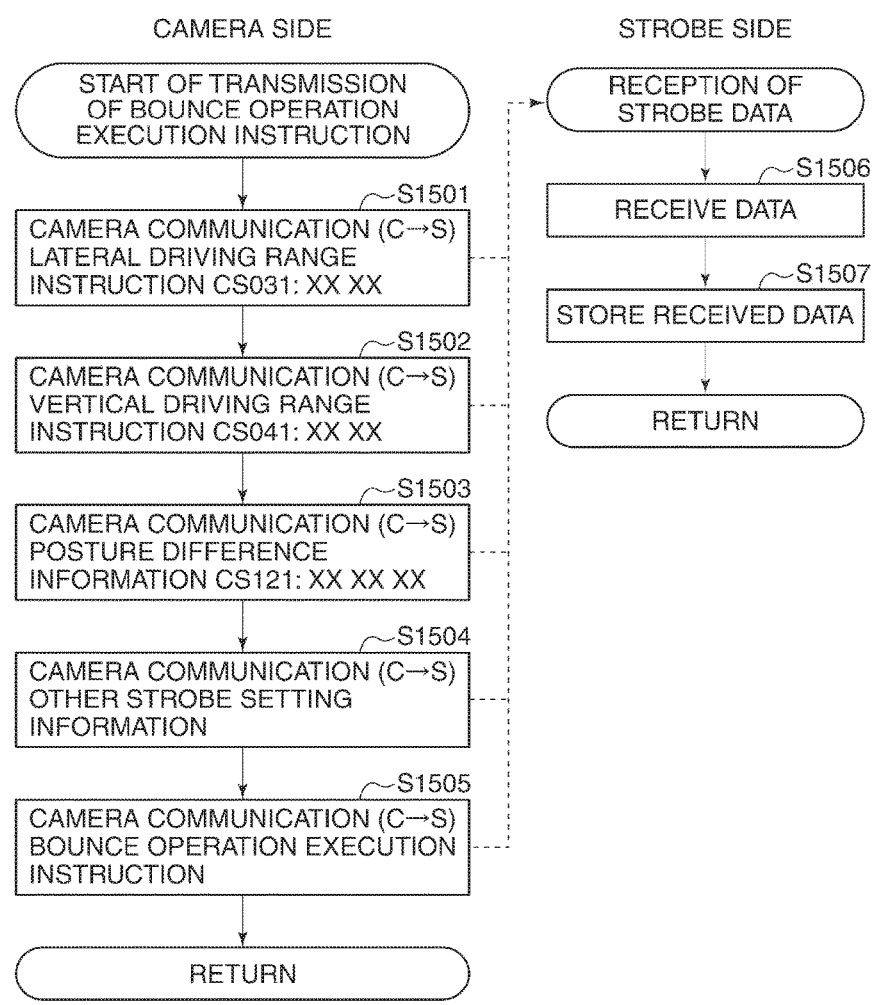
FIG. 15 is a flowchart of a bounce operation execution instruction-transmitting process executed in a step in FIG. 13.

Next, a description will be given of the bounce operation execution instruction-transmitting process executed in the step S1304 in the automatic bounce process in FIG. 13 with reference to FIG. 15. Note that the details of setting commands used here are shown in FIGS. 4A to 5B. In FIG. 15, steps S1501 to S1505 are executed by the camera body 100, and steps S1506 and S1507 are executed by the strobe device 300.

First, the process performed by the camera body 100 will be described. In FIG. 15, in the step S1501, the camera controller 101 transmits a "CS031 command: data XX XX" to the strobe controller 310 in order to set the driving range in the lateral direction during the bounce operation, and then proceeds to a step S1502. Note that in a case where the driving range in the lateral direction is not set, the step S1501 is omitted.

In the step S1502, the camera controller 101 transmits a "CS041 command: data XX XX" to the strobe controller 310 in order to set the driving range in the vertical direction during the bounce operation, and then proceeds to a step S1503. Note that in a case where the driving range in the vertical direction is not set, the step S1502 is omitted.

In the step S1503, the camera controller 101 transmits a "CS121 command: data XX XX XX" as posture difference information, which is the results of detections by the posture H detection section 140a, the posture V detection section 140b, and the posture Z detection section 140c, to the strobe controller 310. After the transmission, the camera controller 101 proceeds to a step S1504.

In the step S1504, the camera controller 101 transmits other strobe setting information to the strobe controller 310, and then proceeds to the step S1505. In the step S1505, the camera controller 101 transmits an instruction for performing the bounce operation to the strobe controller 310, and then proceeds to the step S1305 in the automatic bounce process in FIG. 13.

Next, the process performed by the strobe device 300 will be described. In the step S1506, upon receipt of a communication interrupt, the strobe controller 310 receives the data transmitted from the camera controller 101, and then proceeds to a step S1507. In the step S1507, the strobe controller 310 stores the received data in the built-in memory thereof, and starts the bounce operation. Thus, the camera controller 101 transmits an instruction for executing the bounce operation to the strobe controller 310.

Next, the object distance calculation process executed in the step S1305 in the automatic bounce process in FIG. 13 will be described with reference to FIGS. 16A and 16B. Note that the details of setting commands used here are shown in FIGS. 4A to 5B. The camera body 100 executes steps S1601 to S1606 in FIG. 16A, while the strobe device 300 executes steps S1607 to S1613 in FIG. 16B.

First, the process performed by the camera body 100 will be described. Referring to FIG. 16A, in the step S1601, the camera controller 101 determines a ranging method for calculating the object distance, and then proceeds to a step S1602. In the step S1602, the camera controller 101 determines whether or not the ranging method is the preliminary light emission method, and if the ranging method is not the preliminary light emission method, the camera controller proceeds to a step S1603, whereas if the ranging method is the preliminary light emission method, the camera controller proceeds to a step S1604.

In the step S1603, since the ranging method is not the preliminary light emission method, the camera controller 101 transmits "CS111 command: data XX" as object distance information to the strobe controller 310, and then proceeds to the step S1306 in the automatic bounce process in FIG. 13. Note that in a case where it has been notified by the automatic bounce data that the ranging method is the strobe ranging method, the step S1603 is omitted.

In the step S1604, the camera controller 101 transmits "CS131 command: data 00" as preliminary light emission permission to the strobe controller 310, and then proceeds to a step S1605. In the step S1605, the camera controller 101 transmits a preliminary light emission command to the strobe controller 310, and then proceeds to the step S1606.

In the step S1606, the camera controller 101 receives the object distance information from the strobe controller 310, and stores the received data in the built-in memory thereof, and then proceeds to the step S1306 in the automatic bounce process in FIG. 13.

Next, the process performed by the strobe device 300 will be described. Referring to FIG. 16B, in the step S1607, upon receipt of a communication interrupt, the strobe controller 310 receives the data transmitted from the camera controller 101, and then proceeds to a step S1608. In the step S1608, the strobe controller 310 stores the received data in the built-in memory thereof, and then proceeds to a step S1609.

In the step S1609, the strobe controller 310 controls the bounce circuit 340 to rotate the movable unit 300b such that the irradiating direction becomes a direction toward the object, and then proceeds to a step S1610. In the step S1610, the strobe controller 310 instructs the light emission control circuit 304 to perform preliminary light emission according to the preliminary light emission command, and then proceeds to a step S1611. In the step S1611, the strobe controller 310 causes the light emission control circuit 304 to perform preliminary light emission using the discharge tube 305, and then proceeds to a step S1612.

In the step S1612, the strobe controller 310 causes the ranging unit 308 to receive reflected light of the preliminary light emission using the light receiving sensor, which is reflected from the object, and calculate an object distance based on the integrated value of the received reflected light, and then proceeds to the step S1613. In the step S1613, the strobe controller 310 transmits "SC110 command: data XX" as object distance information indicative of the calculated object distance, to the camera controller 101, followed by terminating the present process. Thus, the object distance for determining the optimum irradiating direction for the bounce flash shooting is calculated.

Next, a description will be given of the ceiling (or wall) distance calculation process executed in the step S1306 in the automatic bounce process in FIG. 13 with reference to FIGS. 17A and 17B. Note that the details of setting commands used here are shown in FIGS. 4A to 5B. The camera body 100 executes steps S1701 to S1706 in FIG. 17A, while the strobe device 300 executes steps S1707 to S1713 in FIG. 17B.

First, the process performed by the camera body 100 will be described. Referring to FIG. 17A, in the step S1701, the camera controller 101 determines a ranging method for calculating the ceiling (or wall) distance, and then proceeds to the step S1702. In the step S1702, the camera controller 101 determines whether or not the ranging method is the preliminary light emission method, and if the ranging method is not the preliminary light emission method, the camera controller 101 proceeds to a step S1703, whereas if the ranging method is the preliminary light emission method, the camera controller 101 proceeds to a step S1704.

In the step S1703, since the ranging method is not the preliminary light emission method, the camera controller 101 transmits "CS101 command: data XX" as ceiling distance information to the strobe controller 310, and then proceeds to the step S1307 in the automatic bounce process in FIG. 13. Note that in a case where it has been notified by the automatic bounce data that the ranging method is the strobe ranging method, the step S1703 is omitted.

In the step S1704, the camera controller 101 transmits the "CS131 command: data 00" as preliminary light emission permission to the strobe controller 310, and then proceeds to a step S1705. In the step S1705, the camera controller 101 transmits the preliminary light emission command to the strobe controller 310, and then proceeds to the step S1706.

In the step S1706, the camera controller 101 receives the object distance information from the strobe controller 310, stores the data in the built-in memory thereof, and then proceeds to the step S1307 in the automatic bounce process in FIG. 13.

Next, the process performed by the strobe device 300 will be described. Referring to FIG. 17B, in the step S1707, upon receipt of a communication interrupt, the strobe controller 310 receives the data transmitted from the camera controller 101, and then proceeds to a step S1708. In the step S1708, the strobe controller 310 stores the received data in the built-in memory thereof, and then proceeds to a step S1709.

In the step S1709, the strobe controller 310 controls the bounce circuit 340 to rotate the movable unit 300b such that the irradiating direction becomes a direction toward the ceiling, and then proceeds to a step S1710. In the step S1710, the strobe controller 310 instructs the light emission control circuit 304 to perform preliminary light emission according to the preliminary light emission command, and then proceeds to a step S1711.

In the step S1711, the strobe controller 310 causes the light emission control circuit 304 to perform preliminary light emission using the discharge tube 305, and then proceeds to a step S1712. In the step S1712, the strobe controller 310 causes the ranging unit 308 to receive reflected light of the preliminary light emission using the light receiving sensor, which is reflected from the target object, and calculate a ceiling distance based on the integrated value of the received reflected light, and then proceeds to the step S1713.

In the step S1713, the strobe controller 310 transmits "SC110 command: data XX" as ceiling distance information indicative of the calculated ceiling distance, to the camera controller 101, followed by terminating the present process. Thus, the ceiling (or wall) distance for determining the optimum irradiating direction for bounce flash shooting is calculated.

Next, a description will be given of the irradiating direction determination process executed in the step S1307 in the automatic bounce process in FIG. 13 with reference to FIGS. 18A and 18B. Note that the details of setting commands used here are shown in FIGS. 4A to 5B. The camera body 100 executes steps S1801 to S1806 in FIG. 18A, while the strobe device 300 executes steps S1807 to S1812 in FIG. 18B.

First, the process performed by the camera body 100 will be described. Referring to FIG. 18A, in the step S1801, if the irradiating direction is to be determined by the camera body 100, the camera controller 101 proceeds to the step S1802, whereas if the irradiating direction is to be determined by the strobe device 300, the camera controller 101 proceeds to the step S1805. Note that in a case where the irradiating direction can be determined by both of the camera body 100 and the strobe device 300, one of the camera body 100 and the strobe device 300, which determines the irradiating direction, may be set according to the operation of the input section 112. Further, in a case where the irradiating direction can be determined by only one of the camera body 100 and the strobe device 300, one which performs the determination may be set automatically.

In the step S1802, the camera controller 101 refers to the object distance information indicative of the object distance calculated in the step S1305 in the automatic bounce process in FIG. 13 and the ceiling distance information indicative of the ceiling (or wall) distance calculated in the step S1306, and then proceeds to a step S1803.

In the step S1803, the camera controller 101 determines an optimum direction of irradiating the strobe light for the bounce flash shooting based on the object distance information and the ceiling distance information referred to in the step S1802. More specifically, the camera controller 101 calculates a rotational angle (optimum bounce angle) of the movable unit 300b, which makes the irradiating direction optimum. The method of calculating the rotational angle is not particularly limited insofar as it is a method of calculating the rotational angle based on the object distance and the ceiling distance.

Figure 19:
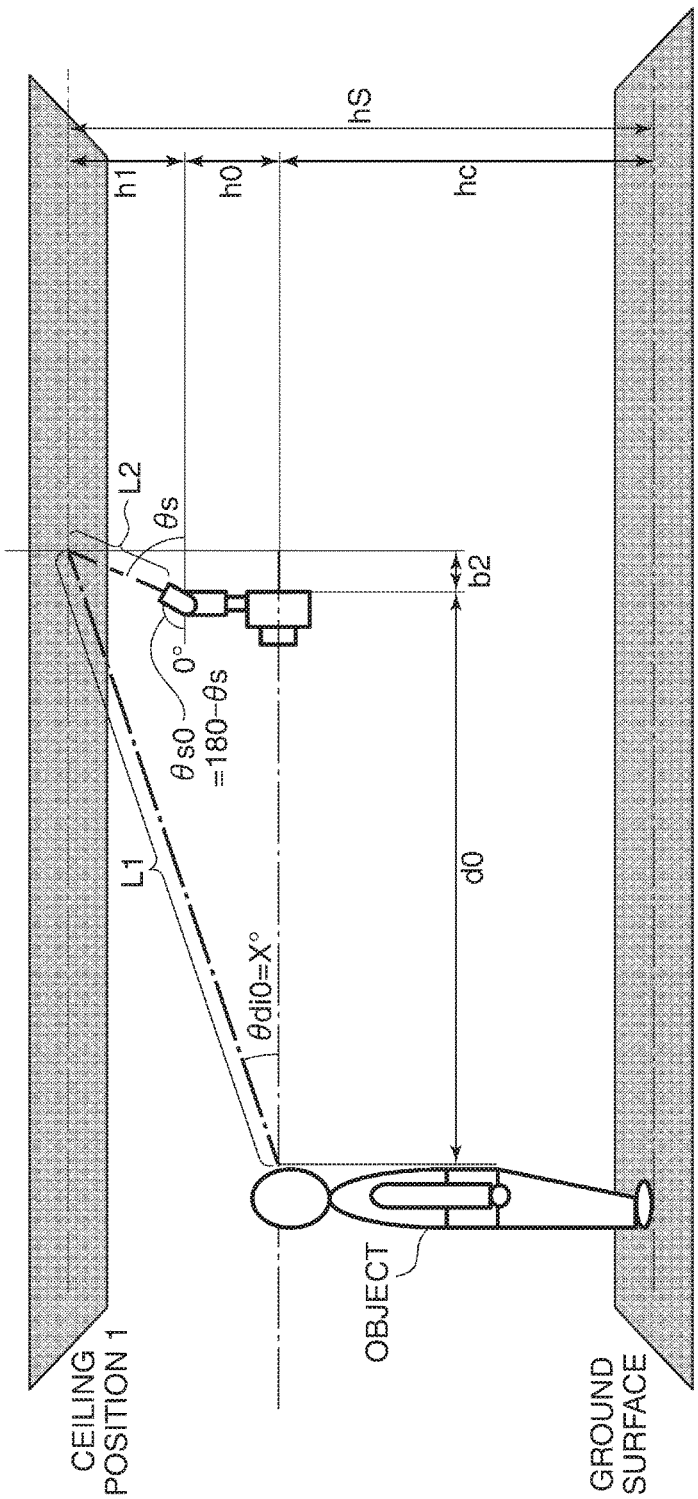
FIG. 19 is a diagram useful in explaining an example of a bounce flash shooting scene.

FIG. 19 is a diagram useful in explaining an example of a bounce flash shooting scene. Referring to FIG. 19, a distance from a strobe light emission surface of the strobe device 300 as a starting point to the object is represented by d0, a distance from the ground surface to the optical axis of the camera is represented by hc, and a distance from the optical axis of the camera to the movable unit 300b of the strobe device 300 is represented by h0. Further, assuming that the distance from the movable unit 300b to the ceiling, calculated in the step S1306, is represented by h1, a distance hs from the ground surface to the ceiling can be calculated by the following equation (4):

$$\text{ceiling distance } hs = h1 + h0 + hc \quad (4)$$

Further, assuming that an incident angle of light irradiating the object, at which the optimum reflected light for the object can be obtained, is represented by $\theta di0 = X°$, an operating bounce angle $\theta s$ can be calculated by the following equation (5):

$$\theta s = \arctan(h1/b2) = \arctan(h1/[\{(h1+h0)/\tan(\theta di0)\} - d0]) \quad (5)$$

Here, an optimum bounce angle $\theta s0$ which sets the front direction to 0° can be calculated by the following equation (6):

$$\theta s0 = 180 - \theta s \quad (6)$$

When calculation of the optimum bounce angle is finished, the camera controller 101 stores angle information indicative of the calculated optimum bounce angle in the built-in memory thereof, and then proceeds to the step S1804.

In the step S1804, the camera controller 101 transmits "CS071: vertical data XX" and "CS081: lateral data XX" as the angle information indicative of the calculated optimum bounce angles to the strobe controller 310, and then proceeds to the step S1308 in the automatic bounce process in FIG. 13.

On the other hand, in the step S1805, the camera controller 101 transmits "CS171: 00" as an angle calculation instruction to the strobe controller 310, and then proceeds to a step S1806. In the step S1806, the camera controller 101 receives angle information from the strobe controller 310, stores the angle information in the built-in memory thereof, and then proceeds to the step S1308 in the automatic bounce process in FIG. 13.

Next, the process performed by the strobe device 300 will be described. Referring to FIG. 18B, in the step S1807, upon receipt of a communication interrupt, the strobe controller 310 receives the data transmitted from the camera controller 101, and then proceeds to a step S1808. In the step S1808, the strobe controller 310 stores the received data in the built-in memory thereof, and then proceeds to the step S1809.

In the step S1809, the strobe controller 310 determines whether or not the irradiating direction is to be determined by the strobe device 300, and if the irradiating direction is to be determined by the strobe device 300, the strobe controller 310 proceeds to the step S1810, whereas if the irradiating direction is not to be determined by the strobe device 300, the strobe controller 310 terminates the present process.

In the step S1810, to determine the irradiating direction, the strobe controller 310 refers to the object distance information indicative of the object distance calculated in the step S1305 in the automatic bounce process in FIG. 13 and the ceiling distance information indicative of the ceiling (or wall) distance calculated in the step S1306, and then proceeds to a step S1811.

In the step S1811, the strobe controller 310 determines an optimum irradiating direction for the bounce flash shooting based on the object distance information and the ceiling distance information referred to in the step S1810, and then proceeds to the step S1812. Note that when determining the irradiating direction, the strobe controller 310 performs the same processing as performed by the camera body 100, and hence description thereof is omitted. Further, in a camera which has no communication related to the automatic bounce, the strobe device 300 determines the irradiating direction by the method described as to the step S1803 in FIG. 18A.

In the step S1812, the strobe controller 310 transmits "SC070: vertical data XX" and "SC080: lateral data XX" as angle information indicative of the calculated optimum bounce angles to the camera controller 101, followed by terminating the present process. Thus, the optimum irradiating direction for bounce flash shooting is determined. Note that the method of determining the optimum irradiating direction for bounce flash shooting is not limited to the above-described method. For example, the optimum irradiating direction may be determined according to a photographer's operation input to the input section 112 or the input section 312.

Next, a description will be given of the bounce driving control process executed in the step S1310 in the automatic bounce process in FIG. 13 with reference to FIGS. 20A to 22. Note that the details of setting commands used here are shown in FIGS. 4A to 5B. The camera body 100 executes steps S2001 to S2013, S2068, and S2069 in FIG. 20A, while the strobe device 300 executes steps S2014 to S2067 in FIGS. 20B to 22.

First, the process performed by the camera body 100 will be described. Referring to FIG. 20A, in the step S2001, the camera controller 101 determines whether or not a bounce driving instruction is to be given by the camera body 100, and if the bounce driving instruction is to be given by the camera body 100, the camera controller 101 proceeds to a step S2002, whereas if the bounce driving instruction is to be given by the strobe device 300, the camera controller 101 proceeds to a step S2068. In the step S2002, the camera controller 101 refers to the angle information indicative of the optimum bounce angle calculated in the step S1307 in the automatic bounce process in FIG. 13, and then proceeds to a step S2003.

In the step S2003, to notify that the bounce driving instruction is to be given by the camera body 100, the camera controller 101 transmits "CS181 command: data 01" to the strobe controller 310, and then proceeds to a step S2004. In the step S2004, the camera controller 101 transmits "CS011 command: data 01" as an automatic bounce setting to the strobe controller 310, and then proceeds to a step S2005.

In the step S2005, the camera controller 101 transmits "CS021 command: data XX" as an automatic bounce driving condition to the strobe controller 310, and then proceeds to a step S2006. In this data, "both the lateral direction and the vertical direction" is represented by "00", "only the lateral direction" is represented by "01", and "only the vertical direction" is represented by "02". In the step S2006, the camera controller 101 transmits "CS031 command: data XX XX" as the driving range of the movable unit 300b in the lateral direction to the strobe controller 310, and then proceeds to a step S2007. In the step S2007, the camera controller 101 transmits "CS041 command: data XX XX" as the driving range of the movable unit 300b in the vertical direction to the strobe controller 310, and then proceeds to a step S2008.

In the step S2008, the camera controller 101 transmits "CS121 command: data XX XX XX" as the posture difference information to the strobe controller 310, and then proceeds to a step S2009. In the step S2009, the camera controller 101 transmits "CS0161 command: data XX" as operation speed information indicative of a speed for rotating the movable unit 300b (driving speed of the motors of the bounce circuit 340) to the strobe controller 310, and then proceeds to a step S2010. Although in this data, "normal speed (reference speed)" is represented by "00", "low speed (50% of the reference speed)" is represented by "01", and "high speed (150% of the reference speed)" is represented by "02", the information may be more finely set.

The speed for rotating the movable unit 300b is thus made changeable, whereby it is possible to set the operation sound of the motors for rotating the movable unit 300b in a manner adapted to a scene. Note that the speed for rotating the movable unit 300b can be changed by a user's operation of the input section 112.

In the step S2010, the camera controller 101 transmits "CS051 command: data 01" and "CS071 command: data XX" as an instruction for driving the movable unit 300b in the vertical direction to the strobe controller 310, and then proceeds to a step S2011. In the step S2011, the camera controller 101 transmits "CS051 command: data 02" and "CS081 command: data XX" as an instruction for driving the movable unit 300b in the lateral direction to the strobe controller 310, and then proceeds to a step S2012.

In the step S2012, after the bounce driving is terminated, the camera controller 101 transmits "CS051 command: data 00" and "CS011 command: data 00" as an instruction for stopping the bounce driving to the strobe controller 310, and then proceeds to the step S2013.

On the other hand, in the step S2068, to notify the strobe controller 310 that the bounce driving instruction is to be given by the strobe device 300, the camera controller 101 transmits "CS181 command: data 00" to the strobe controller 310, and then proceeds to a step S2069. In the step S2069, similarly to the step S2009, the camera controller 101 transmits "CS0161 command: data XX" as operation speed information to the strobe controller 310, and then proceeds to the step S2013.

In the step S2013, the camera controller 101 receives current position information from the strobe controller 310, stores the received data in the built-in memory thereof, and then proceeds to the step S1311 in the automatic bounce process in FIG. 13.

Next, the process performed by the strobe device 300 will be described. In the step S2014, upon receipt of a communication interrupt, the strobe controller 310 receives the data transmitted from the camera controller 101, and then proceeds to a step S2015. In the step S2015, the strobe controller 310 stores the received data in the built-in memory thereof, and then proceeds to a step S2016.

In the step S2016, the strobe controller 310 determines whether or not there has occurred a driving error, such as unexpected abutment of the movable unit 300b or forcible holding of the movable unit 300b by hand, during the bounce driving. If there has not occurred a driving error, the strobe controller 310 proceeds to a step S2018, whereas if there has occurred a driving error, the strobe controller 310 proceeds to the step S2017.

Figure 21:
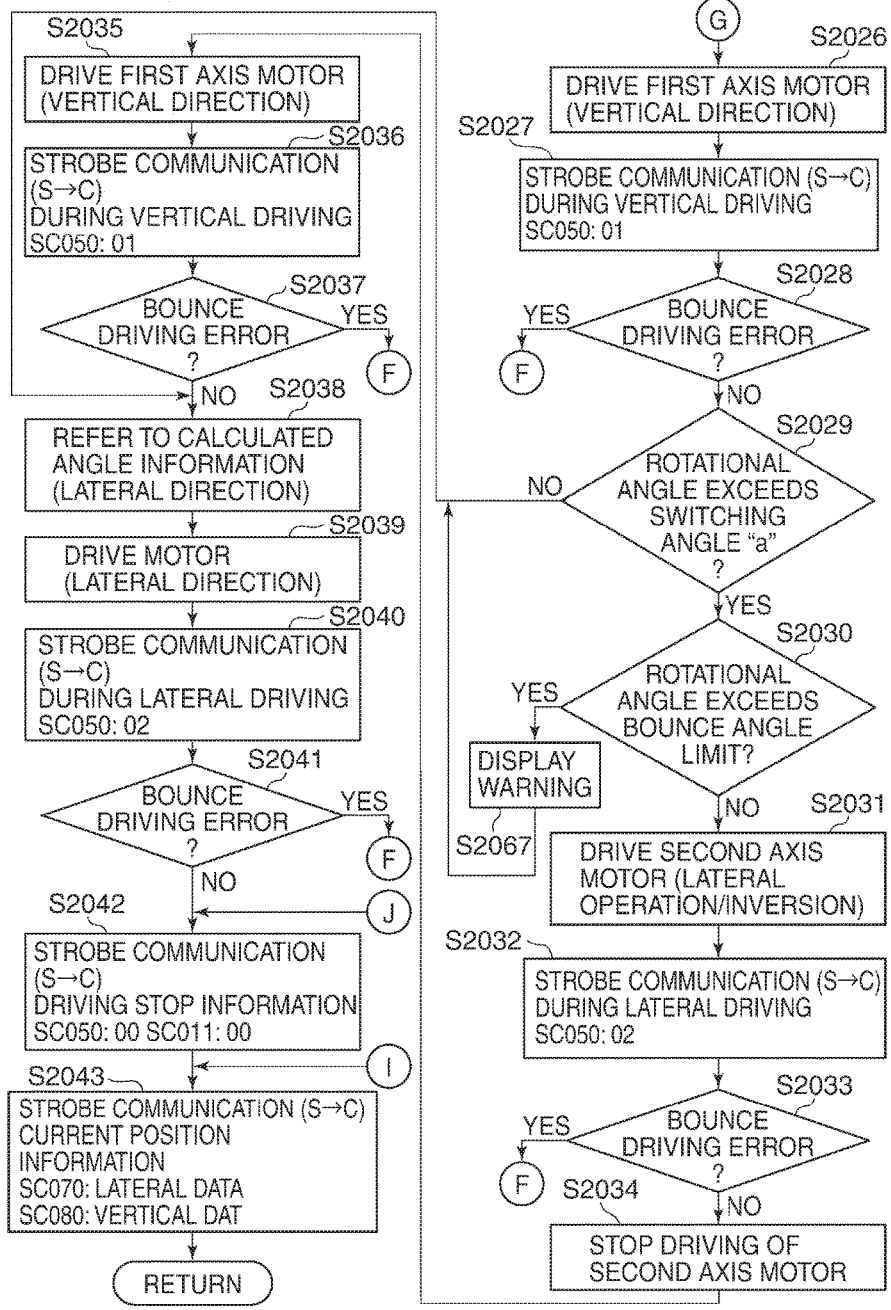
FIG. 21 is a continuation of FIG. 20B.

In the step S2017, to notify the camera controller 101 of occurrence of a driving error, the strobe controller 310 transmits "SC060 command: data 01" to the camera controller 101, and then proceeds to a step S2043 in FIG. 21. In the step S2018, to notify the camera controller 101 that there has occurred no driving error, the strobe controller 310 transmits "SC060 command: data 00" to the camera controller 101, and then proceeds to a step S2019.

Figure 22:
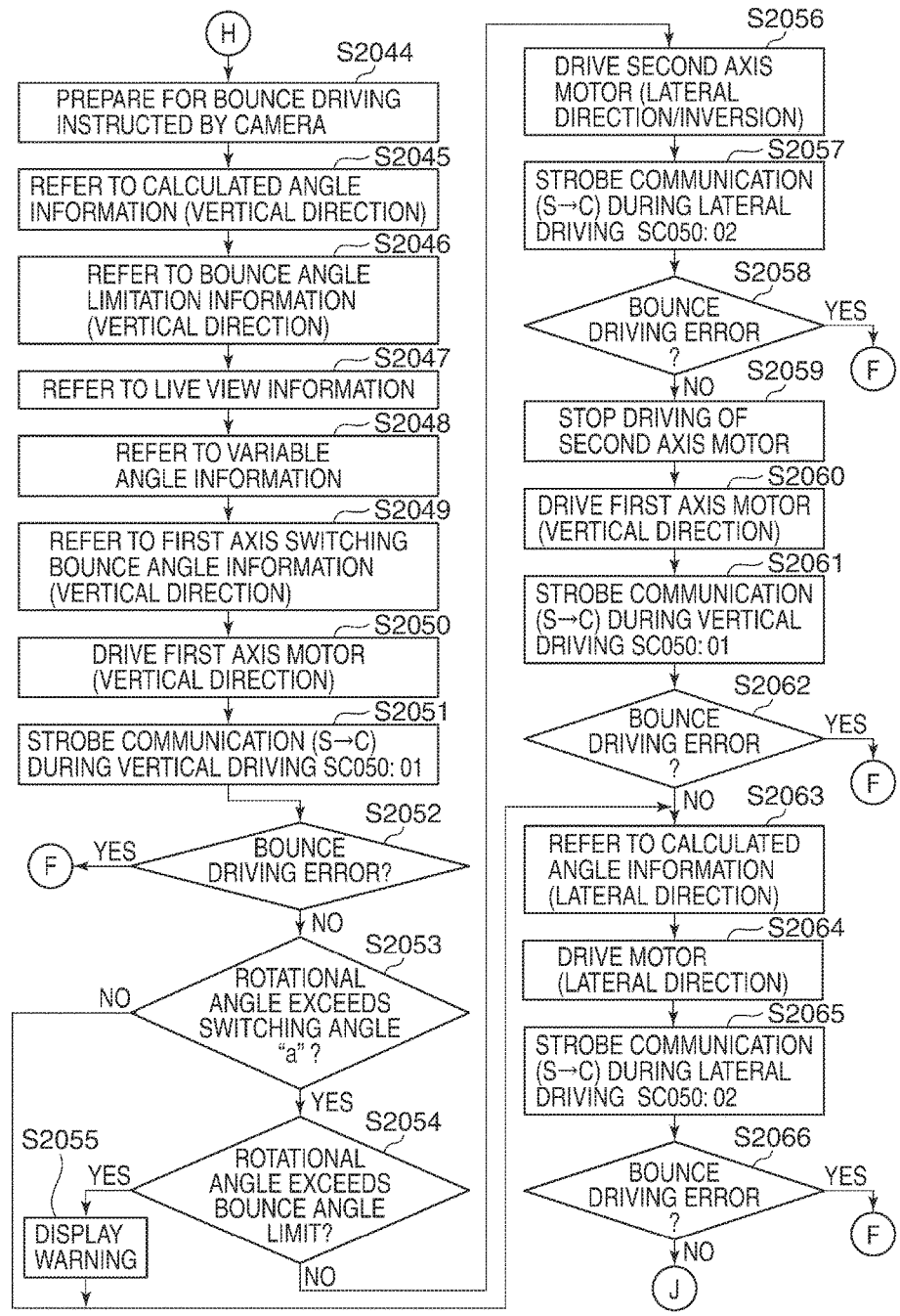
FIG. 22 is a continuation of FIG. 20B.

In the step S2019, the strobe controller 310 determines whether or not a bounce driving instruction is to be given by the camera body 100, and if the bounce driving instruction is to be given by the strobe device 300, the strobe controller 310 proceeds to a step S2020, whereas if the bounce driving instruction is to be given by the camera body 100, the strobe controller 310 proceeds to a step S2044 in FIG. 22. In the step S2020, the strobe controller 310 prepares to perform bounce driving according to the instruction by the strobe device 300, and then proceeds to a step S2021.

In the step S2021, the strobe controller 310 refers to the vertical angle information indicative of the optimum bounce angle of the movable unit 300b in the vertical direction, which is calculated in the step S1307 in the automatic bounce process in FIG. 13, and then proceeds to a step S2022. In the step S2022, the strobe controller 310 refers to the angle limitation information set in the step S1308 in the automatic bounce process in FIG. 13, and then proceeds to a step S2023. In the step S2023, the strobe controller 310 refers to the live view mode information transmitted from the camera controller 101 in the step S1207 in FIG. 12, and then proceeds to a step S2024.

Figure 12:
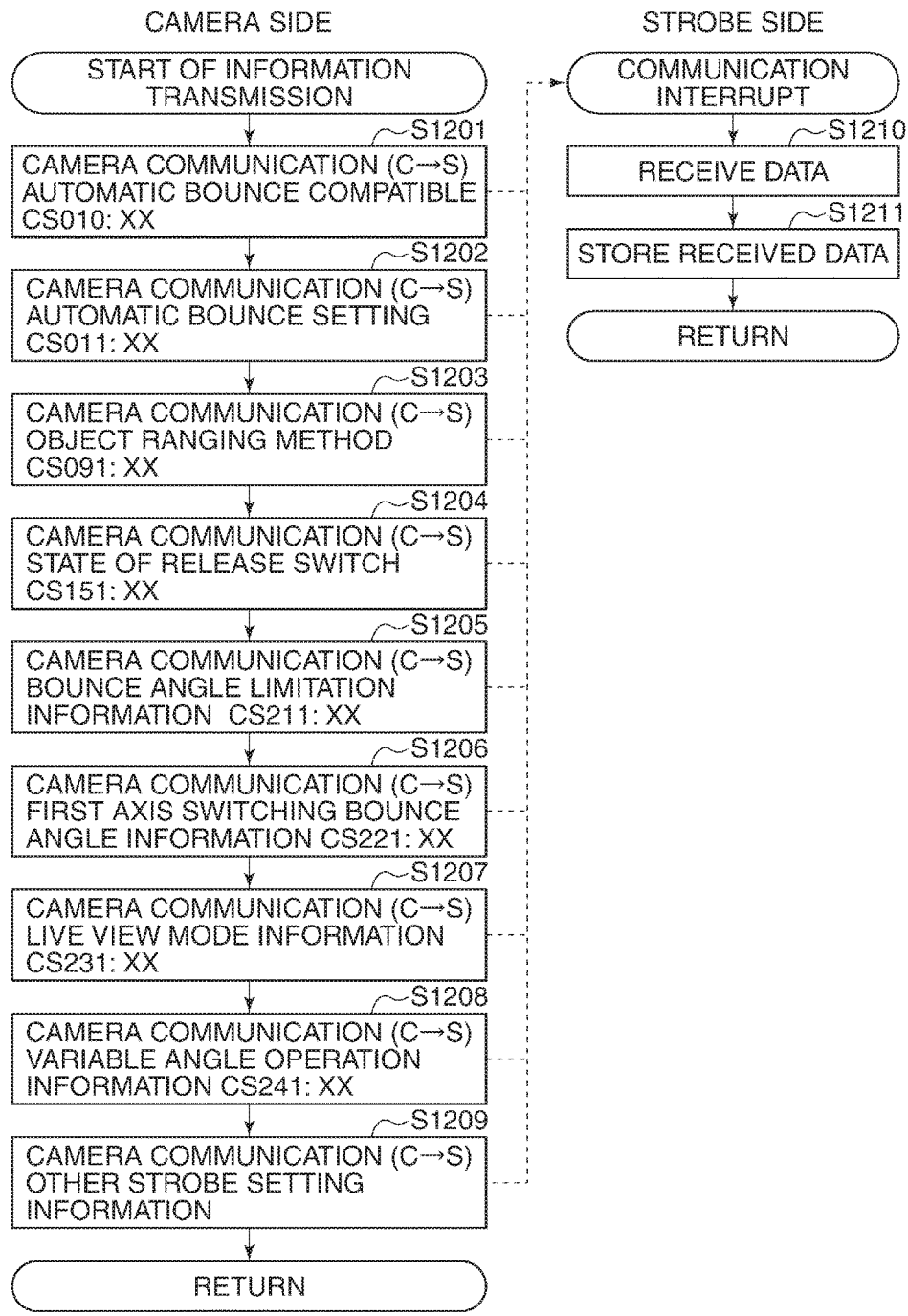
FIG. 12 is a flowchart of an information transmission process executed in a step in FIG. 9.

In the step S2024, the strobe controller 310 refers to the variable angle operation information transmitted from the camera controller 101 in the step S1208 in FIG. 12, and then proceeds to a step S2025. In the step S2025, the strobe controller 310 refers to the switching bounce angle information set in the step S1309 in the automatic bounce process in FIG. 13, and then proceeds to a step S2026 in FIG. 21.

In the step S2026 in FIG. 21, the strobe controller 310 drives the motor of the bounce V driving section 340d to thereby rotate the movable unit 300b in the vertical direction to the angle calculated in the step S1307 in the automatic bounce process in FIG. 13, and then proceeds to a step S2027. In the step S2027, to notify that the movable unit 300b is being driven in the vertical direction, the strobe controller 310 transmits "SC050 command: data 01" to the camera controller 101, and then proceeds to a step S2028.

In the step S2028, similarly to the step S2016, the strobe controller 310 determines whether or not there has occurred a driving error, and if there has occurred no driving error, the strobe controller 310 proceeds to a step S2029, whereas if there has occurred a driving error, the strobe controller 310 proceeds to the step S2017. In the step S2029, the strobe controller 310 determines whether or not the rotational angle of the movable unit 300b in the vertical direction exceeds the switching bounce angle "a" referred to in the step S2025, and if the rotational angle exceeds the switching bounce angle "a", the strobe controller 310 proceeds to the step S2030, whereas if not, the strobe controller 310 proceeds to a step S2038.

In the determination in the step S2029, in a case where the step S1116 has been selected in the information transmission preparation process in FIG. 11, if the rotational angle exceeds 120° as the switching bounce angle "a", the strobe controller 310 proceeds to the step S2030. However, in a case where the step S1114 or S1115 has been selected in the information transmission preparation process in FIG. 11, switching of rotation is inhibited (a=360°), and hence the strobe controller 310 proceeds to the step S2038.

In the step S2030, the strobe controller 310 refers to the bounce angle limitation information stored in the EEPROM of the camera controller 101 or the strobe controller 310, and determines whether or not the rotational angle of the movable unit 300b in the vertical direction exceeds the bounce angle limit. Then, if the rotational angle of the movable unit 300b in the vertical direction exceeds the bounce angle limit, the strobe controller 310 proceeds to a step S2067, whereas if not, the strobe controller 310 proceeds to a step S2031.

In the step S2031, the strobe controller 310 drives the motor of the bounce H driving section 340b to thereby rotate the movable unit 300b about the second axis through 180° in the lateral direction, and then proceeds to a step S2032 (see FIG. 6B). In the step S2032, to notify that the movable unit 300b is being driven in the lateral direction, the strobe controller 310 transmits "SC050 command: data 02" to the camera controller 101, and then proceeds to a step S2033.

In the step S2067, in spite of the fact that the proper bounce angle exceeds the switching bounce angle, the movable unit 300b is not rotated about the second axis in the lateral direction, and hence the strobe controller 310 gives a warning using the display or sounds, and then proceeds to the step S2038. In the step S2033, similarly to the step S2016, the strobe controller 310 determines whether or not there has occurred a driving error, and if there has occurred no driving error, the strobe controller 310 proceeds to a step S2034, whereas if there has occurred a driving error, the strobe controller 310 proceeds to the step S2017.

In the step S2034, the strobe controller 310 stops the motor of the bounce H driving section 340b, and then proceeds to the step S2035. In the step S2035, the strobe controller 310 drives the motor of the bounce V driving section 340d to thereby rotate the movable unit 300b in the vertical direction again to the angle calculated in the step S1307 in the automatic bounce process in FIG. 13, and then proceeds to the step S2036.

In the step S2036, to notify that the movable unit 300b is being driven in the vertical direction, the strobe controller 310 transmits "SC050 command: data 01" to the camera controller 101, and then proceeds to a step S2037. In the step S2037, similarly to the step S2016, the strobe controller 310 determines whether or not there has occurred a driving error, and if there has occurred no driving error, the strobe controller 310 proceeds to the step S2038, whereas if there has occurred a driving error, the strobe controller 310 proceeds to the step S2017.

In the step S2038, the strobe controller 310 refers to the angle information indicative of the optimum bounce angle of the movable unit 300b in the lateral direction, which is calculated in the step S1307 in the automatic bounce process in FIG. 13, and then proceeds to a step S2039. In the step S2039, the strobe controller 310 drives the motor of the bounce H driving section 340b to thereby rotate the movable unit 300b in the lateral direction based on the lateral angle information referred to in the step S2038, and then proceeds a the step S2040.

In the step S2040, to notify that the movable unit 300b is being driven in the lateral direction, the strobe controller 310 transmits "SC050 command: data 02" to the camera controller 101, and then proceeds to a step S2041. In the step S2041, similarly to the step S2016, the strobe controller 310 determines whether or not there has occurred a driving error, and if there has occurred no driving error, the strobe controller 310 proceeds to a step S2042, whereas if there has occurred a driving error, the strobe controller 310 proceeds to the step S2017.

In the step S2042, after the driving of the movable unit 300b in the vertical and lateral directions is terminated, the strobe controller 310 transmits "SC050 command: data 00" and "SC010 command: data 00" as driving stop information to the camera controller 101, and then proceeds to the step S2043. In the step S2043, the strobe controller 310 transmits "SC070 command: data XX" and an "SC080 command: data XX" as current position information indicative of the rotational angles of the movable unit 300b to the camera controller 101, followed by terminating the present process.

On the other hand, in the step S2044 in FIG. 22, the strobe controller 310 prepares to perform bounce driving according to the instruction from the camera body 100, and then proceeds to the step S2045. Hereafter, the strobe controller 310 executes the steps S2045 to S2066, which are the same as the steps S2021 to S2041, and S2067. As described above, the movable unit 300b is automatically rotated in the vertical and lateral directions so as to make the irradiating direction optimum for bounce flash shooting.

Next, a description will be given of a light emission process performed by the strobe device 300 in bounce flash shooting with reference to FIG. 23.

Figure 23:
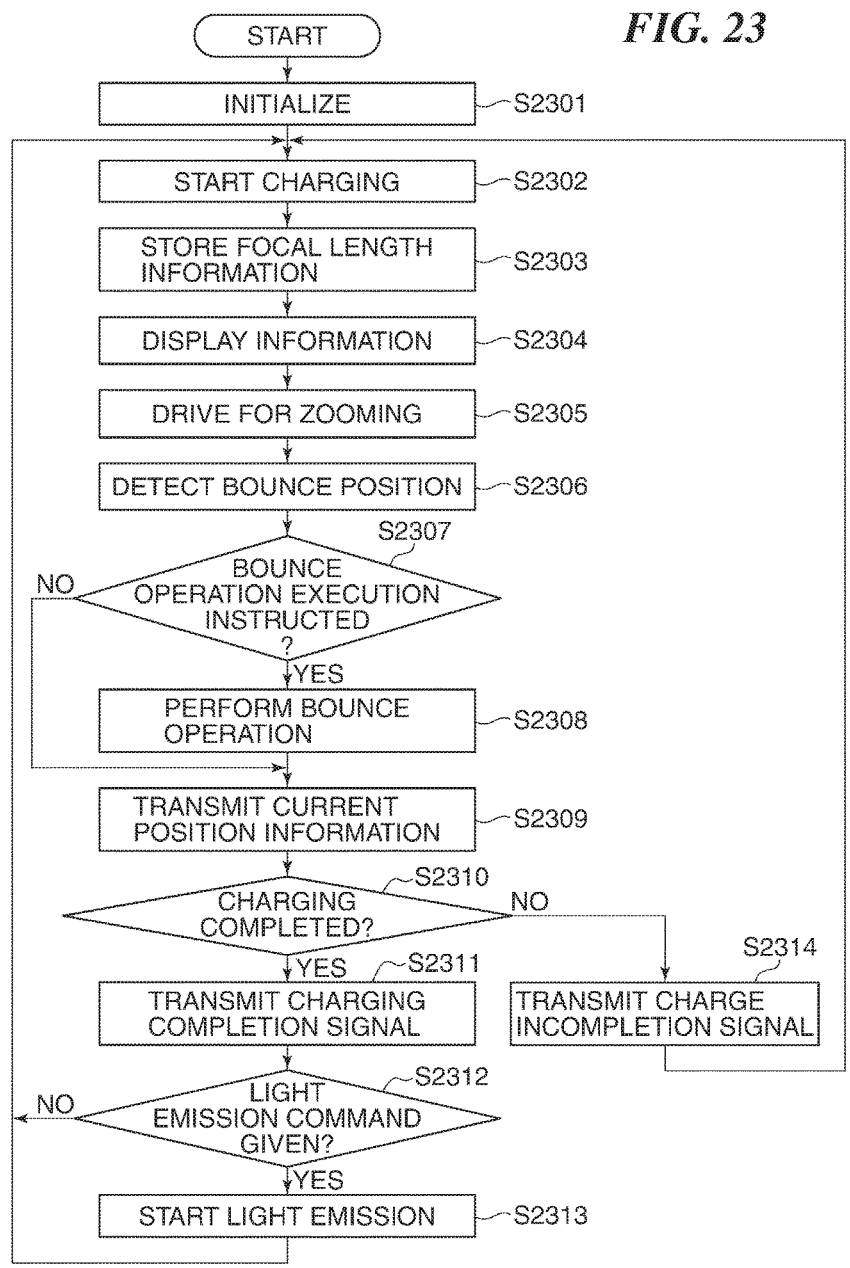
FIG. 23 is a flowchart of a light emission process performed by the strobe device for bounce flash shooting.

Referring to FIG. 23, in a step S2301, the strobe controller 310 initializes the built-in memory and the ports thereof. Further, the strobe controller 310 reads the states of the switches included in the input section 312 and input information set in advance, and makes settings of the light emission mode, such as a light emission amount determination method and light emission timing, and then proceeds to a step S2302. In the step S2302, the strobe controller 310 starts to operate the boosting circuit block 302 to charge the main capacitor 302d, and then proceeds to a step S2303.

In the step S2303, the strobe controller 310 stores focal length information acquired from the camera controller 101 via the communication line SC in the built-in memory thereof, and then proceeds to a step S2304. Note that in a case where focal length information has been stored before, the strobe controller 310 updates the focal length information to the new focal length information.

In the step S2304, the strobe controller 310 displays images concerning the information on the setting of the light emission mode made via the input section 312 and the acquired focal length, on the display section 313, and then proceeds to a step S2305. In the step S2305, the strobe controller 310 drives the zoom optical system 307 by the zoom drive circuit 330 such that the irradiation range of the strobe light becomes a range set according to the acquired focal length information, and then proceeds to a step S2306.

In the step S2306, the strobe controller 310 detects the rotational angle of the movable unit 300b with respect to the strobe body 300a using the bounce H detection section 340a and the bounce V detection section 340c, and then proceeds to a step S2307. In the step S2307, the strobe controller 310 determines whether or not execution of the bounce operation is instructed, and if the execution of the bounce operation is instructed, the strobe controller 310 proceeds to a step S2308, whereas if not, the strobe controller 310 proceeds to a step S2309. In the step S2308, the strobe controller 310 performs the above-described bounce driving (see FIGS. 20A to 22), and then proceeds to the step S2309.

In the step S2309, the strobe controller 310 transmits the current position information indicative of the rotational angles of the movable unit 300b with respect to the strobe body 300a after termination of the bounce driving, to the camera controller 101 (step S2143 in FIG. 21) as described above, and then proceeds to a step S2310. In the step S2310, the strobe controller 310 determines whether or not the charge voltage of the main capacitor 302d is not lower than a predetermined value (the charging of the main capacitor 302d is completed), and if the charge voltage is not lower than the predetermined value, the strobe controller 310 proceeds to a step S2311, whereas if the charge voltage is lower than the predetermined value, the strobe controller 310 proceeds to a step S2314. In the step S2314, the strobe controller 310 transmits a charging incompletion signal to the camera controller 101, and returns to the step S2302.

In the step S2311, the strobe controller 310 transmits a charging completion signal to the camera controller 101, and then proceeds to a step S2312. In the step S2312, the strobe controller 310 determines whether or not a light emission start signal has been received as a light emission command, and if a light emission start signal has been received, the strobe controller 310 proceeds to a step S2313, whereas if not, the strobe controller 310 returns to the step S2302.

In the step S2313, the strobe controller 310 instructs the light emission control circuit 304 to perform light emission according to the received light emission start signal, and causes the discharge tube 305 to emit light using the light emission control circuit 304, and returns to the step S2302 after termination of light emission. Note that in the step S2313, in a case where a series of light emissions of the preliminary light emission for light control and the final light emission are performed, the strobe controller 310 returns to the step S2302 after the series of light emissions have been terminated.

As described above, according to the present embodiment, even when the movable unit 300b having the light emission section is rotated so as to make the irradiating direction optimum for bounce flash shooting, it is possible to prevent the movable unit 300b from unexpectedly interfering with an obstacle, and the light emission section from turning toward the eyes of a photographer.

Next, a description will be given of an image pickup system according to a second embodiment of the present invention with reference to FIGS. 24 to 28B. Note that in the present embodiment, the same component elements as those of the first embodiment are denoted by the same reference numerals, and description thereof is omitted.

The present embodiment differs from the first embodiment in that when the camera is performing live view image shooting or variable angle shooting, the switching bounce angle is changed at which switching of the rotation of the movable unit 300b about the first axis is performed. More specifically, in the information transmission preparation process in FIG. 11, processing after the steps S1114, S1115, or S1116 is changed. In the present embodiment, the display section 113 is supported in a manner rotatable in an opening/closing direction with respect to the camera body 100 and is capable of performing a variable angle operation.

FIG. 24 is a flowchart of the process after the steps S1114, S1115, or S1116 in the information transmission preparation process in FIG. 11. Referring to FIG. 24, in a step S2401, the camera controller 101 determines whether live view (LV) image shooting or viewfinder image shooting is being performed. Then, if the viewfinder image shooting is being performed, the camera controller 101 proceeds to a step S2402, whereas if the live view (LV) image shooting is being performed, the camera controller 101 proceeds to a step S2405. Whether the live view (LV) image shooting or the viewfinder image shooting is being performed is determined using a viewfinder eyepiece sensor, not shown.

In the step S2402, the camera controller 101 stores "CS231 command: data 00" in the built-in memory thereof in preparation for camera-strobe communication (C→S), and then proceeds to a step S2403. In this step, since the viewfinder is used, the bounce angle limitation information is not changed.

In the step S2405, the camera controller 101 stores "CS231 command: data 01" in the built-in memory thereof in preparation for camera-strobe communication (C→S), and then proceeds to a step S2406. In the step S2406, the camera controller 101 stores "CS211 command: data 00" in the built-in memory thereof in preparation for camera-strobe communication (C→S), and then proceeds to a step S2407. In this step, the bounce angle limitation information is changed to 90°.

In the step S2407, the camera controller 101 stores "CS221 command: data 03" in the built-in memory thereof in preparation for camera-strobe communication (C→S), and then proceeds to a step S2403. In the step S2407, inhibition of switching of the switching bounce angle is set.

In the step S2403, the camera controller 101 determines whether or not the variable angle operation for displaying a photographed image is being performed, and if the variable angle operation is being performed, the camera controller 101 proceeds to a step S2408, whereas if not, the camera controller 101 proceeds to a step S2404. In the step S2403, whether or not the variable angle operation is being performed is determined using a sensor, not shown, for detecting the rotational operation of the display section.

In the step S2404, the camera controller 101 stores "CS241 command: data 00" in the built-in memory thereof in preparation for camera-strobe communication (C→S), and then proceeds to a step S2411. In the step S2404, since the variable angle operation is not being performed, the bounce angle limitation information is not changed.

In the step S2408, the camera controller 101 stores "CS241 command: data 01" in the built-in memory thereof in preparation for camera-strobe communication (C→S), and then proceeds to a step S2409. In the step S2409, the camera controller 101 stores "CS211 command: data 00" in the built-in memory thereof in preparation for camera-strobe communication (C→S), and then proceeds to a step S2410. In the step S2409, since the variable angle operation is being performed, the bounce angle limitation information is changed to 90°.

In the step S2410, the camera controller 101 stores "CS221 command: data 03" in the built-in memory thereof in preparation for camera-strobe communication (C→S), and then proceeds to the step S2411. In the step S2410, since the variable angle operation is being performed, the setting of inhibition of switching the bounce angle limitation is set. In the step S2411, similarly to the step S1117 in the information transmission preparation process in FIG. 11, the camera controller 101 stores a camera ID, sensor information, and other strobe setting information in the built-in memory thereof, and then proceeds to the step S907 in the shooting preparation process in FIG. 9.

Figure 25A:
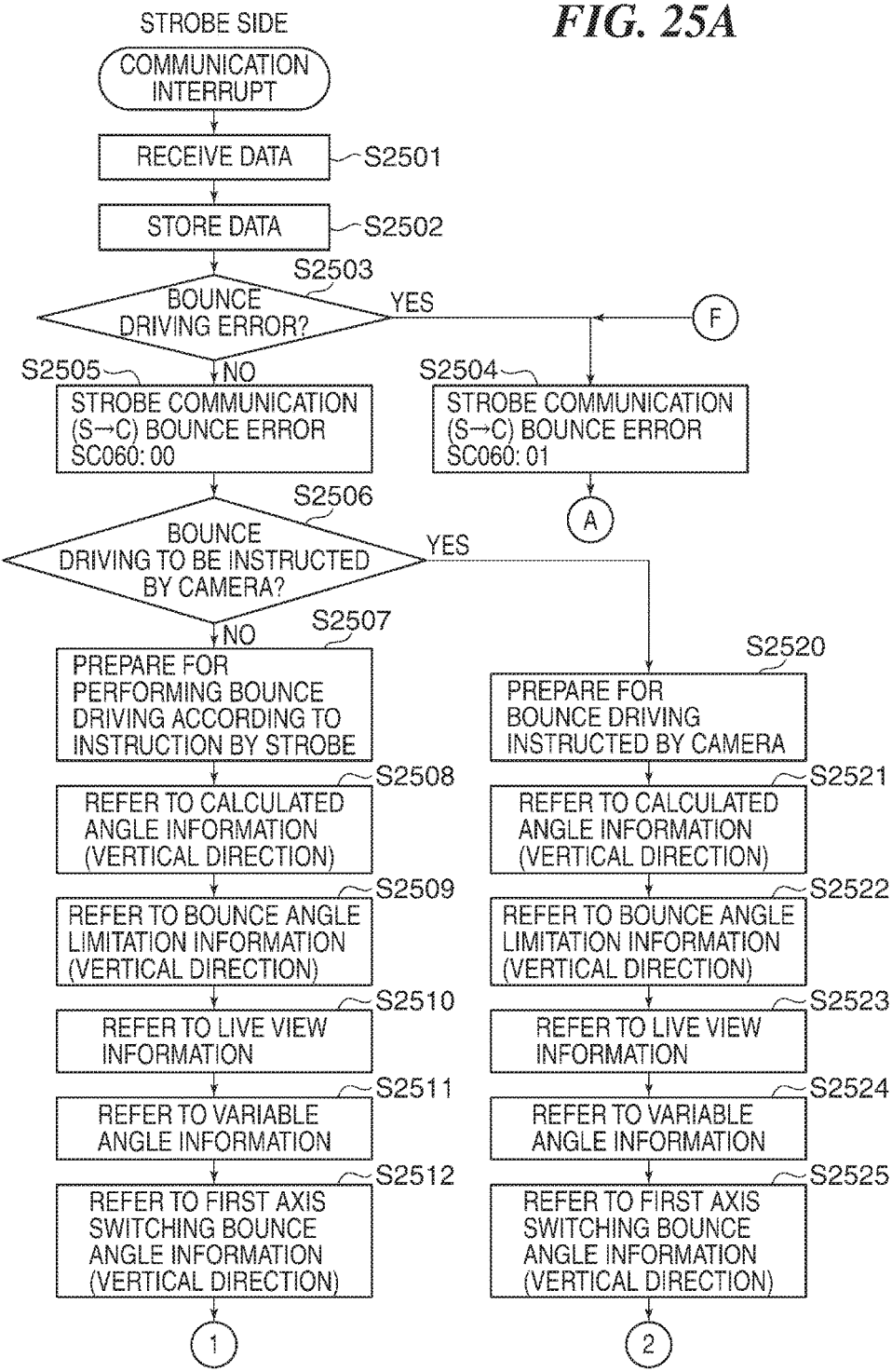
FIGS. 25A and 25B are a flowchart of a bounce driving control process performed by a strobe controller, which is changed from the bounce driving control process in FIGS. 20B, 21, and 22, in accordance with addition of a step to the FIG. 11 information transmission preparation process, in FIG. 24.
Figure 25B:
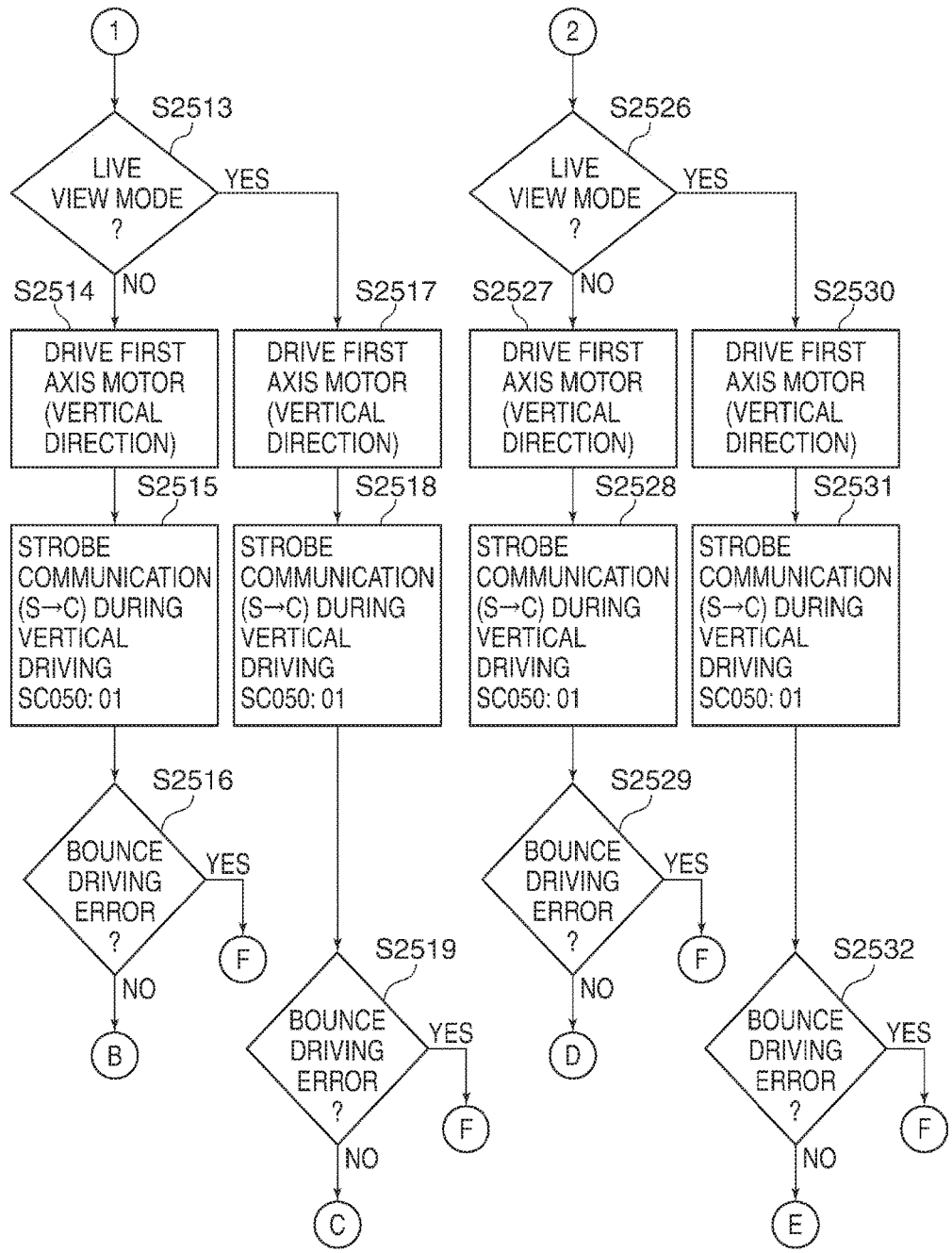

FIGS. 25 and 26 are a flowchart of a bounce driving control process performed by the strobe controller 310, which is changed from the bounce driving control process in FIGS. 20B, 21, and 22, in accordance with addition of the step 2401 to the FIG. 11 information transmission preparation process, in FIG. 24, which is performed by the camera controller 101. Note that steps S2501 to S2512, and S2520 to S2525 in FIGS. 25A and 25B are the same as the steps S2014 to S2025 in FIG. 20B, and the steps S2044 to S2049 in FIG. 22, respectively, and hence description thereof is omitted.

Referring to FIGS. 25A and 25B, in a step S2513, the strobe controller 310 refers to the live view mode information transmitted from the camera controller 101 in the step S1207 in FIG. 12, and if the live view is being used, the strobe controller 310 proceeds to a step S2517, and if the viewfinder is being used, the strobe controller 310 proceeds to a step S2514.

Note that the steps S2514 to S2516 are the same as the steps S2026 to S2028 in FIG. 21, and the steps S2517 to S2519 are also the same as the steps S2514 to S2516, and hence description thereof is omitted. Further, the steps S2526 to S2532 are the same as the steps S2513 to S2519, and hence description thereof is omitted.

Figure 26A:
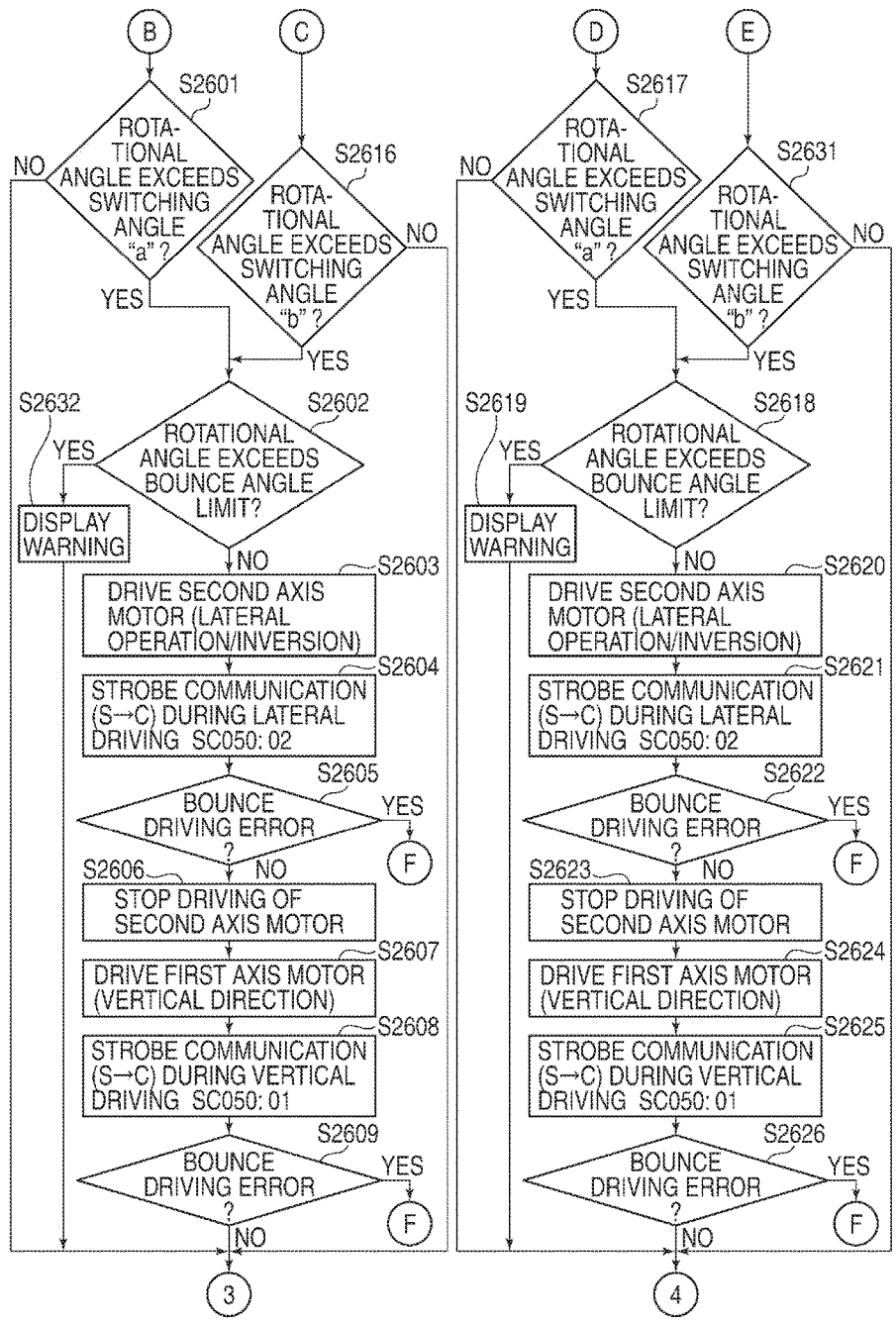
FIGS. 26A and 26B are a continuation of FIGS. 25A and 25B.
Figure 26B:
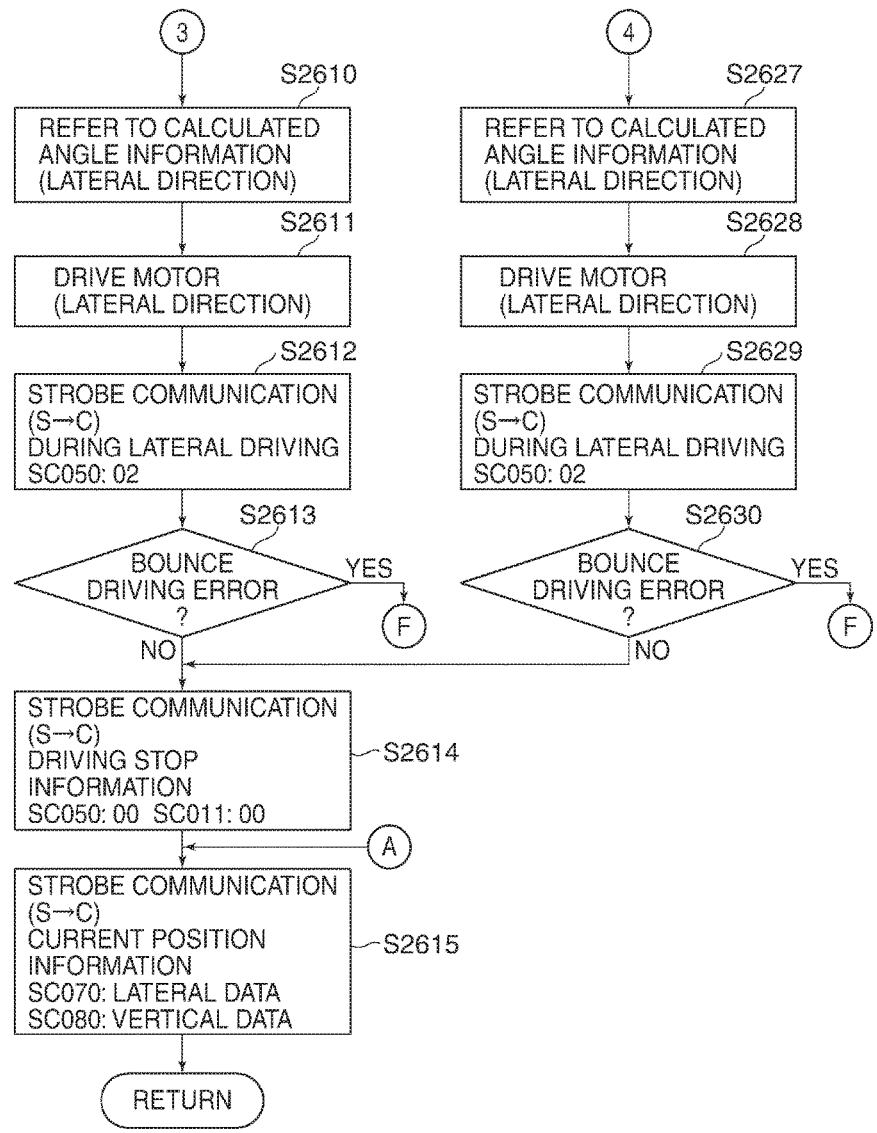

Referring to FIGS. 26A and 26B, in a step S2616, the strobe controller 310 determines whether or not the switching bounce angle exceeds a switching bounce angle "b" set for the live view, and if the switching bounce angle exceeds the switching bounce angle "b", the strobe controller 310 proceeds to a step S2602, whereas if not, the strobe controller 310 proceeds to a step S2610.

Here, in a case where the step S2402 has been selected in FIG. 24, the switching bounce angle "b" is the switching bounce angle referred to in the step S2512 in FIG. 25A. In a case where the step S2405 has been selected in FIG. 24, the switching of rotation is inhibited (a=360°), and the strobe controller 310 proceeds to the step S2610, so that the rotation of the movable unit 300b is stopped due to bounce angle limitation. Note that a step S2631 is the same as the step S2616. Also, steps S2601 to S2615 and S2632 in FIGS. 26A and 26B are the same as the steps S2029 to S2043 and S2067 in FIG. 21, except that the switching bounce angle in the step S2602 refers to an associated one of the switching bounce angles "a" and "b", and hence description thereof is omitted. Also, steps S2617 to S2631 in FIGS. 26A and 26B are the same as the steps S2601 to S2013, S2616, and S2632 in FIGS. 26A and 26B, and hence description thereof is omitted.

FIGS. 27A and 27B and FIGS. 28A and 28B are a flowchart of a bounce driving control process performed by the strobe controller 310, which is changed from the bounce driving control process in FIGS. 20B, 21, and 22, in accordance with addition of the step S2403 to the FIG. 11 information transmission preparation process, in FIG. 24. Note that steps S2701 to S2712, and steps S2714 to S2719 in FIGS. 27A and 27B are the same as the steps S2501 to S2512, and S2514 to S2519 in FIGS. 25A and 25B, respectively, and hence description thereof is omitted. Further, steps S2720 to S2725, and steps S2727 to S2732 in FIGS. 27A and 27B are the same as the steps S2520 to S2525, and S2527 to S2532 in FIGS. 25A and 25B, and hence description thereof is omitted.

Referring to FIGS. 27A and 27B, in a step S2713, the strobe controller 310 refers to the variable angle operation information received in the step S1208 in FIG. 12, and if the variable angle operation is being performed, the strobe controller 310 proceeds to a step S2717, whereas if not, the strobe controller 310 proceeds to a step S2714. Further, in case where the step S2404 has been selected in FIG. 24, the switching bounce angle "b" in the step S2816 in FIG. 28A is the switching bounce angle referred to in the step S2512 in FIG. 25A. In a case where the step S2408 has been selected in FIG. 24, the switching of rotation is inhibited (a=360°), and the strobe controller 310 proceeds to a step S2810, so that rotation of the movable unit 300b is stopped due to bounce angle limitation.

Note that a step S2831 is the same as the step S2816. Further, steps S2801 to S2815, S2832, and S2817 to S2830 in FIGS. 28A and 28B are the same as the steps S2601 to S2615, S2632, and S2617 to S2630 in FIGS. 26A and 26B, and hence description thereof is omitted.

According to the present embodiment, even when it is during the variable angle operation or live view image shooting, it is possible to prevent the movable unit 300b from unexpectedly interfering with the display section 113, and the light emission section from turning toward the eyes of a photographer. Other configuration and advantageous effects are the same as those provided by the first embodiment.

Next, a description will be given of an image pickup system according to a third embodiment of the present invention with reference to FIG. 29. Note that in the present embodiment, the same component elements as those of the first embodiment are denoted by the same reference numerals, and description thereof is omitted.

FIG. 29 is the flowchart of the bounce driving control process performed by the image pickup system according to the third embodiment by the strobe controller 310 when the movable unit 300b is driven in the object distance calculation process executed in the step S1609 in FIG. 16B.

Referring to FIG. 29, in a step S2901, the strobe controller 310 detects the bounce angle (position) of the movable unit 300b which is currently in stoppage using the bounce H detection section 340a and the bounce V detection section 340c, and then proceeds to a step S2902. In the step S2902, the strobe controller 310 determines whether or not the movable unit 300b (light emission section thereof) is in a position oriented to the front side (bounce angle) 0° based on a result of the detection in the step S2901. Then, if the movable unit 300b is oriented to the front side, the strobe controller 310 proceeds to a step S2905, whereas if not, the strobe controller 310 proceeds to a step S2903.

In the step S2903, the strobe controller 310 determines whether or not the position of the movable unit 300b is at an angle exceeding the limit angle of rotation about the first axis (it is assumed here, by way of example, that the limit angle of rotation about the first axis is set to 120°, similar to the first embodiment). Then, if the position of the movable unit 300b is at the angle exceeding the limit angle of rotation about the first axis, it is determined that the movable unit 300b is oriented to the rear side, and the strobe controller 310 proceeds to a step S2904, whereas if not, the strobe controller 310 proceeds to the step S2905.

In the step S2904, the strobe controller 310 drives the motor of the bounce V driving section 340d to thereby rotate the movable unit 300b through 90° in the vertical direction such that the light emission section is oriented toward the ceiling, and then proceeds to the step S2905. In the step S2905, the strobe controller 310 determines whether or not ranging information on an object by the camera has been received, and if the ranging information on an object by the camera has been received, the strobe controller 310 proceeds to the ceiling ranging process in the step S1306 in the automatic bounce process in FIG. 13, whereas if not, the controller 310 proceeds to a step S2906.

In the step S2906, similarly to the step S2031 in FIG. 21, the strobe controller 310 drives the motor of the bounce H driving section 340b to thereby rotate the movable unit 300b about the second axis by 180° in the lateral direction, and then proceeds to a step S2907. In the step S2907, similarly to the step S2026 in FIG. 21, the strobe controller 310 drives the motor of the bounce V driving section 340d to thereby rotate the movable unit 300b about the first axis in the vertical direction, and then proceeds to a step S2908. In the step S2908, when the light emission section of the movable unit 300b is returned to the position oriented to the front side (toward the object), the strobe controller 310 proceeds to the step S1610 in FIG. 16B.

Then, after returning the movable unit 300b to the position oriented to the front side, the strobe controller 310 calculates the optimum bounce angle in the step S1307 based on a result of ranging performed with respect to the object in the step S1305 and a result of ranging performed with respect to the ceiling in the step S1306 in the automatic bounce process in FIG. 13, and performs the bounce operation in the step S1308 et seq.

In the present embodiment, the movable unit 300b is temporarily stopped in a state in which the light emission section is oriented toward the ceiling, and if the ranging information by the camera (object distance) has been received, the distance to the ceiling is measured in the step S1306 in the automatic bounce process in FIG. 13, and the optimum bounce angle is calculated using the ranging result and the ranging information to thereby perform the bounce driving.

Further, if the ranging information by the camera has not been received, the movable unit 300b is rotated about the second axis in the lateral direction in the state in which the light emission section is oriented toward the ceiling, and then the steps S1305 to S1311 in the automatic bounce process in FIG. 13 are executed. This makes it possible to prevent the movable unit 300b from unexpectedly interfering with an obstacle when the movable unit 300b is rotated in the lateral direction. Other configuration and advantageous effects are the same as those provided by the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although in the above-described embodiments, the movable unit 300b is rotated about the first axis in the vertical direction, and is rotated about the second axis in the lateral direction, in a case where the strobe device 300 is rotated through 90° in a rolling direction with respect to the optical axis to thereby change the posture, the first axis and the second axis are exchanged.

This makes it possible to rotate the movable unit 300b about the second axis in the vertical direction, and about the first axis in the lateral direction, whereby it is possible to obtain the same advantageous effects. A change in posture in this case is detected by the posture detection circuit 140 of the camera body 100 or the posture detection circuit 360 of the strobe device 300.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-110040 filed Jun. 1, 2016, which is hereby incorporated by reference herein in its entirety.

What is claimed is:

1. An image pickup system including an image pickup apparatus, and a light emission device that is mounted on the image pickup apparatus, and is capable of performing communication with the image pickup apparatus,
wherein the light emission device includes a device body, a movable unit including a light emitter that emits light, and supported in a manner rotatable about a first axis in a first direction with respect to the device body, and in a manner rotatable about a second axis in a second direction substantially orthogonal to the first direction, a first driver that drives the movable unit in the first direction, and a second driver that drives the movable unit in the second direction, and irradiates light from the light emitter toward a target object, thereby causing reflected light from the target object to be irradiated to an object,
the image pickup system comprising:
one or more processors, wherein the processor functions as the following units according to a program stored in a memory;
a first determination unit configured to calculate an angle of the movable unit with respect to the device body, at which light is irradiated from the light emitter toward the target object to thereby determine an irradiating direction;
a control unit configured to control the first driver and the second driver such that the light emitter is oriented in the irradiating direction determined by the first determination unit; and
a second determination unit configured to determine whether or not a rotational angle of the movable unit with respect to the device body that is driven in the first direction by the first driver, in a position where the light emitter is oriented in the irradiating direction, exceeds a predetermined angle,
wherein the control unit determines whether or not to drive the movable unit in the second direction by the second driver, based on a result of the determination by the second determination unit.

2. The image pickup system according to claim 1, wherein the predetermined angle is a limit rotational angle of the movable unit in the first direction.

3. The image pickup system according to claim 2, wherein when it is determined by the second determination unit that the rotational angle of the movable unit in the position exceeds the limit rotational angle, the control unit does not cause the second driver to drive the movable unit in the second direction.

4. The image pickup system according to claim 1, further comprising a storage medium configured to store the predetermined angle.

5. The image pickup system according to claim 1, wherein when the image pickup apparatus is performing live view image shooting, the control unit does not cause the second driver to drive the movable unit in the second direction.

6. The image pickup system according to claim 1, wherein the image pickup apparatus includes a display supported in a manner rotatable in a direction opening or closing with respect to the image pickup apparatus, and
wherein when the display is open. with respect to the image pickup apparatus, the control unit does not cause the second drive unit to drive the movable unit in the second direction.

7. The image pickup system according to claim 1, wherein the target object is a ceiling.

8. The image pickup system according to claim 7, wherein the processor functions as a ranging unit configured to calculate a distance to the object and a distance to the target object, and
wherein the first determination unit determines the irradiating direction based on results of calculation of the distance to the object and the distance to the target object by the ranging unit.

9. The image pickup system according to claim 8, wherein the control unit, the ranging unit, and the first determination unit are provided in each of the light emission device and the image pickup device,
wherein when the movable unit is oriented to a rear side of the image pickup apparatus, in the position where the light emission device is oriented in the irradiating direction, the control unit of the light emission device causes the first driver to rotate the movable unit about the first axis such that the light emission device is oriented toward the ceiling and stop the same, and
wherein in a case where ranging information on the object acquired by the ranging unit of the image pickup apparatus has been acquired, the first determination unit of the light emission device measures a distance to the ceiling by the ranging unit of the light emission device, and calculates an angle of the movable unit with respect to the device body, at which light is emitted from the light emitter toward the ceiling, based on the acquired ranging information on the object and a result of measurement of the distance to the ceiling, to thereby determines the irradiating. direction.

10. The image pickup system according to claim 8, wherein in a case where ranging information on the object acquired by the ranging unit of the image pickup apparatus has not been acquired, the control unit of the light emission device causes the second driver to rotate the movable unit about the second axis such that the movable unit is oriented to the front side, and
wherein the first determination unit of the light emission device calculates an angle of the movable unit with respect to the device body, at which light is emitted from the light emitter toward the ceiling, based on results of measurement of the distance to the object and the distance to the ceiling by the ranging unit of the light emission device, to thereby determine the irradiating direction.

11. The image pickup system according to claim 1, wherein the movable unit is rotated about the second axis through 180".

12. The image pickup system according to claim 1, wherein the processor functions as a posture detection unit configured to detect a posture of the light emission device, and wherein when it is detected by the posture detection unit that the light emission device has been rotated through 90° in a rolling direction with respect to an optical axis to change the posture of the light emission device, the control unit switches between rotation of the movable unit about the first axis and rotation of the movable unit about the second axis.

13. A light emission device that includes a device body, a movable unit including a light emitter that emits light, and supported in a manner rotatable about a first axis in a first direction with respect to the device body, and in a manner rotatable about a second axis in a second direction substantially orthogonal to the first direction, a first driver that drives the movable unit in the first direction, and a second driver that drives the movable unit in the second direction, and irradiates light from the light emitter toward a target object, thereby causing reflected light from the target object to be irradiated to an object, the light emission device comprising:
one or more processors, Wherein the processor functions as the following units according to a program stored in a memory;
a first determination unit configured to calculate an angle of the movable unit with respect to the device body, at which light is irradiated from the light emitter toward the target object to thereby decide an irradiating direction;
a control unit configured to control the first driver and the second driver such that the light emitter is oriented in the irradiating direction determined by the first determination unit; and
a second determination unit configured to determine Whether or not a rotational angle of the movable unit with respect to the device body that is driven in the first direction by the first driver, in a position where the light emitter is oriented in the irradiating direction, exceeds a predetermined angle,
wherein the control unit determines whether or not to drive the movable unit in the second direction by the second driver, based on a result of the determination by the second determination unit.

14. The light emission device according to claim 13, wherein the movable unit and the device body are mounted on an image pickup apparatus.

15. The light emission device according to claim 13, wherein the predetermined angle is a limit rotational angle of the movable unit in the first direction.

16. The light emission device according to claim 15, wherein when it is determined by the second determination unit that the rotational angle of the movable unit in the position exceeds the limit rotational angle, the control unit does not cause the second driver to drive the movable unit in the second direction.

17. The light emission device according to claim 13, further comprising a storage medium configured to store the predetermined angle.

18. A method of controlling a light emission device that includes a device body, a movable unit including a light emitter that emits light, and supported in a manner rotatable about a first axis in a first direction with respect to the device body, and in a manner rotatable about a second axis in a second direction substantially orthogonal to the first direction, a first driver that drives the movable unit in the first direction, and a second driver that drives the movable unit in the second direction, and irradiates light from the light emitter toward a target object, thereby causing reflected light from the target object to be irradiated to an object, the method comprising:
calculating an angle of the movable unit with respect to the device body, at which light is irradiated from the light emitter toward the target object to thereby determine an irradiating direction;
controlling the first driver and. the second driver such that the light emitter is oriented in the determined irradiating direction;
determining whether or not a rotational angle of the movable unit with respect to the device body that is driven in the first direction by the first driver, in a position where the light emitter is oriented in the irradiating direction, exceeds a predetermined angle; and
determining whether or riot to drive the movable unit in the second direction by the second driver, based on a result of the determination by said determining.

19. A non-transitory computer-readable storage medium storing a computer-executable program for executing a method of controlling a light emission device that includes a device body, a movable unit including a light emitter that emits light, and supported in a manner rotatable about a first axis in a first direction with respect to the device body, and in a manner rotatable about a second axis in a second direction substantially orthogonal to the first direction, a first driver that drives the movable unit in the first direction, and a second driver that drives the movable unit in the second direction, and irradiates light from the light emitter toward a target object, thereby causing reflected light from the target object to be irradiated to an object, wherein the method comprises:
calculating an angle of the movable unit with respect to the device body, at which light is irradiated from the light emitter toward the target object to thereby determine an irradiating direction;
controlling the first driver and the second driver such that the light emission section is oriented in the determined irradiating direction;
determining whether or not a rotational angle of the movable unit with respect to the device body that is driven in the first direction by the first driver, in a position where the light emitter is oriented in the irradiating direction, exceeds a predetermined angle; and
determining whether or not to drive the movable unit in the second direction by the second driver, based on a result of the determination by said determining.

* * * * *